US008513368B2

(12) United States Patent
Michiue et al.

(10) Patent No.: US 8,513,368 B2
(45) Date of Patent: Aug. 20, 2013

(54) COPOLYMER OF OLEFIN AND CONJUGATED DIENE, AND PROCESS FOR PRODUCING THE SAME

(75) Inventors: Kenji Michiue, Chiba (JP); Sei-ichi Ishii, Ichihara (JP); Makoto Mitani, Yokohama (JP); Takeshi Karino, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 13/260,237

(22) PCT Filed: Mar. 30, 2010

(86) PCT No.: PCT/JP2010/055759
§ 371 (c)(1),
(2), (4) Date: Sep. 23, 2011

(87) PCT Pub. No.: WO2010/113975
PCT Pub. Date: Oct. 7, 2010

(65) Prior Publication Data
US 2012/0059135 A1    Mar. 8, 2012

(30) Foreign Application Priority Data

Mar. 30, 2009 (JP) ................. 2009-082697
Apr. 3, 2009 (JP) ................. 2009-091233

(51) Int. Cl.
*C08F 236/04* (2006.01)
*C08F 236/06* (2006.01)
*C08F 4/6592* (2006.01)

(52) U.S. Cl.
USPC ..................... 526/339; 526/126; 526/160

(58) Field of Classification Search
USPC ......................... 526/160, 339, 126
See application file for complete search history.

(56) References Cited

U.S. PATENT DOCUMENTS

| | | | |
|---|---|---|---|
| 4,990,640 | A | 2/1991 | Tsutsui et al. |
| 5,103,030 | A | 4/1992 | Rohrmann et al. |
| 5,243,001 | A | 9/1993 | Winter et al. |
| 5,328,969 | A | 7/1994 | Winter et al. |
| 5,629,254 | A | 5/1997 | Fukuoka et al. |
| 5,770,753 | A | 6/1998 | Kuber et al. |
| 5,817,724 | A | 10/1998 | Aoki et al. |
| 6,063,725 | A | 5/2000 | Sunaga et al. |
| 6,121,395 | A | 9/2000 | Turner |
| 6,310,164 | B1 | 10/2001 | Morizono et al. |
| 6,417,120 | B1 | 7/2002 | Mitchler et al. |
| 6,939,928 | B1 | 9/2005 | Kawai et al. |
| 7,105,608 | B2 | 9/2006 | Ishihara et al. |
| 7,449,533 | B2 | 11/2008 | Kawai et al. |
| 7,488,789 | B2 | 2/2009 | Ikenaga et al. |
| 2004/0236044 | A1* | 11/2004 | Longo et al. ............ 526/126 |
| 2007/0254800 | A1 | 11/2007 | Razavi et al. |
| 2009/0156761 | A1 | 6/2009 | Razavi et al. |

FOREIGN PATENT DOCUMENTS

| | | |
|---|---|---|
| CA | 2084017 C | 5/1993 |
| EP | 0 275 676 A1 | 7/1988 |
| EP | 0 320 762 A2 | 6/1989 |
| EP | 0 416 815 A2 | 3/1991 |
| EP | 0 549 900 A1 | 7/1993 |
| EP | 0 576 970 A1 | 1/1994 |
| EP | 0 629 632 A2 | 12/1994 |
| JP | 1-501950 | 7/1989 |
| JP | 1-502036 | 7/1989 |
| JP | 02-078687 A | 3/1990 |
| JP | 03-179005 A | 8/1991 |
| JP | 04-268307 | 9/1992 |
| JP | 07-070224 | 3/1995 |
| JP | 07-286005 | 10/1995 |
| JP | 09-309911 | 12/1997 |
| JP | 10-204112 | 8/1998 |
| JP | 10-204113 | 8/1998 |
| JP | 10-298219 | 11/1998 |
| JP | 11-080269 | 3/1999 |
| JP | 2001-011112 | 1/2001 |
| JP | 2004-018697 | 1/2004 |
| JP | 2005-200503 | 7/2005 |
| WO | WO-01/27124 A1 | 4/2001 |
| WO | WO-2004/087775 A1 | 10/2004 |
| WO | WO-2007/127426 A2 | 11/2007 |

OTHER PUBLICATIONS

Supplementary European Search Report EP Application No. 10 75 8746 dated Aug. 27, 2012.
Tong Neo Choo et al., "The Dual-Site Alternating Cyclocopolymerization of 1,3-Butadiene with Ethylene", J. Am Chem. Soc., 2003, 125, pp. 8970-8971 along with Supporting Information pp. S1-S5.
Yukio Imanishi et al., "Synthesis of Polyolefins with Unique Properties by Using Metallocene-Type Catalysts", Macromol. Symp. 195, 45-62 (2003).
Choo, T. et al. "The Dual-Site Alternating Cyclocopolymerization of 1,3-Butadiene with Ethylene", J. Am. Chem. Soc., Jul. 30, 2003, vol. 125, No. 30, pp. 8970-8971.
Napoli, M. et al. "Closing Cycles with $C_2$-Symmetric Ziegler-Natta Polymerization Catalysts", Macromolecules, Jun. 28, 2005, vol. 38, No. 13, pp. 5493-5497.
Esteb, J. et al. "Novel $C_1$ symmetric zirconocenes containing substituted indenyl moieties for the stereoregular polymerization od propylene", Journal of Organo Metallic Chemistry, Dec. 15, 2003, vol. 688, Issues 1-2 Complete volume, pp. 153-160.
Fujita, M. et al. "Synthesis and characterization of Alternating and Multiblock Copolymers from Ethylene and Cyclopentene", Macromolecules, Dec. 17, 2002, vol. 35, pp. 9640-9647.
Galimberti, M. et al. "$^{13}$C NMR analysis of a-olefins copolymers with 1,3-butadiene obtained with zirconocenes/methylalumoxane catalysts", Makromol. Chem., Nov. 1991, vol. 192, No. 11, pp. 2591-2601.
Hagihara, H. et al. "Living Polymerization of Propene and 1-Hexene with the [t-BuNSiMe$_2$Flu]TiMe$_2$/B($C_6F_5$)$_3$ Catalyst", Macromolecules, May 19, 1998, vol. 31, No. 10, pp. 3184-3188.
International Search Report in PCT/JP2010/055759 dated Jun. 29, 2010.

(Continued)

*Primary Examiner* — Caixia Lu
(74) *Attorney, Agent, or Firm* — Foley & Lardner LLP

(57) ABSTRACT

An object of the invention is to provide copolymers which have a double bond in a side chain and are substantially free of unsaturated bonds in the main chain, copolymers which have a cyclic structure and are substantially free of unsaturated bonds in the main chain, and processes for economically synthesizing these copolymers.

23 Claims, 1 Drawing Sheet

(56) References Cited

OTHER PUBLICATIONS

Ishihara T., et al. "Hydrogenated 1,4-Insertion of butadiene in the Copolymerization with Propylene Using an Isospecific Zirconocene Catalyst", J. Am. Chem. Soc., Apr. 27, 2005, vol. 127, No. 16, pp. 5774-5775.

Lavoie, A. et al. "Catalytic syntheses of alternating, stereoregular ethylene/cycloolefin copolymers", Tetrahedron, Aug. 16, 2004, vol. 60, No. 34, pp. 7147-7155.

Longo, P. et al. "Butadiene Insertion and Constitutional Units in Ethene Copolymerizations by $C_2$-Symmetric Metallocenes", Macromolecules, Dec. 2, 2003, vol. 36, No. 24, pp. 9067-9074.

Michiue, K. et al. "Synthesis, Structures, and Olefin Polymerization Behavior of Sterically Crowded Tris(pyrazolyl)borate Zirconium and Hafnium Complexes", Organometallics, Feb. 2, 2004, vol. 23, No. 3, pp. 460-470.

Napoli, M. et al. "New Group IV Metallocene Systems Active in the Copolymerization of x-Olefins and Conjugated Dienes", Macromolecular Chemistry and Physics, Feb. 3, 2006, vol. 207, pp. 304-309.

Pragliola, S. et al. "Ethene/1,3-Butadiene Copolymerization in the Presence of rac-(CH2-(3-tert-butyl-1-indenyl)2)ZrCl2/MAO Catalytic System: Study of the Polymerization Mechanism by Using $^{13}$C-Labeled 1,3-Butadiene", Macromolecules, Jan. 13, 2004, vol. 37, No. 1, pp. 238-240.

Pragliola, S. et al. "*rac*-[CH$_2$(3-tert-butyl-1-indenyl)$_2$]ZrCl$_2$/MAO in the Copolymerization of Olefins and Dienes", Macromol. Symp., 2006, vol. 234, pp. 128-138.

Pragliola, S. et al. "Stereoselective Cyclopropanation by Cyclocopolymerizastion of Butadiene", J. Am. Chem. Soc., Apr. 10, 2002, vol. 124, No. 14, pp. 3502-3503.

Rheingold, A. et al. "Hydrotris(3-mesitylpyrazol-1-yl)borate and Hydrobis(3-mesitylpyrazol-1-yl)(5-mesitylpyrazol-1-yl)borate: Symmetirc and Asymmetric Ligands with Rotationally Restricted Aryl Substituents", Inorg. Chem., Aug. 4, 1993, vol. 32, No. 16, pp. 3471-3477.

Spaleck, W. et al. "The Influence of Aromatic Substituents on the Polymerization Behavior of Bridged Zirconocene Catalysts", Organometallics, Mar. 1994, vol. 13, No. 3, pp. 954-963.

Wang, W. et al. "Copolymerization of Ethylene with Cyclohexene (CHE) Catalyzed by *Nonbridged* Half-Titanocenes Containing Aryloxo Ligand: Notabl Effect of Both Cyclopentadienyl and Anionic Donor Ligand for Efficient CHE Incorporation", J. Am. Chem. Soc., Apr. 6, 2005, vol. 127, No. 13, pp. 4582-4583.

Wild, F. et al. "VII* Synthesis and Crystal Structure of a Chiral *ansa*-Zirconocene Derivative with Ethylene-Bridged Tetrahydroindenyl Ligands", Journal of Organometallic Chemistry, 1985, vol. 288, pp. 63-67.

* cited by examiner

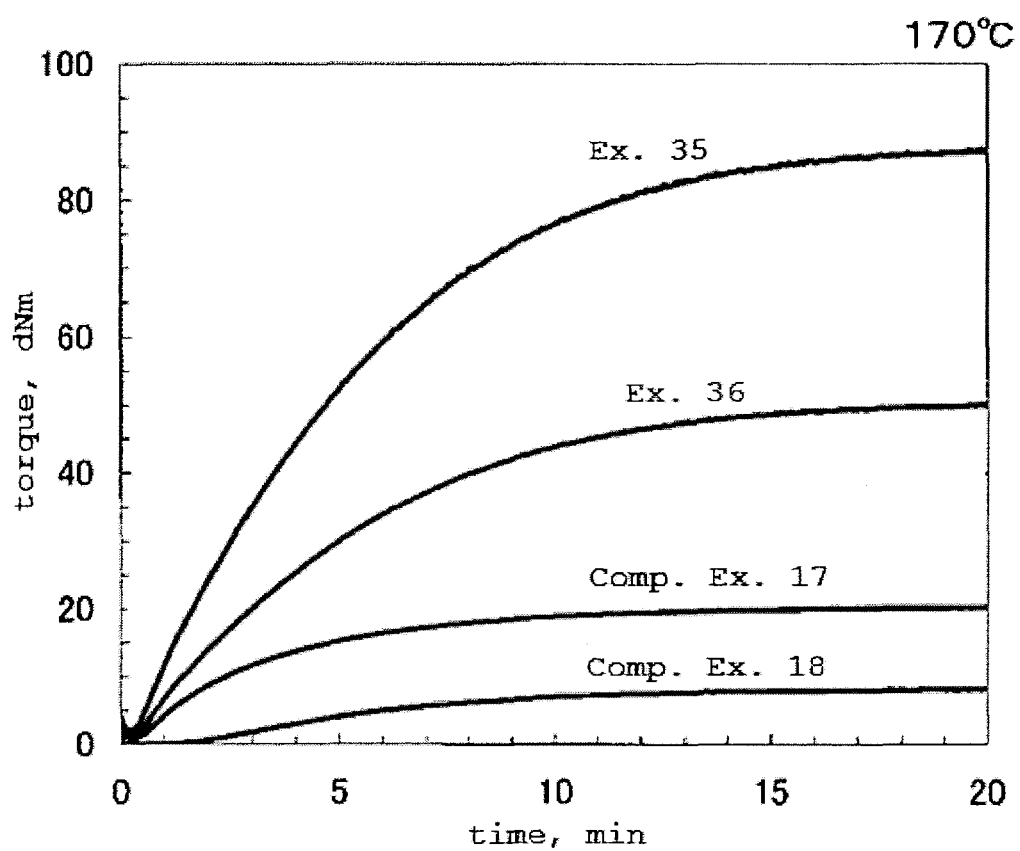

COPOLYMER OF OLEFIN AND CONJUGATED DIENE, AND PROCESS FOR PRODUCING THE SAME

TECHNICAL FIELD

The present invention relates to copolymers of an olefin and a conjugated diene, and processes for producing the copolymers.

BACKGROUND ART

Olefin resins such as polyolefins and polyolefin elastomers are used in various fields including the manufacture of shaped articles because of their excellent properties, for example mechanical properties. In recent years, the requirements for the properties of these olefin resins have been diversified. Such diverse requirements have resulted in the need of olefin resins having various properties, for example olefin resins having excellent rigidity as well as high impact strength, weathering resistance, heat resistance, cold resistance, crosslinking efficiency, oil resistance, adhesion, dyeability, wettability and compatibility with other polar-group containing resins.

To achieve these properties, it is necessary that functional groups having excellent crosslinking efficiency and modification efficiency as well as cyclic structures be introduced into the polymer chains. An economically advantageous process for producing such polymers is, for example, to copolymerize olefins with diene monomers or to copolymerize α-olefins such as ethylene with cyclic olefins.

Processes for introducing functional groups that have excellent crosslinking efficiency and modification efficiency into polymer chains are disclosed in, for example, European Patent Application No. 0275676 (EP0275676) (1988) (Patent Literature 1), Makromol. Chem. 1991, (192), 2591 (Non-Patent Literature 1), U.S. Pat. No. 6,310,164 (U.S. Pat. No. 6,310,164) (2001) (Patent Literature 2) and JP-A-H11-080269 (Patent Literature 3).

However, these processes disclosed in the art have drawbacks. For example, a sufficient amount of vinyl groups cannot be introduced in the copolymer, or unsaturated bonds in the main chain lower properties such as weathering resistance, heat resistance and ozone resistance. Further, a sufficient molecular weight cannot be obtained, resulting in poor mechanical properties.

Macromolecules 2003 (36), 9067 (Non-Patent Literature 2) discloses a method for synthesizing an ethylene/butadiene copolymer that contains a vinyl group and is free of 1,4-addition units in the main chain. However, the main chain contains unsaturated bonds derived from 1,3-addition units, which may cause adverse effects on properties. Further, the method of Non-Patent Literature 2 produces vinyl groups only when the ethylene/butadiene feed ratio is very low, namely, when butadiene is fed in a large amount. However, such conditions extremely decrease the polymerization activity, resulting in economical disadvantages in commercial production. Furthermore, Non-Patent Literature 2 does not describe any data of molecular weight measurement.

Meanwhile, polyolefin elastomers that have unsaturated bonds inside chains and no unsaturated bonds in the main chain are known in the art, with examples including ethylene/propylene/diene monomer copolymers (EPT, EPDM) in which the diene monomer is, for example, ethylidene norbornene, vinyl norbornene or dicyclopentadiene. When these polyolefin elastomers are used as rubber shaped articles, they are subjected to peroxide crosslinking or radical modification. In a usual crosslinking method, a rubber extrudate containing a vulcanizing agent is crosslinked batchwise under a pressurized steam atmosphere or is crosslinked continuously under hot air.

However, because the unsaturated bonds in EPT and EPDM copolymers are less reactive than the vinyl group, the peroxide crosslinking reaction involves a large amount of peroxides. When a rubber extrudate is crosslinked under pressurized steam or hot air (hereinafter, such crosslinking will be referred to as hot air crosslinking) in the presence of an organic peroxide, the contact of air (oxygen) with the surface of the rubber extrudate induces a decomposition reaction of the resin main chain. Consequently, the crosslinking does not proceed sufficiently and at the same time the rubber undergoes softening degradation, resulting in a crosslinked product having a sticky surface. Further, the properties of the crosslinked copolymers are often unsatisfactory for the reasons such as residual peroxides in excessively large amounts. Thus, there has been a need for new polyolefin elastomers that can be crosslinked by hot air crosslinking with organic peroxides.

Since ethylidene norbornene, vinyl norbornene and the like have a high boiling point, removing the unreacted diene monomers after the copolymerization consumes large amounts of energy, causing economic disadvantages.

Thus, there has been a need for polyolefin elastomers which use inexpensive and low-boiling general diene monomers such as 1,3-butadiene and which have double bonds in side chains and are free of unsaturated bonds in the main chain. An economically advantageous process for producing such polyolefin elastomers is also desired.

However, a limited number of references have disclosed copolymers which have double bonds and are free of unsaturated bonds in the main chain, and production processes for such copolymers. In detail, only JP-A-2005-200503 (Patent Literature 4) and J. Am. Chem. Soc. 2005 (127), 5774 (Non-Patent Literature 3) disclose propylene/butadiene copolymers. Further, copolymers produced by the processes disclosed in Patent Literature 4 and Non-Patent Literature 3 have a low molecular weight and consequent insufficient mechanical properties.

Acyclic structure may be introduced into a polymer chain by polymerizing a cyclic olefin such as norbornene in the presence of a vanadium-containing catalyst formed of a soluble vanadium compound and an organoaluminum compound. However, this catalyst system can catalyze copolymerization of a limited variety of cyclic olefins, has low polymerization activity and cannot afford copolymers having a sufficient molecular weight and a sufficient cyclic olefin content. Further, large amounts of energy are required to remove unreacted cyclic olefins after the reaction, thereby resulting in economic disadvantages.

J. Am. Chem. Soc., 2005 (127), 4582 (Non-Patent Literature 4) and Tetrahedron, 2004 (60), 7147 (Non-Patent Literature 5) disclose ethylene/cyclic olefin (cyclopentene, cyclohexene, cycloheptene, cyclooctene) copolymerization by a half metallocene/aluminoxane catalyst. Further, Macromolecules, 2002 (35), 9640 (Non-Patent Literature 6) discloses ethylene/cyclopentene copolymerization by a bisphenoxyimine complex/aluminoxane catalyst. However, these catalyst systems have a low incorporation efficiency for cyclic olefins. To obtain a polymer having a high cyclic olefin content, the cyclic olefin has to be fed in a large amount. Thus, the polymerization activity is insufficient.

Alternatively, acyclic structure may be introduced into a main chain by copolymerizing an olefin with a diene monomer.

Such methods are disclosed in JP-A-H11-080269 (Patent Literature 5) and JP-A-2004-018697 (Patent Literature 6). However, the copolymers obtained by these methods contain unsaturated bonds in the main chain which lower properties such as weathering resistance, heat resistance and ozone resistance.

Further, the synthesis of ethylene/butadiene copolymers having a cyclic structure in the main chain is disclosed in Macromolecular Symposia, 2006, (234), 1288 (Non-Patent Literature 7), Macromolecular Chemistry and Physics, 2006, (207), 304 (Non-Patent Literature 8), Macromolecules, 2005, 38, 5493 (Non-Patent Literature 9), Macromolecules, 2004 (37), 238 (Non-Patent Literature 10), Macromolecules, 2003 (36), 9067 (Non-Patent Literature 11) and Journal of the American Chemical Society, 2002, (124), 3502 (Non-Patent Literature 12). However, the copolymers obtained by the disclosed methods contain unsaturated bonds in the main chain that are derived from 1,4-addition units and 1,3-addition units, possibly leading to adverse effects on properties. Further, the above references do not describe any data of molecular weight measurement.

Journal of the American Chemical Society, 2003, (125), 8970 (Non-Patent Literature 13) discloses a process for synthesizing an ethylene/butadiene copolymer which has a cyclic structure in the main chain and is free of unsaturated bonds derived from 1,4-addition units and 1,3-addition units. According to the process, however, the polymerization activity is insufficient and the obtainable molecular weight is low. Thus, the process is not suited for commercial production.

CITATION LIST

Patent Literatures

[Patent Literature 1] EP0275676
[Patent Literature 2] U.S. Pat. No. 6,310,164
[Patent Literature 3] JP-A-H11-080269
[Patent Literature 4] JP-A-2005-200503
[Patent Literature 5] JP-A-H11-080269
[Patent Literature 6] JP-A-2004-018697

Non-Patent Literatures

[Non-Patent Literature 1] Makromol. Chem. 1991, (192), 2591
[Non-Patent Literature 2] Macromolecules 2003 (36), 9067
[Non-Patent Literature 3] J. Am. Chem. Soc. 2005 (127), 5774
[Non-Patent Literature 4] J. Am. Chem. Soc., 2005 (127), 4582
[Non-Patent Literature 5] Tetrahedron, 2004 (60), 7147
[Non-Patent Literature 6] Macromolecules, 2002 (35), 9640
[Non-Patent Literature 7] Macromolecular Symposia, 2006, (234), 1288
[Non-Patent Literature 8] Macromolecular Chemistry and Physics, 2006, (207), 304
[Non-Patent Literature 9] Macromolecules 2005, 38, 5493
[Non-Patent Literature 10] Macromolecules 2004 (37), 238
[Non-Patent Literature 11] Macromolecules 2003 (36), 9067
[Non-Patent Literature 12] Journal of the American Chemical Society, 2002, (124), 3502
[Non-Patent Literature 13] Journal of the American Chemical Society, 2003, (125), 8970

SUMMARY OF INVENTION

Technical Problem

The present invention has been made in view of the problems in the art described above. It is therefore an object of the invention to provide copolymers which have a double bond in a side chain and are substantially free of unsaturated bonds in the main chain, copolymers which have a cyclic structure and are substantially free of unsaturated bonds in the main chain, and processes for economically synthesizing the copolymers by copolymerizing inexpensive and low-boiling ethylene and general conjugated diene such as 1,3-butadiene.

Solution to Problem

The present inventors carried out studies to achieve the above object. They have then found that the copolymerization of at least ethylene and a conjugated diene in the presence of a specific addition polymerization catalyst effectively gives a copolymer which has a double bond in a side chain and is substantially free of unsaturated bonds in the main chain or a copolymer which has a cyclic structure in the main chain and is substantially free of unsaturated bonds in the main chain. The present invention has been completed based on the finding.

An aspect of the present invention is directed to a copolymer obtained by copolymerizing at least ethylene and a conjugated diene, wherein (1) structural units derived from the conjugated diene represent 1 to 90 mol % of all the monomer units in the copolymer, and (2) based on all the structural units derived from the conjugated diene in the copolymer, structural units resulting from 1,2-addition of the conjugated diene and having a side-chain double bond represent 0 to 90 mol %, structural units resulting from 1,4-addition of the conjugated diene represent 0 to 3 mol %, structural units resulting from 1,3-addition of the conjugated diene represent 0 to 3 mol %, and the total of structural units resulting from 1,2-addition of the conjugated diene and having a 1,2-cyclopropane skeleton and structural units resulting from 1,2-addition of the conjugated diene and having a 1,2-cyclopentane skeleton represent 4 to 100 mol %.

Preferably, the total of the structural units resulting from 1,4-addition of the conjugated diene and the structural units resulting from 1,3-addition of the conjugated diene represents 0 to 3 mol % based on all the structural units derived from the conjugated diene in the copolymer.

Preferably, the total of the structural units resulting from 1,2-addition of the conjugated diene and having a 1,2-cyclopropane skeleton and the structural units resulting from 1,2-addition of the conjugated diene and having a 1,2-cyclopentane skeleton represents 15 to 99 mol % based on all the structural units derived from the conjugated diene in the copolymer.

The copolymer preferably has a weight average molecular weight of not less than 20,000 as measured by gel permeation chromatography (GPC) relative to polystyrenes.

The copolymer preferably has a glass transition temperature (Tg) of −60 to 30° C. or does not have a glass transition temperature, and preferably has a melting point (Tm) of not more than 130° C. or does not have a melting point.

A process for producing the above copolymer according to the invention comprises copolymerizing at least ethylene and a conjugated diene in the presence of an addition polymerization catalyst comprising the following (A) and (B):

(A): a transition metal compound having a transition metal atom selected from Group 3 to Group 11 of the periodic table;
(B) at least one compound selected from:
(B-1) an organometallic compound,
(B-2) an organoaluminum oxy-compound, and
(B-3) a compound capable of reacting with the transition metal compound (A) to form an ion pair.

The transition metal compound (A) is preferably represented by Formula (I) below:

$$LMX_mY_n \qquad (I)$$

wherein L is a tridentate anionic ligand or neutral ligand represented by $RQ(Pz^1)_i(Pz^2)_{3-i}$, R is an atom or a group selected from the group consisting of a hydrogen atom, halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups, Q is an atom selected from the group consisting of boron, carbon, silicon, germanium, tin and lead, $Pz^1$ is a pyrazolyl group in which at least the position 3 is substituted with an unsubstituted aryl group, a substituted aryl group, a $C_3$ or higher alkyl group, a cycloalkyl group, an amino group or an oxyhydrocarbon group, $Pz^2$ is an unsubstituted pyrazolyl group or a substituted pyrazolyl group, i is an integer of 2 or 3, M is a transition metal atom selected from Group 3 to Group 11 of the periodic table, X is selected from a hydrogen atom, halogen atoms, an oxygen atom, hydrocarbon groups, oxygen-containing groups, sulfur-containing groups, nitrogen-containing groups, boron-containing groups, aluminum-containing groups, phosphorus-containing groups, halogen-containing groups, heterocyclic compound residues, silicon-containing groups, germanium-containing groups and tin-containing groups, Y is a neutral ligand, an inorganic salt, an inorganic compound or an organometallic compound and has an electron donating group, m is a number satisfying the valence of M, when m is 2 or greater, the plurality of atoms or groups X may be the same or different from each other, and the plurality of groups X may be linked together to form a ring, and n is an integer of 0 to 3.

Preferably, M in Formula (I) is titanium, zirconium or hafnium, and more preferably zirconium.

Preferably, the compound (A) is at least one transition metal compound selected from the group consisting of [hydrobis(3-mesitylpyrazol-1-yl) (5-mesitylpyrazol-1-yl)]borate zirconium trichloride and [hydrotris(3-mesitylpyrazol-1-yl)]borate zirconium trichloride.

Preferably, the transition metal compound (A) is represented by Formula (II) below:

[Chem. 1]

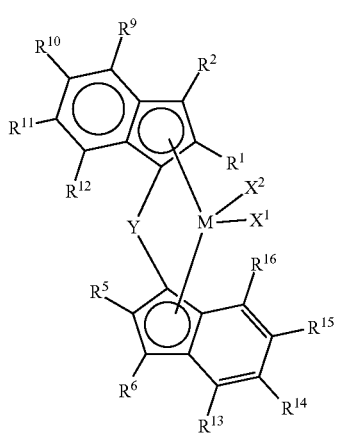

(II)

wherein M is a transition metal atom of Group 4 to Group 6 in the periodic table, $R^1, R^2, R^5, R^6, R^9, R^{10}, R^{11}, R^{12}, R^{13}, R^{14}, R^{15}$ and $R^{16}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

Preferably, $R^9$ and $R^{13}$ in Formula (II) are the same or different from each other and are each a $C_{6-20}$ hydrocarbon group, a $C_{6-20}$ halogenated hydrocarbon group, a silicon-containing group, an oxygen-containing group, a sulfur-containing group, a nitrogen-containing group or a phosphorus-containing group.

Preferably, $R^1$ and $R^5$ in Formula (II) are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

Preferably, $R^9$ and $R^{13}$ in Formula (II) are the same or different from each other and are each an aromatic group.

Preferably, the transition metal compound (A) is represented by Formula (III) below:

[Chem. 2]

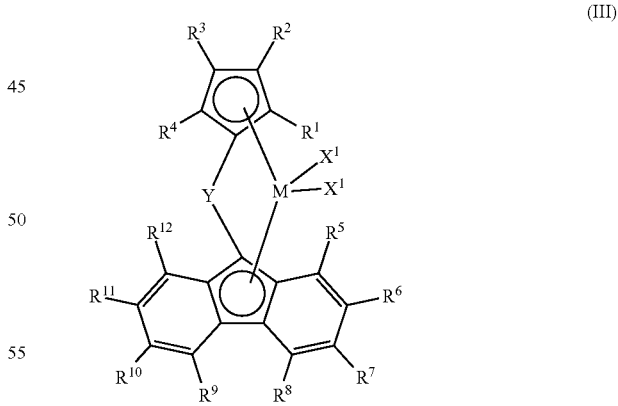

(III)

wherein M is a transition metal atom of Group 4 to Group 6 in the periodic table, $R^1, R^2$ and $R^3$ are the same or different from one another and are each a hydrogen atom, a hydrocarbon group, a halogenated hydrocarbon group, a silicon-containing group, an oxygen-containing group, a sulfur-containing group, a nitrogen-containing group or a phosphorus-containing group, $R^4$ is a hydrocarbon group, a halogenated hydrocarbon group, a silicon-containing group, an oxygen-containing group, a sulfur-containing group, a nitrogen-containing group or a phosphorus-containing group, when $R^1$, $R^2$ and $R^3$ are each a group selected from a hydrocarbon group, a halogenated hydrocarbon group, a silicon-containing group, an oxygen-containing group, a sulfur-containing group, a nitrogen-containing group and a phosphorus-containing group, $R^1$ and $R^4$, and $R^2$ and $R^3$ are not individually identical at the same time, part of the adjacent groups $R^2$, $R^3$ and $R^4$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

More preferably, the transition metal compound (A) is represented by Formula (IV) below:

[Chem. 3]

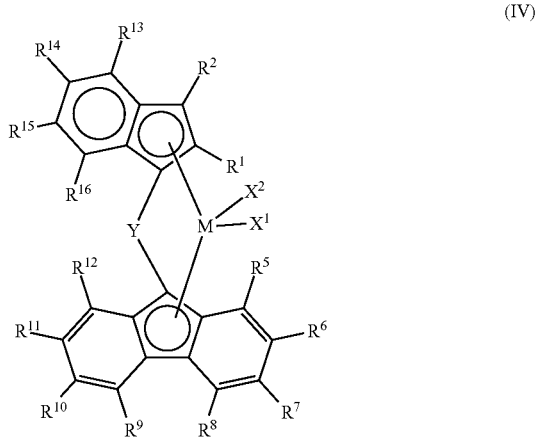

(IV)

wherein M is a transition metal atom of Group 4 to Group 6 in the periodic table, $R^1$, $R^2$, $R^{13}$, $R^{14}$, $R^{15}$ and $R^{16}$ are the same or different from one another and are each a hydrogen atom, a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, part of the adjacent groups $R^{13}$, $R^{14}$, $R^{15}$ and $R^{16}$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

Preferably, $R^1$ and $R^{13}$ in Formula (IV) are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

Preferably, $R^6$, $R^7$, $R^{10}$ and $R^{11}$ in Formula (IV) are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

Preferably, part of the adjacent groups $R^6$, $R^7$, $R^{10}$ and $R^{11}$ in Formula (IV) may be linked together to form a ring in combination with the carbon atoms to which the groups are bonded, $R^1$, $R^{13}$, $R^6$, $R^7$, $R^{10}$ and $R^{11}$ are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

Preferably, $R^{13}$ in Formula (IV) is an aromatic group.

Preferably, the transition metal compound (A) is represented by Formula (V) below:

[Chem. 4]

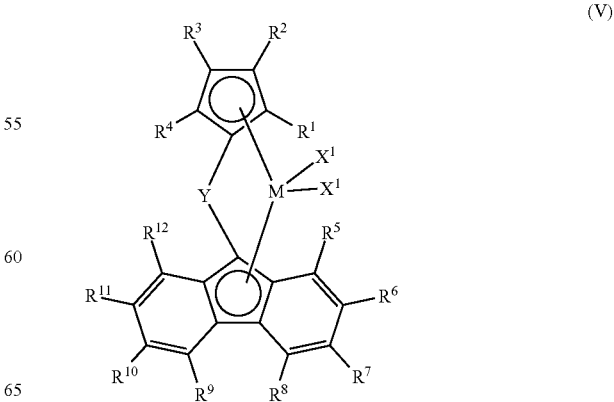

(V)

wherein M is a transition metal atom of Group 4 to Group 6 in the periodic table, $R^1$ and $R^3$ are each a hydrogen atom, $R^2$ and $R^4$ are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

Preferably, Y in Formula (V) is an arylalkylene group or an arylsilylene group.

Preferably, $R^6$, $R^7$, $R^{10}$ and $R^{11}$ in Formula (V) are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

Advantageous Effects of Invention

The copolymers according to the invention which are substantially free of unsaturated bonds in the main chain and have a cyclic structure in the main chain show excellent properties such as weathering resistance, heat resistance, oil resistance and cold resistance and have a low glass transition temperature and excellent cold resistance.

The copolymers according to the invention which are substantially free of unsaturated bonds in the main chain and have a cyclic structure in the main chain and a double bond in a side chain show excellent properties such as weathering resistance, heat resistance and oil resistance, have a low glass transition temperature and excellent cold resistance, and have excellent crosslinking efficiency and modification efficiency. In particular, the copolymers can be crosslinked or modified with organic peroxides with excellent efficiency, and are also crosslinkable with sulfur. Crosslinking the copolymers with organic peroxides gives crosslinked products which have a low surface stickiness, are free of internal bubble contamination and have excellent thermal aging resistance (heat resistance) and collapse resistance.

Further, the processes according to the invention can produce the above copolymers at low costs and with good economic efficiency on an industrial scale.

BRIEF DESCRIPTION OF DRAWING

FIG. 1 is a graph illustrating the crosslinking states at 170° C. of resin compositions of Examples 35 and 36 and Comparative Examples 17 and 18.

DESCRIPTION OF EMBODIMENTS

The present invention will be described in detail below.

[Copolymers]

A copolymer of the present invention is obtained by copolymerizing at least ethylene and a conjugated diene and is characterized in that:

(1) structural units derived from the conjugated diene represent 1 to 90 mol % of all the monomer units in the copolymer, and (2) based on all the structural units derived from the conjugated diene in the copolymer, structural units resulting from 1,2-addition of the conjugated diene and having a side-chain double bond represent 0 to 90 mol %, structural units resulting from 1,4-addition of the conjugated diene represent 0 to 3 mol %, structural units resulting from 1,3-addition of the conjugated diene represent 0 to 3 mol %, and the total of structural units resulting from 1,2-addition of the conjugated diene and having a 1,2-cyclopropane skeleton and structural units resulting from 1,2-addition of the conjugated diene and having a 1,2-cyclopentane skeleton represent 4 to 100 mol %.

The copolymers of the invention are also referred to as olefin/conjugated diene copolymers. In the invention, a double bond present in a side chain will be also referred to as a side-chain double bond. The side-chain double bond is a carbon-carbon double bond derived from the conjugated diene.

In the invention, the above proportion of the structural units from the conjugated diene relative to all the monomer units in the copolymer indicates the proportion of the structural units from the conjugated diene relative to 100 mol % of all the monomer units in the copolymer. Similarly, the above proportions of the structural units based on all the structural units derived from the conjugated diene in the copolymer, namely the proportion of the structural units resulting from 1,2-addition of the conjugated diene and having a side-chain double bond, that of the structural units resulting from 1,4-addition of the conjugated diene, that of the structural units resulting from 1,3-addition of the conjugated diene, and that of the total of the structural units resulting from 1,2-addition of the conjugated diene and having a 1,2-cyclopropane skeleton and the structural units resulting from 1,2-addition of the conjugated diene and having a 1,2-cyclopentane skeleton, indicate the proportion of the structural units resulting from 1,2-addition of the conjugated diene and having a side-chain double bond, that of the structural units resulting from 1,4-addition of the conjugated diene, that of the structural units resulting from 1,3-addition of the conjugated diene, and that of the total of the structural units resulting from 1,2-addition of the conjugated diene and having a 1,2-cyclopropane skeleton and the structural units resulting from 1,2-addition of the conjugated diene and having a 1,2-cyclopentane skeleton, respectively, relative to 100 mol % of all the structural units derived from the conjugated diene in the copolymer.

The olefin/conjugated diene copolymer usually contains structural units derived from ethylene and structural units derived from a conjugated diene. The structural units derived from a conjugated diene that are present in the copolymer include structural units resulting from 1,2-addition (used herein to include 3,4-addition) of a conjugated diene and having a side-chain double bond, structural units resulting from 1,2-addition (used herein to include 3,4-addition) of a conjugated diene and having a 1,2-cyclopropane skeleton, and structural units resulting from 1,2-addition (used herein to include 3,4-addition) of a conjugated diene and having a 1,2-cyclopentane skeleton.

The structural units resulting from 1,2-addition (used herein to include 3,4-addition) of a conjugated diene and having a 1,2-cyclopropane skeleton are structural units that have a three-membered ring (a cyclopropane ring) in the main chain resulting from 1,2-addition (used herein to include 3,4-addition). The structural units resulting from 1,2-addition (used herein to include 3,4-addition) of a conjugated diene and having a 1,2-cyclopentane skeleton are structural units that have a five-membered ring (a cyclopentane ring) in the main chain resulting from 1,2-addition (used herein to include 3,4-addition).

The copolymers of the invention do not substantially contain structural units resulting from 1,4-addition of a conjugated diene and structural units resulting from 1,3-addition of a conjugated diene. In detail, the structural units resulting from 1,4-addition of a conjugated diene represent 0 to 3 mol %, and the structural units resulting from 1,3-addition of a conjugated diene represent 0 to 3 mol % of all the structural units derived from a conjugated diene in the copolymer.

In the specification, the term 1,2-addition is used to include 1,2-addition as well as 3,4-addition.

In the copolymer of the invention, the structural units derived from a conjugated diene represent 1 to 90 mol %, preferably 6 to 80 mol %, and more preferably 7 to 80 mol % of all the monomer units in the copolymer.

In the copolymer of the invention, the structural units derived from ethylene usually represent 10 to 99 mol %, preferably 20 to 94 mol %, and more preferably 20 to 93 mol % of all the monomer units in the copolymer.

In the copolymer of the invention, the structural units resulting from 1,2-addition of a conjugated diene and having a side-chain double bond represent 0 to 90 mol %, preferably 0.5 to 90 mol %, and more preferably 1 to 80 mol % based on all the structural units derived from a conjugated diene in the copolymer.

In the copolymer of the invention, the structural units resulting from 1,4-addition of a conjugated diene represent 0 to 3 mol %, the structural units resulting from 1,3-addition of a conjugated diene represent 0 to 3 mol %, and the total of the structural units resulting from 1,4-addition of a conjugated diene and the structural units resulting from 1,3-addition of a conjugated diene preferably represents 0 to 3 mol %, and more preferably the structural units resulting from 1,4-addition of a conjugated diene represent 0 mol % and the structural units resulting from 1,3-addition of a conjugated diene represent 0 mol % (that is, the total of the structural units resulting from 1,4-addition of a conjugated diene and the structural units resulting from 1,3-addition of a conjugated diene represents 0 mol %), based on all the structural units derived from a conjugated diene in the copolymer.

When the structural units resulting from 1,4-addition of a conjugated diene and the structural units resulting from 1,3-addition of a conjugated diene represent the above proportions based on all the structural units derived from a conjugated diene in the copolymer, the copolymer achieves improvements in weathering resistance, heat resistance, crosslinking efficiency, cold resistance and modification efficiency. The above proportions also ensure that the copolymer shows excellent properties such as ozone resistance, thermal aging resistance, low-temperature properties and dynamic fatigue resistance.

In the copolymer of the invention, the total of the structural units resulting from 1,2-addition of a conjugated diene and having a 1,2-cyclopropane skeleton and the structural units resulting from 1,2-addition of a conjugated diene and having a 1,2-cyclopentane skeleton represents 4 to 100 mol %, preferably 4 to 99.5 mol %, more preferably 15 to 99 mol %, and still more preferably 20 to 99 mol % based on all the structural units derived from a conjugated diene in the copolymer. The 1,2-cyclopropane skeleton is a cis or trans three-membered ring (a cyclopropane ring), and the 1,2-cyclopentane skeleton is a cis or trans five-membered ring (a cyclopentane ring). The copolymer of the invention contains at least one of the 1,2-cyclopropane skeleton and the 1,2-cyclopentane skeleton, and may have both.

The copolymer of the invention preferably has a weight average molecular weight as measured by gel permeation chromatography (GPC) relative to polystyrenes (Mw calibrated against polystyrenes) of not less than 20,000. The upper limit of the weight average molecular weight is not particularly limited. However, the weight average molecular weight of the copolymer is usually not more than 10,000,000. The copolymer more preferably has a weight average molecular weight of 40,000 to 5,000,000. If the weight average molecular weight is below this lower limit, the copolymer may be poor in mechanical strength. If the weight average molecular weight is above this upper limit, the copolymer may show low adhesion or compatibility with other resins. The molecular weight distribution obtained from the polystyrene-calibrated weight average molecular weight and the polystyrene-calibrated number average molecular weight (Mw/Mn (weight average molecular weight/number average molecular weight)) is usually not more than 15.0, preferably not more than 10.0, more preferably not more than 9.0, and still more preferably not more than 5.0.

The copolymer of the invention usually has a glass transition temperature (Tg) of −60 to 30° C. according to differential scanning calorimetry (DSC) or does not have a glass transition temperature. The glass transition temperature is preferably −60 to 0° C., and more preferably −60 to −10° C. Further, the copolymer has a melting point (Tm) determined by the above measurement of not more than 130° C. or does not have a melting point. When the copolymer shows a melting point, the melting point is preferably not more than 100° C., and more preferably not more than 80° C. When the copolymer has a melting point, the lower limit of the melting point is not particularly limited. However, the melting point of the copolymer is usually not less than 10° C. When no melting point is observed, the copolymer is amorphous.

As described above, the copolymer of the invention is obtained by copolymerizing at least ethylene and a conjugated diene. The conjugated diene is not particularly limited. In a usual embodiment, a conjugated diene represented by Formula (i) below is used.

[Chem. 5]

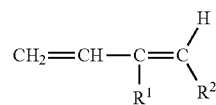

(i)

In Formula (i), $R^1$ and $R^2$ are each independently a hydrogen atom, a $C_{1-8}$ alkyl group or an aryl group, and at least one of $R^1$ and $R^2$ is a hydrogen atom.

The conjugated diene monomer (i) is not particularly limited and may be an aromatic or aliphatic conjugated diene.

Examples of the conjugated dienes include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene. These conjugated dienes may be used singly, or two or more may be used in combination. A particularly preferred conjugated diene is 1,3-butadiene which is inexpensive and has excellent copolymerizability and crosslinking efficiency. When 1,3-butadiene is used as the conjugated diene, the obtainable copolymer has a vinyl group in a side chain as a side-chain double bond.

In the copolymerization, other monomers may be used in addition to ethylene and the conjugated diene. Examples of the additional monomers include $C_{3-20}$ α-olefins, derivatives thereof, non-conjugated dienes, derivatives thereof, non-conjugated polyenes, derivatives thereof, styrene and derivatives thereof.

Examples of the $C_{3-20}$ α-olefins and the derivatives thereof include α-olefins such as propylene, 1-butene, 2-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene, and α-olefin derivatives such as 3-phenylpropylene and 4-phenylbutene.

Examples of styrene and the derivatives thereof include styrene; mono- or poly-alkyl styrenes such as o-methylstyrene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and α-methylstyrene.

Examples of the non-conjugated dienes and the derivatives thereof include 1,4-pentadiene, 1,5-hexadiene, 1,4-hexadiene, 1,4-octadiene, 1,5-octadiene, 1,6-octadiene, 1,7-octadiene, 7-methyl-1,6-octadiene and 4-ethylidene-8-methyl-1,7-nonadiene.

Examples of the non-conjugated polyenes and the derivatives thereof include 5,9-dimethyl-1,4,8-decatriene.

These additional monomers may be used singly, or two or more may be used in combination.

When the copolymer of the invention contains structural units from the additional monomer(s), the proportion of the structural units from the additional monomer(s) is preferably above 0 mol % to not more than 60 mol % based on all the monomer units. The structural units from the additional monomer(s) are preferably those derived from at least one monomer selected from $C_{3-20}$ α-olefins, derivatives thereof, styrene and derivatives thereof.

The copolymers of the invention have excellent properties such as surface hardness, abrasion resistance, vibration insulation properties, damping properties, weathering resistance, ozone resistance, thermal aging resistance, low-temperature properties and dynamic fatigue resistance, and also have good compatibility with other polar resins and fillers. Thus, the copolymers are suitably used for the production of various shaped articles such as automobile parts.

Next, a process for producing copolymers according to the invention will be described in detail.

[Copolymer Production Processes]

A copolymer production process according to the invention is a process for producing the copolymers described hereinabove. The copolymer production process includes copolymerizing at least ethylene and a conjugated diene in the presence of an addition polymerization catalyst formed of the following (A) and (B):

(A): a transition metal compound having a transition metal atom selected from Group 3 to Group 11 of the periodic table;

(B) at least one compound selected from:

(B-1) an organometallic compound, (B-2) an organoaluminum oxy-compound, and (B-3) a compound capable of reacting with the transition metal compound (A) to form an ion pair.

The compounds (A) and (B) are also referred to as the components (A) and (B), respectively.

The copolymer of the invention is obtained by copolymerizing ethylene and a conjugated diene. A production process which involves copolymerization and other reactions is complicated and economically disadvantageous in commercial production because of the plurality of steps for the copolymer production. Herein, the reactions other than the copolymerization include for example hydrogenation reaction in which hydrogen is added to a copolymer which is obtained by copolymerizing ethylene and a conjugated diene and in which the total of structural units resulting from 1,4-addition of the conjugated diene and structural units resulting from 1,3-addition of the conjugated diene represents more than 3 mol % of all the structural units derived from the conjugated diene in the copolymer.

Hereinbelow, the components (A) and (B) will be described.

[Transition Metal Compounds (A) Having Transition Metal Atom Selected from Group 3 to Group 11 of the Periodic Table]

The addition polymerization catalyst used in the copolymer production process of the invention contains a transition metal compound (A) which has a transition metal atom selected from Group 3 to Group 11 of the periodic table.

Preferred transition metal compounds (A) having a transition metal atom selected from Group 3 to Group 11 of the periodic table are those represented by Formulae (I) to (V) below. In a usual embodiment, a single transition metal compound (A) is used. However, two or more kinds may be used in combination.

[Transition Metal Compounds Represented by Formula (I)]

$$LMX_mY_n \quad (I)$$

In the formula, L is a tridentate anionic ligand or neutral ligand represented by $RQ(Pz^1)_i(Pz^2)_{3-i}$, 

R is an atom or a group selected from a hydrogen atom, halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups, Q is an atom selected from boron, carbon, silicon, germanium, tin and lead, $Pz^1$ is a pyrazolyl group in which at least the position 3 is substituted with an unsubstituted aryl group, a substituted aryl group, a $C_3$ or higher alkyl group, a cycloalkyl group, an amino group or an oxyhydrocarbon group, $Pz^2$ is an unsubstituted pyrazolyl group or a substituted pyrazolyl group, i is an integer of 2 or 3, M is a transition metal atom selected from Group 3 to Group 11 of the periodic table, X is selected from a hydrogen atom, halogen atoms, an oxygen atom, hydrocarbon groups, oxygen-containing groups, sulfur-containing groups, nitrogen-containing groups, boron-containing groups, aluminum-containing groups, phosphorus-containing groups, halogen-containing groups, heterocyclic compound residues, silicon-containing groups, germanium-containing groups and tin-containing groups, Y is a neutral ligand, an inorganic salt, an inorganic compound or an organometallic compound and has an electron donating group, m is a number satisfying the valence of M, when m is 2 or greater, the plurality of atoms or groups X may be the same or different from each other, and the plurality of groups X may be linked together to form a ring, and n is an integer of 0 to 3.

In Formula (I), L is a tridentate anionic ligand or neutral ligand represented by Formula (ii) below.

$$RQ(Pz^1)_i(Pz^2)_{3-i} \quad (ii)$$

In Formula (ii), R is an atom or a group selected from a hydrogen atom, halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups. Examples of the halogen atoms, the hydrocarbon groups, the heterocyclic compound residues, the oxygen-containing groups, the sulfur-containing groups, the nitrogen-containing groups, the boron-containing groups, the aluminum-containing groups, the phosphorus-containing groups, the halogen-containing groups, the silicon-containing groups, the germanium-containing groups and the tin-containing groups include atoms and groups that will be described for X in Formula (I).

In Formula (ii), Q is an atom selected from boron, carbon, silicon, germanium, tin and lead, and is preferably an atom selected from boron, carbon and silicon.

In Formula (ii), $Pz^1$ is a pyrazolyl group in which at least the position 3 is substituted with an unsubstituted aryl group, a substituted aryl group, a $C_3$ or higher alkyl group, a cycloalkyl group, an amino group or an oxyhydrocarbon group. Examples of the unsubstituted aryl groups include phenyl, naphthyl and fluorenyl groups. Examples of the substituted aryl groups include those corresponding to the above unsubstituted aryl groups except that one or more hydrogen atoms on the aromatic ring are substituted with a $C_{1-20}$ alkyl group, an aryl group or an aralkyl group.

Preferably, $Pz^1$ is a pyrazolyl group in which the position 3 is substituted with a 2,4,6-trimethylphenyl group, a 2,4,6-triisopropylphenyl group, a 2,3,4,5,6-pentamethylphenyl group or a 4-tert-butyl-2,6-dimethylphenyl group, and is particularly preferably a pyrazolyl group in which the position 3 is substituted with a 2,4,6-trimethylphenyl group.

In Formula (ii), $Pz^2$ is an unsubstituted pyrazolyl group or a substituted pyrazolyl group. The substituted pyrazolyl group may be as described for $Pz^1$ or may be such that a position other than the position 3 is further substituted with a substituent described for the substituted aryl group.

In Formula (ii), the letter i is 2 or 3.

Preferred examples of the transition metal compounds represented by Formula (I) include [hydrobis(3-mesitylpyrazol-1-yl)(5-mesitylpyrazol-1-yl)]borate zirconium trichloride, potassium[[hydrobis(3-mesitylpyrazol-1-yl) (5-mesitylpyrazol-1-yl)]borate titanium (III) trichloride], [hydrobis(3-mesitylpyrazol-1-yl)(5-mesitylpyrazol-1-yl)]borate hafnium trichloride and [hydrotris(3-mesitylpyrazol-1-yl)]borate zirconium trichloride, with [hydrobis(3-mesitylpyrazol-1-yl) (5-mesitylpyrazol-1-yl)]borate zirconium trichloride and [hydrotris(3-mesitylpyrazol-1-yl)]borate zirconium trichloride being more preferable.

The compound represented by Formula (I) may form a complex such as a dimer, a trimer or an oligomer by bonding together through the neutral ligand Y. In another embodiment, the compound may form a bridged structure, for example μ-oxo compound, through the neutral ligand.

Specific examples of the transition metal compounds represented by Formula (I) are described below. In the specification, the methyl group may be abbreviated to Me, the t-butyl group to t-Bu, the n-butyl group to n-Bu, the trimethylsilyl group to TMS, the phenyl group to Ph, and the mesityl group (the 2,4,6-trimethylphenyl group) to Ms.

[Chem. 6]

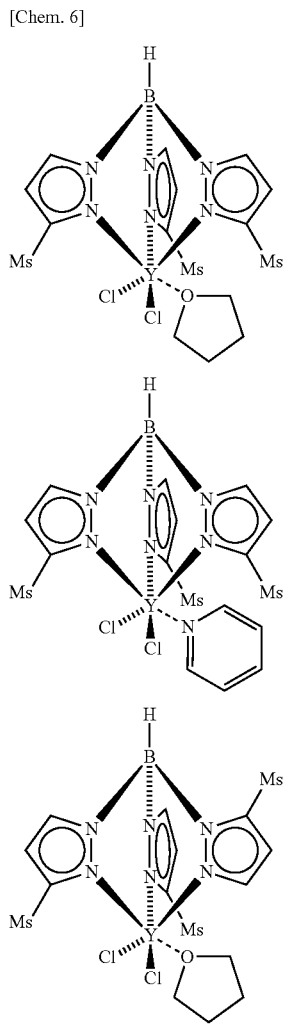

-continued
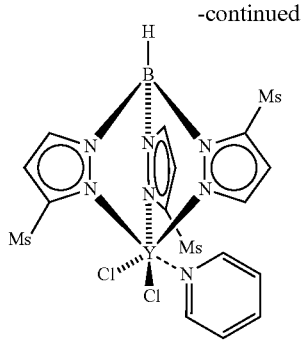
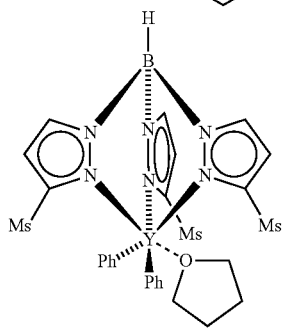
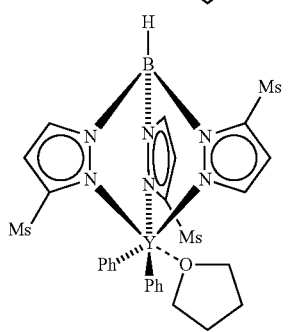
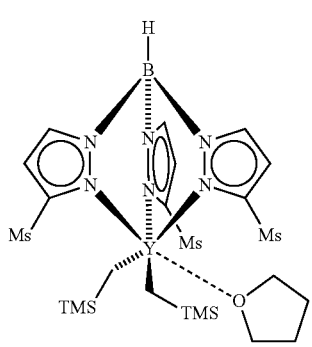
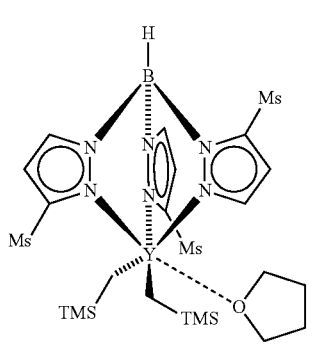
-continued
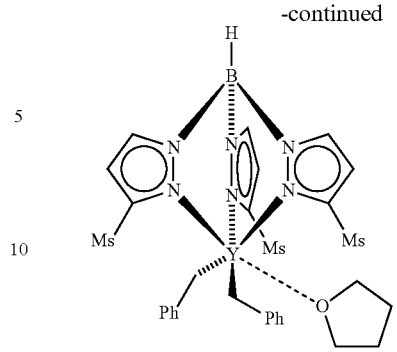
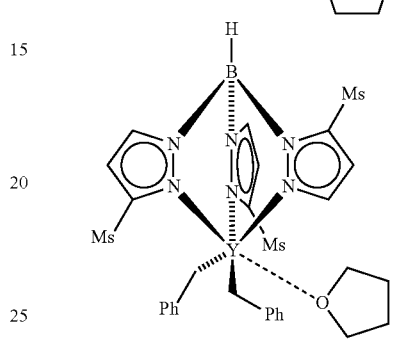
[Chem. 7]
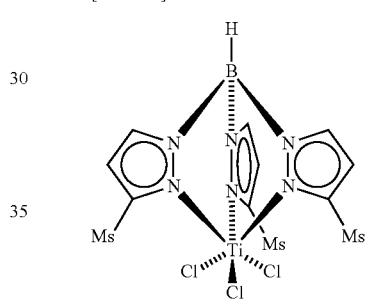
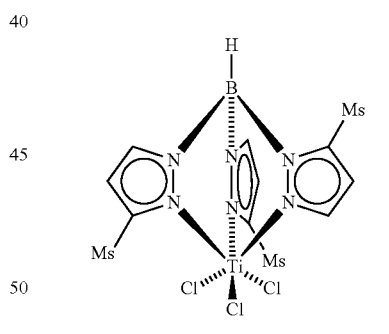
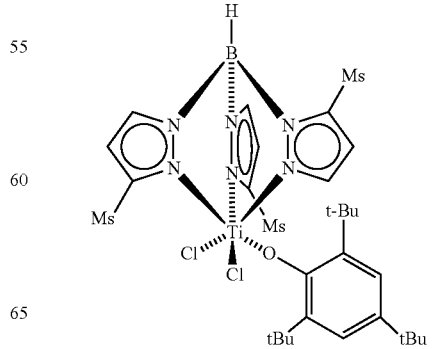

-continued
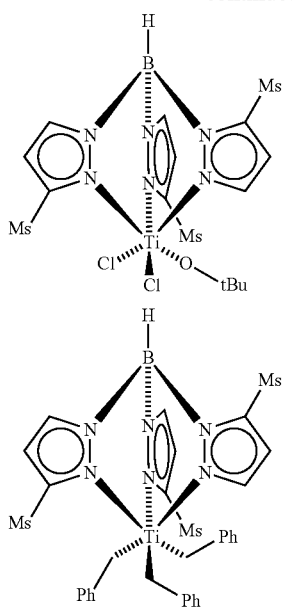
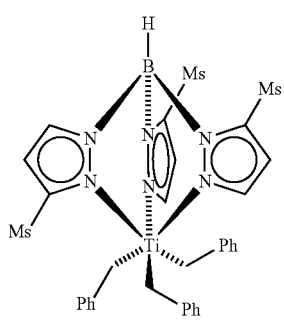
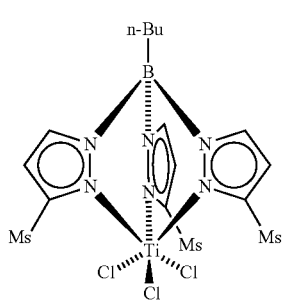
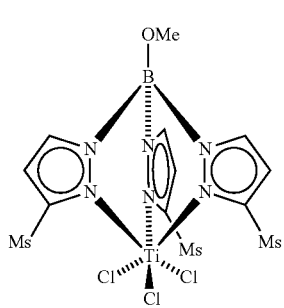
-continued
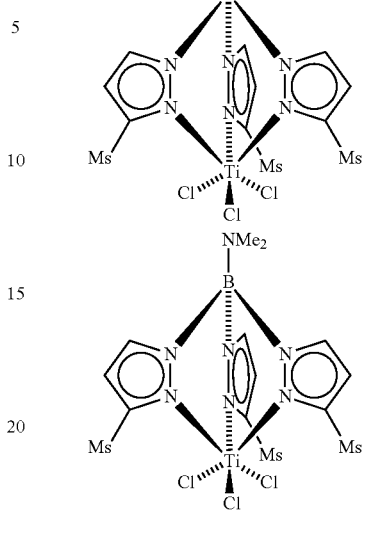
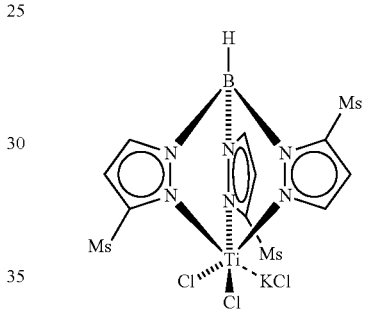
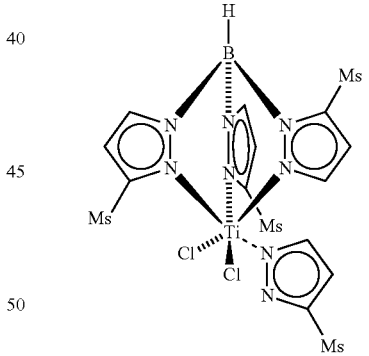
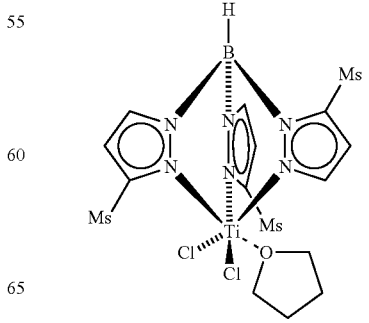

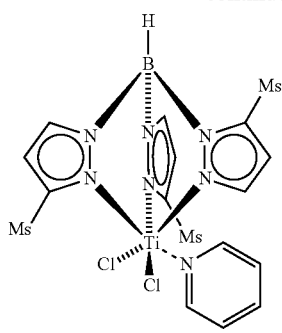
[Chem. 8]
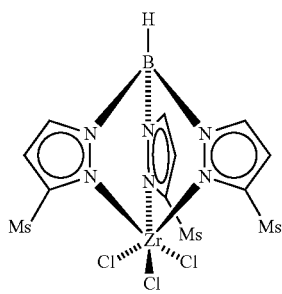
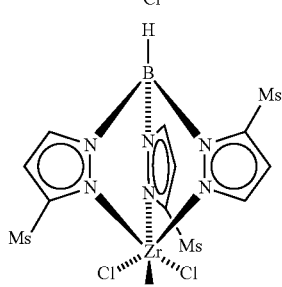
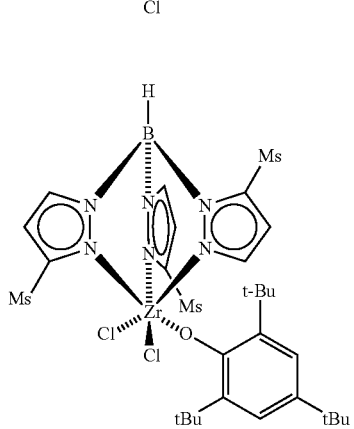
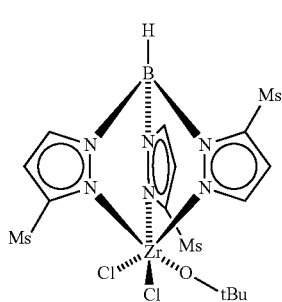
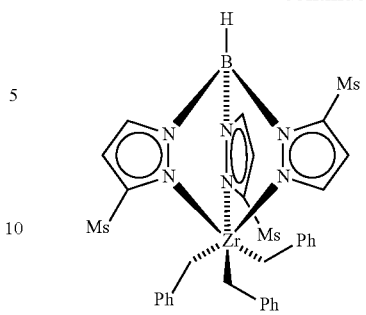
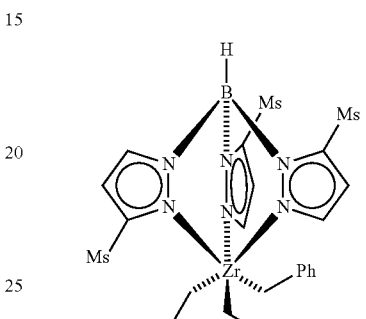
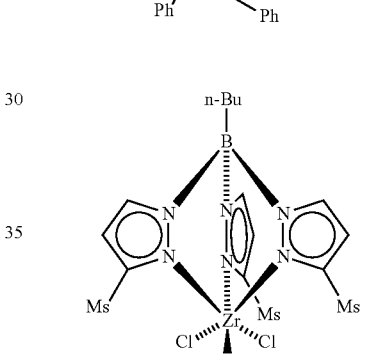
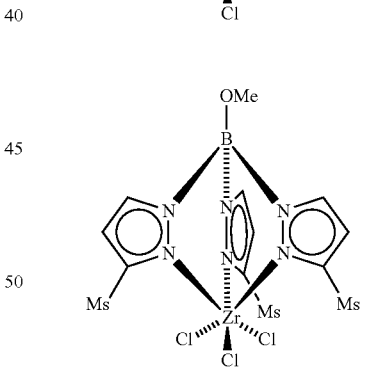
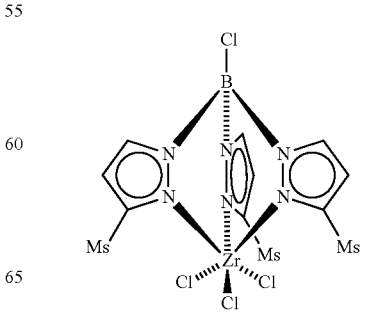

-continued
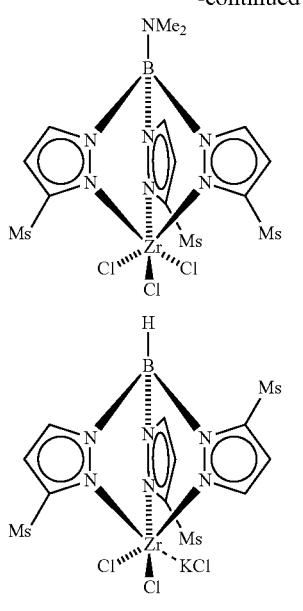
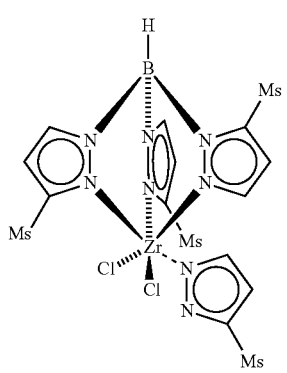
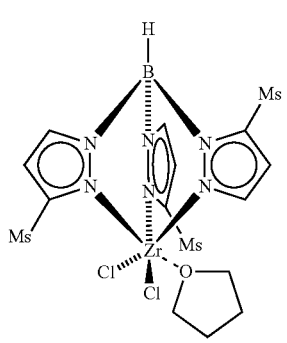
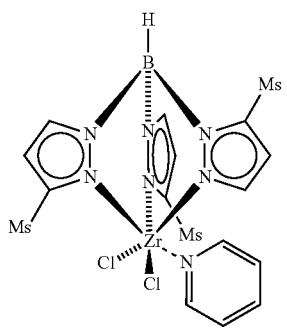
-continued
[Chem. 9]
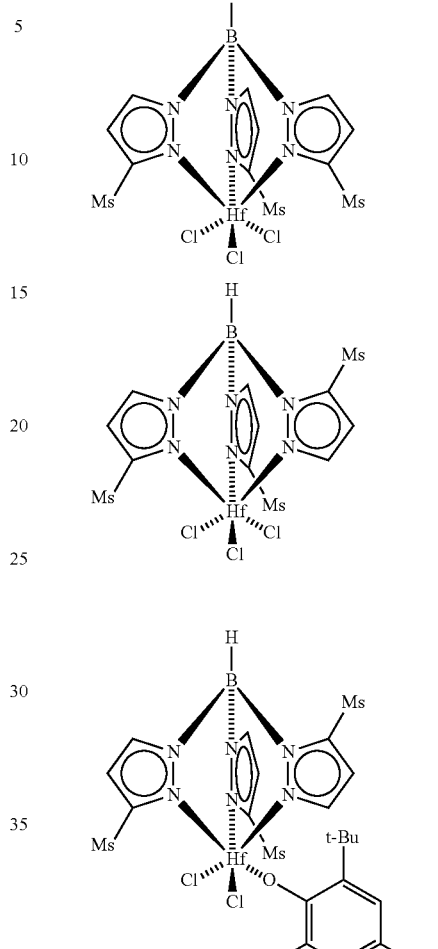
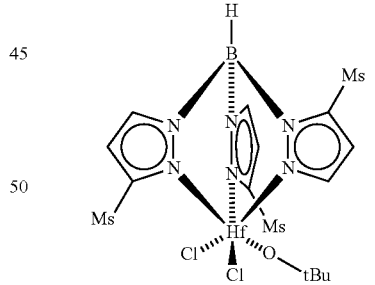
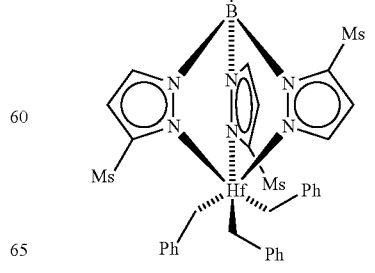

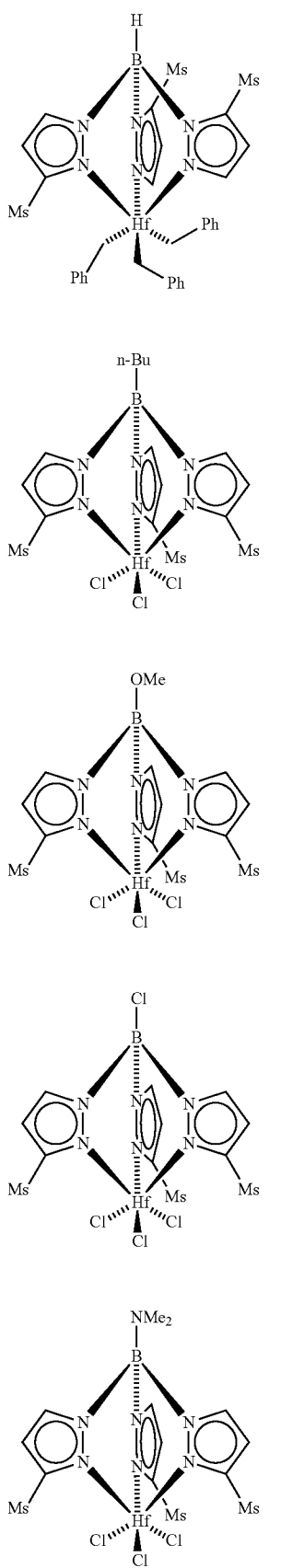
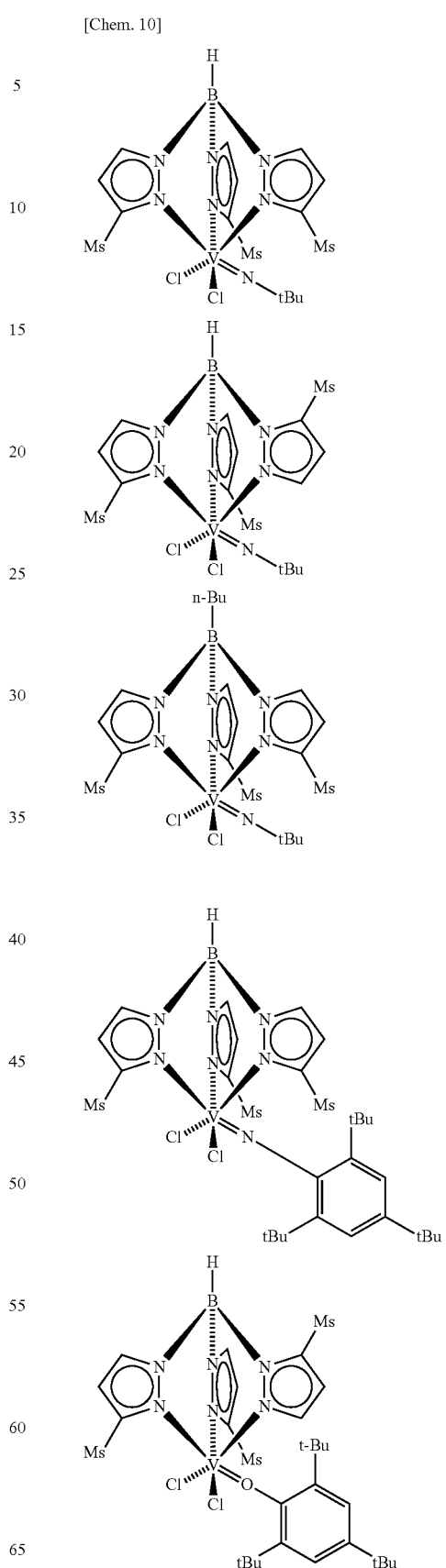
[Chem. 10]

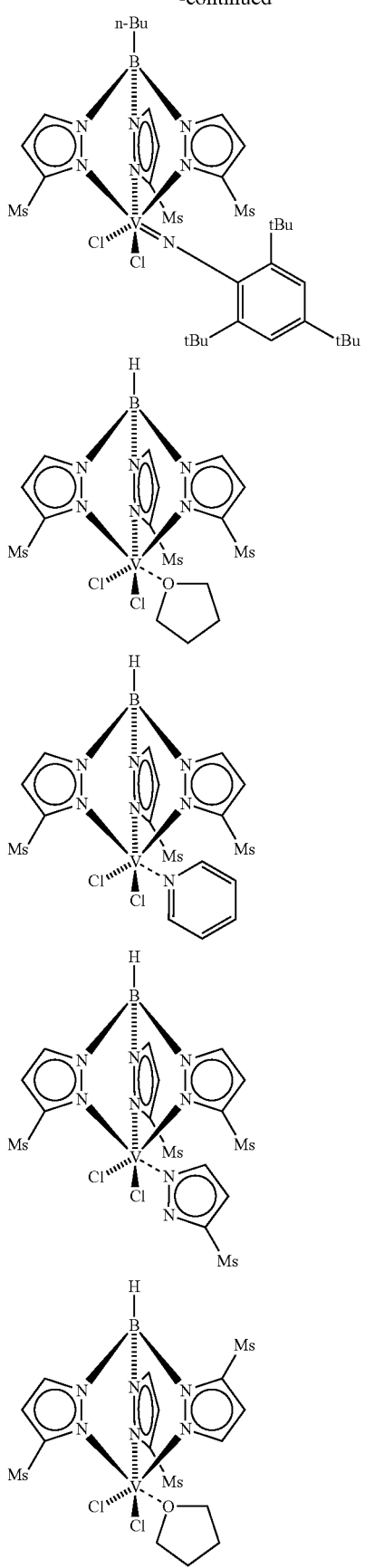
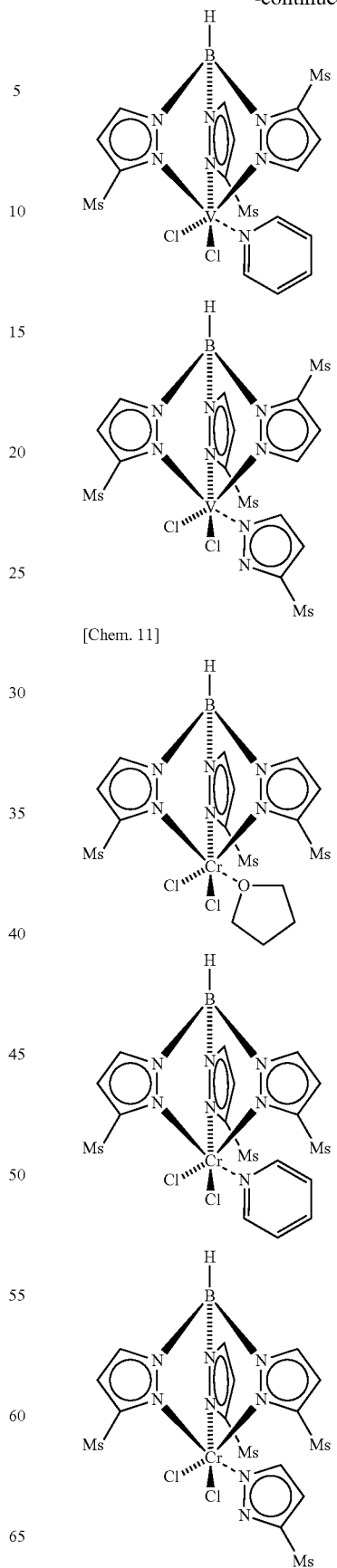
[Chem. 11]

-continued
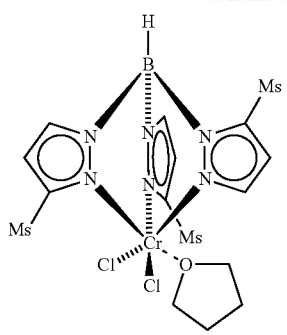
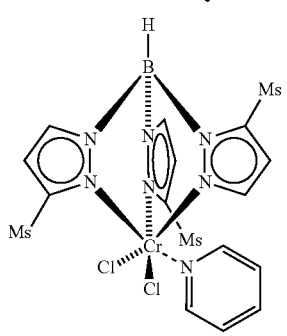
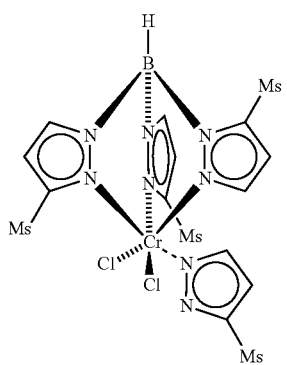
[Chem. 12]
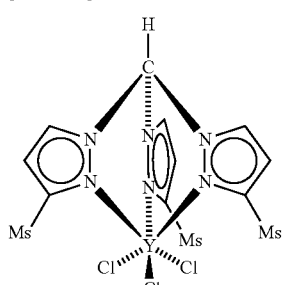
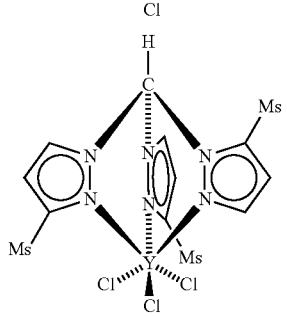
-continued
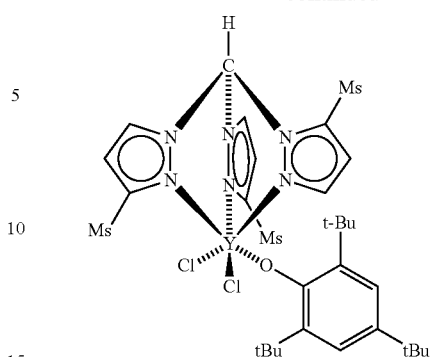
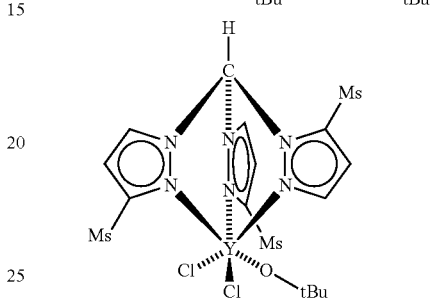
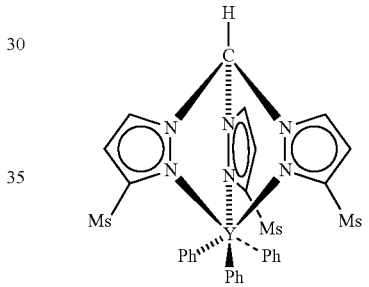
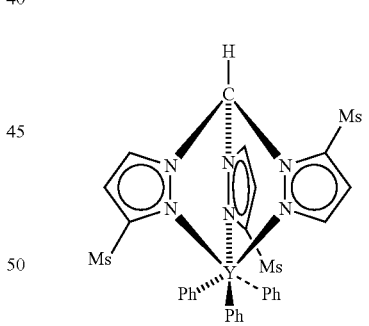
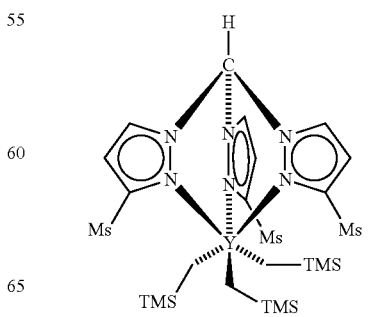

31
-continued
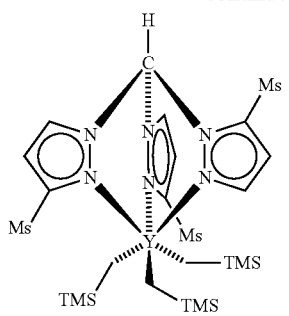
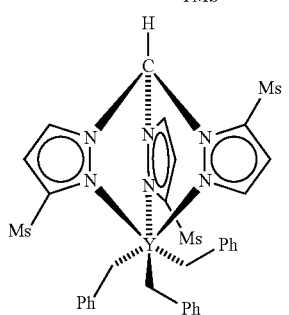
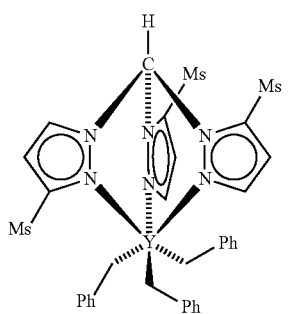
[Chem. 13]
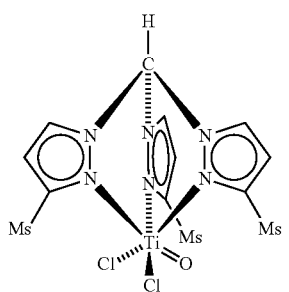
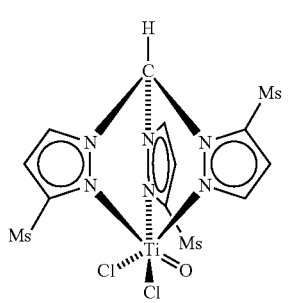
32
-continued
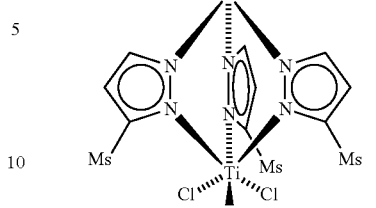
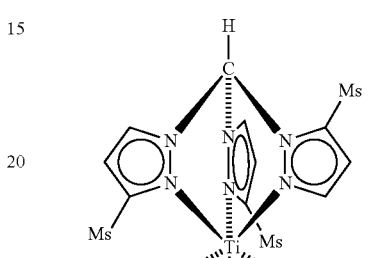
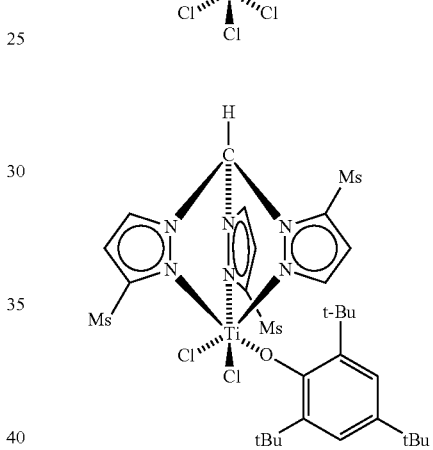
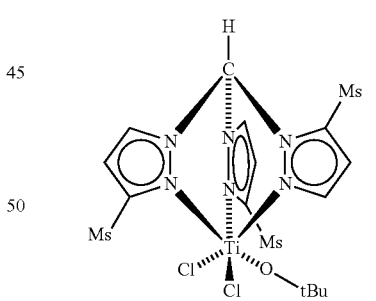
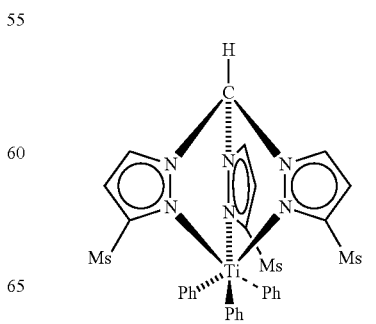

-continued
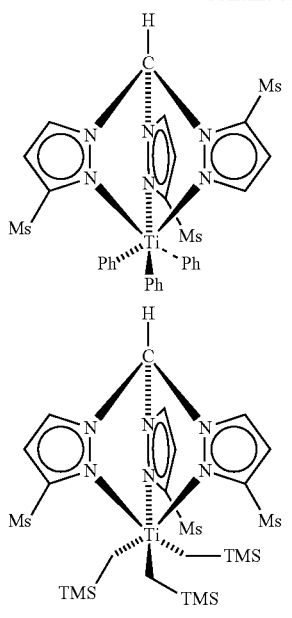
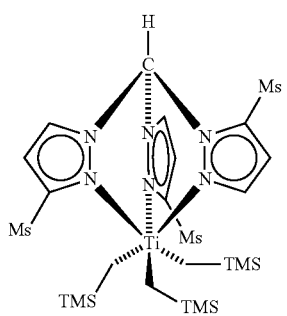
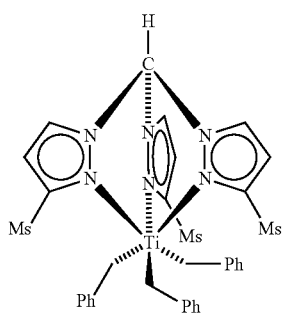
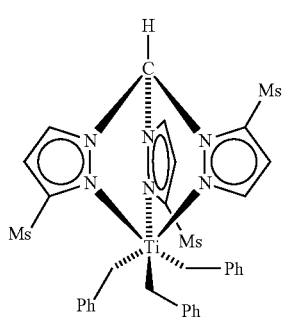
-continued
[Chem. 14]
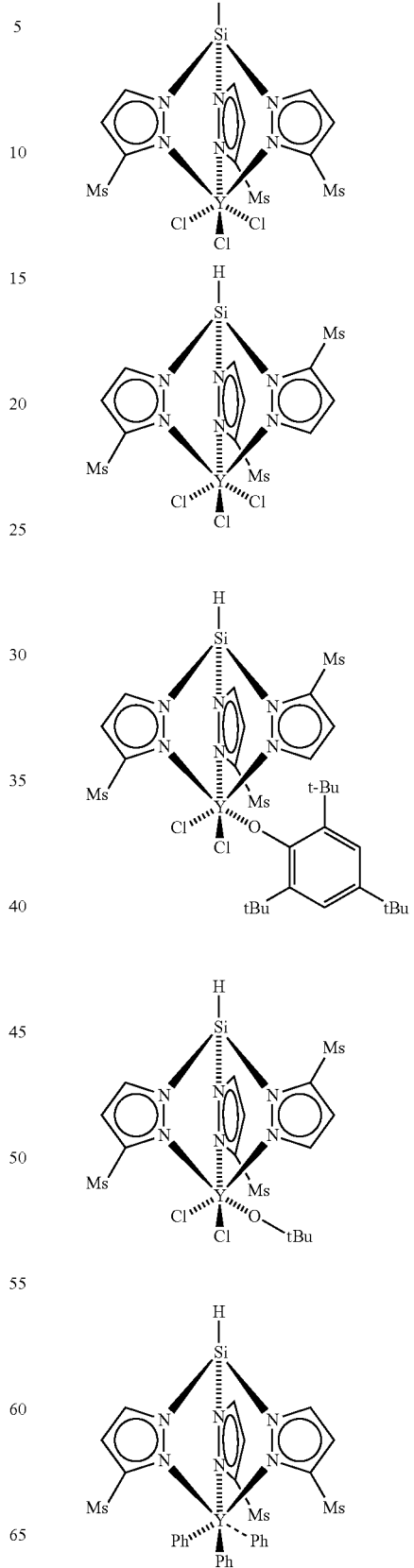

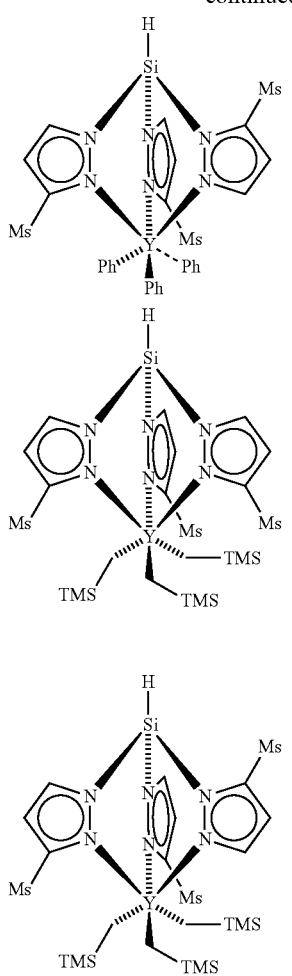
[Chem. 15]
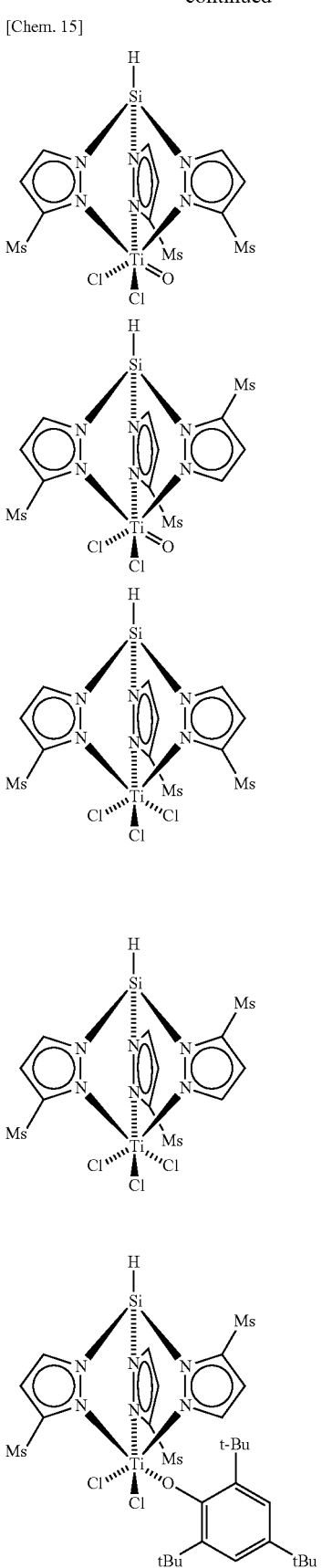

37
-continued

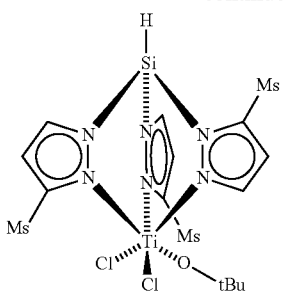

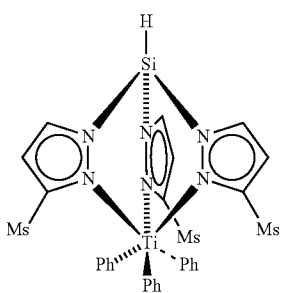

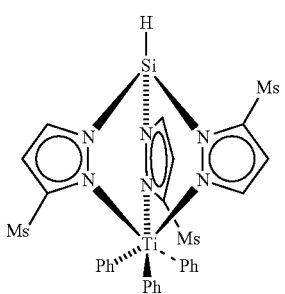

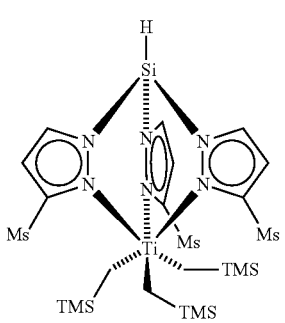

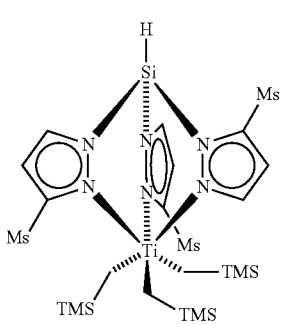

38
-continued

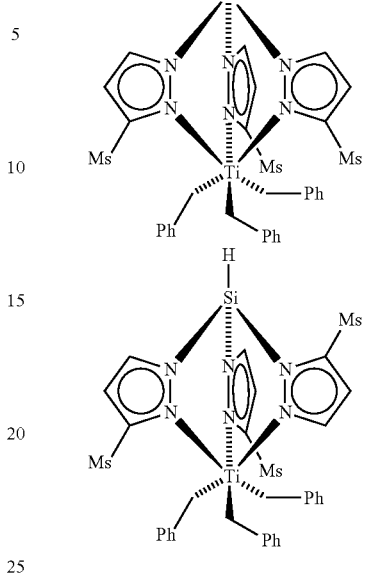

The transition metal compound represented by Formula (I) may be produced by, for example, reacting a metal salt (a) of Formula (X) below and a transition metal salt (b) of Formula (Y) below. The production usually involves a purification step in which a regioisomer of the metal salt (a) is separated in the preparation of the metal salt (a), using a chromatograph packed with a neutral or basic filler.

$$LZ_j \quad (X)$$

$$MX_mY_n \quad (Y)$$

In Formula (X), Z is a metal atom selected from Groups 1, 13 and 14 of the periodic table, and is preferably potassium, sodium, thallium or tin, and is more preferably thallium. The letter j is an integer of 0 or 1, and is preferably 1. The letter L is as described for L in Formula (I).

In Formula (Y), M, X, Y, m and n are similar to M, X, Y, m and n in Formula (I)

In a preferred embodiment, the transition metal compound represented by Formula (I) is prepared by reacting the metal salt (a) of Formula (X) and the transition metal salt (b) of Formula (Y) in a solution or a suspension thereof in a nonpolar solvent. Examples of the nonpolar solvents include petroleum ethers, hexane, carbon tetrachloride, carbon disulfide, toluene and benzene, with toluene and benzene being preferable.

Hereinbelow, there will be described an example of the production of the transition metal compound represented by Formula (I).

First, a thallium complex is synthesized which is a precursor of the transition metal compound of Formula (I) and is a metal salt (a) having a tris(pyrazolyl)borate ligand in which two or more pyrazolyl groups are substituted with an unsubstituted aryl group or a substituted aryl group at the position 3. This synthesis is made by the method described in Inorg. Chem., 1993 (32), 3471, or a method that is similar thereto. In the case where an isomeric mixture is obtained, the mixture is purified by recrystallization to remove part of the isomers which may be easily separated by recrystallization, and the resultant mixture is purified with a flash column chromatograph packed with a neutralized silica gel or alumina, thereby isolating the objective isomer. The neutralization methods for silica gel are not particularly limited. For example, silica gel may be neutralized by being stirred in an eluting solution containing triethylamine. The eluting solution for the flash column chromatography is not particularly limited. Examples thereof include petroleum ethers, hexane, carbon tetrachloride, carbon disulfide, toluene, benzene, dichloromethane, chloroform, tetrahydrofuran, diethyl ether, ethyl acetate, acetone, ethanol, methanol and mixtures of these solvents.

A transition metal salt (b) is added to the isomerically pure thallium complex obtained as described above. Subsequently, a nonpolar solvent is added, and the materials are reacted with stirring. The liquid temperature in the reaction is in the range of −80° C. to 120° C., and preferably −30 to 30° C. The nonpolar solvent used herein is, as described above, petroleum ether, hexane, carbon tetrachloride, carbon disulfide, toluene or benzene, and is preferably toluene or benzene. From the resultant reaction liquid, the transition metal compound of Formula (I) may be purely isolated by usual technique that is adopted for the purification of transition metal compounds, for example extraction or recrystallization.

The metal salt (a) used above may be a complex corresponding to the thallium complex except that thallium is replaced by potassium, sodium or tin.

In Formula (I), M is a transition metal atom selected from Group 3 to Group 11 of the periodic table. Specific examples include Group 3 metal atoms such as scandium, yttrium, lanthanoid metals and actinoid metals, Group 4 metal atoms such as titanium, zirconium and hafnium, Group 5 metal atoms such as vanadium, niobium and tantalum, Group 6 metal atoms such as chromium, molybdenum and tungsten, Group 7 metal atoms such as manganese, technetium and rhenium, Group 8 metal atoms such as iron, ruthenium and osmium, Group 9 metal atoms such as cobalt, rhodium and iridium, Group 10 metal atoms such as nickel, palladium and platinum, and Group 11 metal atoms such as copper, silver and gold. Of these metals, the Group 3 metal atoms, the Group 4 metal atoms, the Group 5 metal atoms and the Group 6 metal atoms are preferred, and yttrium, titanium, zirconium, hafnium, vanadium and chromium are particularly preferred. More preferably, the transition metal atom M is a divalent, trivalent or tetravalent, Group 4 or Group 5 transition metal atom in the periodic table, particularly preferably titanium, zirconium or hafnium, and most preferably zirconium. When the transition metal atom M is titanium or vanadium, the metal is particularly preferably trivalent.

X is a hydrogen atom, a halogen atom, an oxygen atom, a hydrocarbon group, an oxygen-containing group, a sulfur-containing group, a nitrogen-containing group, a boron-containing group, an aluminum-containing group, a phosphorus-containing group, a halogen-containing group, a heterocyclic compound residue, a silicon-containing group, a germanium-containing group or a tin-containing group. When X is an oxygen atom, M and X are bonded with a double bond.

Examples of the halogen atoms include fluorine, chlorine, bromine and iodine.

Examples of the hydrocarbon groups include alkyl groups such as methyl, ethyl, propyl, butyl, hexyl, octyl, nonyl, dodecyl and eicosyl; $C_{3-30}$ cycloalkyl groups such as cyclopentyl, cyclohexyl, norbornyl and adamantyl; alkenyl groups such as vinyl, propenyl and cyclohexenyl; arylalkyl groups such as benzyl, phenylethyl and phenylpropyl; and aryl groups such as phenyl, tolyl, dimethylphenyl, trimethylphenyl, ethylphenyl, propylphenyl, biphenyl, naphthyl, methylnaphthyl, anthryl and phenanthryl.

Examples of the oxygen-containing groups include oxy group; peroxy group; hydroxyl group; hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; acetoxy group; carbonyl group; acetylacetonate group (acac); and oxo group.

Examples of the sulfur-containing groups include sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; sulfinate groups such as methylsulfinate, phenylsulfinate, benzylsulfinate, p-toluenesulfinate, trimethylbenzenesulfinate and pentafluorobenzenesulfinate; alkylthio groups; arylthio groups; sulfate group; sulfide group; polysulfide group; and thiolate group.

Examples of the nitrogen-containing groups include amino group; alkylamino groups such as methylamino, dimethylamino, diethylamino, dipropylamino, dibutylamino and dicyclohexylamino; arylamino groups and alkylarylamino groups such as phenylamino, diphenylamino, ditolylamino, dinaphthylamino and methylphenylamino; and alkylamine and arylamine groups such as trimethylamine, triethylamine, triphenylamine, N,N,N',N'-tetramethylethylenediamine (tmeda) and N,N,N',N'-tetraphenylpropylenediamine (tppda).

Examples of the boron-containing groups include $BR_4$ (wherein R is a hydrogen atom, an alkyl group, an optionally substituted aryl group or a halogen atom).

Examples of the aluminum-containing groups include $AlR_4$ (wherein R is a hydrogen atom, an alkyl group, an optionally substituted aryl group or a halogen atom).

Examples of the phosphorus-containing groups include trialkylphosphine groups such as trimethylphosphine, tributylphosphine and tricyclohexylphosphine; triarylphosphine groups such as triphenylphosphine and tritolylphosphine; phosphite groups (phosphide groups) such as methylphosphite, ethylphosphite and phenylphosphite; phosphonate group; and phosphinate group.

Examples of the halogen-containing groups include fluorine-containing groups such as $PF_6$ and $BF_4$; chlorine-containing groups such as $ClO_4$ and $SbCl_6$; and iodine-containing groups such as $IO_4$. Examples of the halogen-containing groups further include halogenated hydrocarbon groups resulting from the halogenation of at least one hydrogen of the aforementioned hydrocarbon groups. Specific examples of the halogenated hydrocarbon groups include $C_{1-30}$ hydrocarbon groups in which at least one hydrogen has been halogenated. $C_{1-20}$ hydrocarbon groups in which at least one hydrogen has been halogenated are preferable.

Examples of the heterocyclic compound residues include residues of nitrogen-containing compounds such as pyrrole, pyridine, pyrimidine, quinoline and triazine; residues of oxygen-containing compounds such as furan and pyran; residues of sulfur-containing compounds such as thiophene; and residues resulting from the substitution of these heterocyclic compound residues with substituents such as $C_{1-30}$, preferably $C_{1-20}$ alkyl or alkoxy groups.

Examples of the silicon-containing groups include hydrocarbon-substituted silyl groups such as phenylsilyl, diphenylsilyl, trimethylsilyl, triethylsilyl, tripropylsilyl, tricyclohexylsilyl, triphenylsilyl, methyldiphenylsilyl, tritolylsilyl and trinaphthylsilyl; hydrocarbon-substituted silyl ether groups such as trimethylsilyl ether; silicon-substituted alkyl groups such as trimethylsilylmethyl; and silicon-substituted aryl groups such as trimethylsilylphenyl.

Examples of the germanium-containing groups include those groups corresponding to the aforementioned silicon-containing groups except that silicon is replaced by germanium.

Examples of the tin-containing groups include those groups corresponding to the aforementioned silicon-containing groups except that silicon is replaced by tin.

When m is 2 or greater, the plurality of atoms or groups X may be the same or different from each other, and the plurality of groups X may be linked together to form a ring.

The letter m is a number satisfying the valence of M, and is determined depending on the valence of the transition metal atom M and that of X so as to balance the positive and negative valences. Provided that the letter a indicates the absolute value of the valence of the transition metal atom M and the letter b denotes the absolute value of the valence of X, a−1=b×m. In more detail, when M is $Ti^{4+}$ and X is $Cl^-$, m is 3.

In Formula (I), Y is a neutral ligand, an inorganic salt, an inorganic compound or an organometallic compound and has an electron donating group. The letter n indicating the number of Y is an integer of 0 to 3, and is preferably 1 or 2. The term electron donating group refers to a group that has lone-pair electrons to be donated to the metal. Y may be any neutral ligand compound having an electron donating group. Examples of Y include chain or cyclic, saturated or unsaturated ethers such as diethyl ether, dimethyl ether, diisopropyl ether, tetrahydrofuran, furan, dimethylfuran, anisole, diphenyl ether and methyl-t-butyl ether; chain or cyclic, saturated or unsaturated aldehydes such as acetaldehyde, propionaldehyde, n-butylaldehyde, benzaldehyde, p-nitrobenzaldehyde, p-tolualdehyde and phenylacetaldehyde; chain or cyclic, saturated or unsaturated ketones such as acetone, methyl ethyl ketone, methyl n-propyl ketone, acetophenone, benzophenone, n-butyrophenone and benzyl methyl ketone; chain or cyclic, saturated or unsaturated amides such as formamide, acetamide, benzamide, n-valeramide, stearylamide, N,N-dimethylformamide, N,N-dimethylacetamide, N,N-diethylpropionamide and N,N-dimethyl-n-butylamide; chain or cyclic, saturated or unsaturated anhydrides such as acetic anhydride, succinic anhydride and maleic anhydride; chain or cyclic, saturated or unsaturated imides such as succinimide and phthalimide; chain or cyclic, saturated or unsaturated esters such as methyl acetate, ethyl acetate, benzyl acetate, phenyl acetate, ethyl formate, ethyl propionate, ethyl stearate and ethyl benzoate; chain or cyclic, saturated or unsaturated amines such as trimethylamine, triethylamine, triphenylamine, dimethylamine, aniline, pyrrolidine, piperidine and morpholine; nitrogen-containing heterocyclic compounds such as pyridine, α-picoline, β-picoline, quinoline, isoquinoline, 2-methylpyridine, pyrrole, oxazole, imidazole, pyrazole and indole; sulfur-containing heterocyclic compounds such as thiophene and thiazole; phosphines such as trimethylphosphine, triethylphosphine, tri-n-butylphosphine and triphenylphosphine; saturated or unsaturated nitriles such as acetonitrile and benzonitrile; inorganic salts such as lithium chloride, sodium chloride, potassium chloride, magnesium chloride and calcium chloride; inorganic compounds such as carbon monoxide and carbon dioxide; and organometallic compounds such as organometallic compounds (B-1) described later. Part of the compounds may be substituted with substituents such as alkyl groups, halogen groups, nitro group, carbonyl group and amino group. Of these neutral ligand compounds Y in Formula (I), unsaturated ethers, unsaturated aldehydes, unsaturated ketones, nitrogen-containing heterocyclic compounds and inorganic salts are preferred.

[Transition Metal Compounds Represented by Formula (II)]

[Chem. 16]

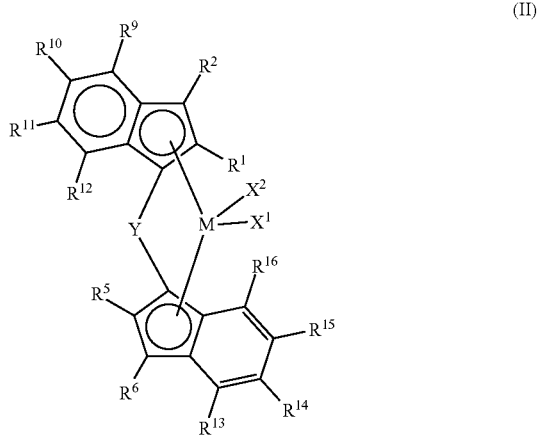

(II)

In the formula, M is a transition metal atom of Group 4 to Group 6 in the periodic table, $R^1, R^2, R^5, R^6, R^9, R^{10}, R^{11}, R^{12}, R^{13}, R^{14}, R^{15}$ and $R^{16}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group, a hydrogen atom or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —$SO_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

In Formula (II), M is a transition metal atom of Group 4 to Group 6 in the periodic table. In detail, the metal is titanium, zirconium, hafnium, vanadium, niobium, tantalum, chromium, molybdenum or tungsten, preferably titanium, zirconium or hafnium, and particularly preferably zirconium.

In Formula (II), $R^1, R^2, R^5, R^6, R^9, R^{10}, R^{11}, R^{12}, R^{13}, R^{14}$, $R^{15}$ and $R^{16}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded.

In order to achieve a higher activity and increase the molecular weight, it is preferable that $R^9$ and $R^{13}$ in Formula (II) are the same or different from each other and are each a $C_{6-20}$ hydrocarbon group, a $C_{6-20}$ halogenated hydrocarbon group, a silicon-containing group, an oxygen-containing group, a sulfur-containing group, a nitrogen-containing group or a phosphorus-containing group.

In order to achieve a higher activity and increase the molecular weight, it is also preferable that $R^1$ and $R^5$ in Formula (II) are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

In order to achieve a higher activity and increase the molecular weight, it is also preferable that $R^9$ and $R^{13}$ in Formula (II) are the same or different from each other and are each an aromatic group.

Examples of the $C_{1-20}$ hydrocarbon groups include alkyl groups such as methyl, ethyl, n-propyl, isopropyl, n-butyl, isobutyl, sec-butyl, tert-butyl, n-pentyl, neopentyl, n-hexyl and cyclohexyl; alkenyl groups such as vinyl and propenyl; phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, aromatic groups such as phenyl, α-naphthyl, β-naphthyl, anthracenyl and phenanthryl are preferred.

Examples of the $C_{1-20}$ halogenated hydrocarbon groups include the above $C_{1-20}$ hydrocarbon groups in which at least one hydrogen atom has been substituted with a halogen atom such as fluorine, chlorine, bromine or iodine, with specific examples including trifluoromethyl, and $C_{6-20}$ halogenated aryl groups such as 2,3,4,5,6-pentafluorophenyl, 3,5-difluorophenyl and 3,5-ditrifluoromethylphenyl.

Examples of the silicon-containing groups include hydrocarbon-substituted silyl groups of 1 to 20 carbon atoms such as trimethylsilyl, methyldiphenylsilyl, dimethylphenylsilyl and triphenylsilyl.

Examples of the oxygen-containing groups include oxy group; peroxy group; hydroxyl group; hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; acetoxy group; carbonyl group; acetylacetonate group (acac); and oxo group.

Examples of the sulfur-containing groups include substituents corresponding to the above oxygen-containing compounds except that oxygen is replaced by sulfur; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; sulfinate groups such as methylsulfinate, phenylsulfinate, benzylsulfinate, p-toluenesulfinate, trimethylbenzenesulfinate and pentafluorobenzenesulfinate; alkylthio groups; arylthio groups; sulfate group; sulfide group; polysulfide group; and thiolate group.

Examples of the nitrogen-containing groups include amino group; alkylamino groups such as methylamino, dimethylamino, diethylamino, dipropylamino, dibutylamino and dicyclohexylamino; arylamino groups and alkylarylamino groups such as phenylamino, diphenylamino, ditolylamino, dinaphthylamino and methylphenylamino; alkylimino groups such as methylimino, ethylimino, i-propylimino and tert-butylimino; arylimino groups such as phenylimino, 2-methylphenylimino, 2,6-dimethylphenylimino, 2,4,6-trimethylphenylimino, 2-propylphenylimino, 2,6-di-i-propylphenylimino, 2,4,6-tri-i-propylphenylimino, 2-tert-butylphenylimino, 2,6-di-tert-butylphenylimino and 2,4,6-tri-tert-butylphenylimino; and alkylamine and arylamine groups such as trimethylamine, triethylamine, triphenylamine, N,N,N',N'-tetramethylethylenediamine (tmeda) and N,N,N',N'-tetraphenylpropylenediamine (tppda).

Examples of the phosphorus-containing groups include trialkylphosphine groups such as trimethylphosphine, tributylphosphine and tricyclohexylphosphine; triarylphosphine groups such as triphenylphosphine and tritolylphosphine; phosphite groups (phosphide groups) such as methylphosphite, ethylphosphite and phenylphosphite; phosphonate group; and phosphinate group.

Preferably, $R^2$, $R^6$, $R^{10}$, $R^{11}$, $R^{12}$, $R^{14}$, $R^{15}$ and $R^{16}$ are the same or different from one another and are each a hydrogen atom, a halogen atom or a $C_{1-20}$ hydrocarbon group.

$X^1$ and $X^2$ are the same or different from each other and are each a hydrocarbon group, a halogenated hydrocarbon group, an oxygen-containing group, a sulfur-containing group, a silicon-containing group, a hydrogen atom or a halogen atom.

Examples of the hydrocarbon groups include the $C_{1-20}$ hydrocarbon groups mentioned for $R^1$, $R^2$, $R^5$, $R^6$, $R^9$, $R^{10}$, $R^{11}$, $R^{12}$, $R^{13}$, $R^{14}$, $R^{15}$ and $R^{16}$. Examples of the halogenated hydrocarbon groups include the $C_{1-20}$ halogenated hydrocarbon groups mentioned for $R^1$, $R^2$, $R^5$, $R^6$, $R^9$, $R^{10}$, $R^{11}$, $R^{12}$, $R^{13}$, $R^{14}$, $R^{15}$ and $R^{16}$.

Examples of the oxygen-containing groups include hydroxyl group; alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy.

Examples of the sulfur-containing groups include substituents corresponding to the above oxygen-containing compounds except that oxygen is replaced by sulfur; sulfonate groups such as methylsulfonate, trifluoromethanesulfonate, phenylsulfinate, benzylsulfonate, p-toluenesulfonate, trimethylbenzenesulfonate, triisobutylbenzenesulfonate, p-chlorobenzenesulfonate and pentafluorobenzenesulfonate; and sulfinate groups such as methylsulfinate, phenylsulfinate, benzenesulfinate, p-toluenesulfinate, trimethylbenzenesulfinate and pentafluorobenzenesulfinate.

Examples of the silicon-containing groups include hydrocarbon-substituted silyl groups of 1 to 20 carbon atoms such as trimethylsilyl, methyldiphenylsilyl, dimethylphenylsilyl and triphenylsilyl.

Preferably, $X^1$ and $X^2$ are the same or different from each other and are each a hydrocarbon group, a halogenated hydrocarbon group, an oxygen-containing group, a sulfur-containing group, a silicon-containing group or a halogen atom, and are more preferably each a halogen atom or a $C_{1-20}$ hydrocarbon group.

Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

Preferred examples of the divalent hydrocarbon groups include divalent $C_{1-20}$ hydrocarbon groups. Specific examples include alkylene groups such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups such as diphenylmethylene and diphenyl-1,2-ethylene.

Of the divalent hydrocarbon groups, such alkylene groups as dimethylmethylene, 1,2-ethylene, dimethyl-1,2-ethylene, 1,3-trimethylene, 1,4-tetramethylene, 1,2-cyclohexylene and 1,4-cyclohexylene; and such arylalkylene groups as diphenylmethylene and diphenyl-1,2-ethylene are preferable.

Preferred examples of the divalent halogenated hydrocarbon groups include those resulting from the halogenation of the above divalent $C_{1-20}$ hydrocarbon groups. Specific examples include halogenated products of the above divalent $C_{1-20}$ hydrocarbon groups, such as chloromethylene.

Examples of the divalent silicon-containing groups include alkylsilylene groups, alkylarylsilylene groups and arylsilylene groups such as methylsilylene, dimethylsilylene, diethylsilylene, di(n-propyl)silylene, di(iso-propyl)silylene, di(cyclohexyl)silylene, methylphenylsilylene, diphenylsilylene, di(p-tolyl)silylene and di(p-chlorophenyl)silylene; and alkyldisilyl groups, alkylaryldisilyl groups and aryldisilyl groups such as tetramethyl-1,2-disilyl and tetraphenyl-1,2-disilyl.

Examples of the divalent germanium-containing groups include those groups corresponding to the aforementioned divalent silicon-containing groups except that silicon is replaced by germanium.

Examples of the divalent tin-containing groups include those groups corresponding to the aforementioned divalent silicon-containing groups except that silicon is replaced by tin.

R is a hydrogen atom, a halogen atom, a hydrocarbon group, a halogenated hydrocarbon group or an alkoxy group. The hydrocarbon groups and the halogenated hydrocarbon groups indicated by R may be similar to the hydrocarbon groups and the halogenated hydrocarbon groups described for $X^1$ and $X^2$. The alkoxy groups indicated by R include alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy.

Specific examples of the transition metal compounds represented by Formula (II) are described below.

Examples of the transition metal compounds represented by Formula (II) include rac-dimethylsilyl-bis{1-(2-methyl-4-phenylindenyl)}zirconium dichloride,
rac-dimethylsilyl-bis{1-(2-methyl-4-(α-naphthyl)indenyl)}zirconium dichloride,
rac-dimethylsilyl-bis{1-(2-methyl-4-(β-naphthyl)indenyl)}zirconium dichloride,
rac-dimethylsilyl-bis{1-(2-methyl-4-(2-methyl-1-naphthyl)indenyl)}zirconium dichloride,
rac-dimethylsilyl-bis{1-(2-methyl-4-(5-acenaphthyl) indenyl)}zirconium dichloride,
rac-dimethylsilyl-bis{1-(2-methyl-4-(9-anthracenyl) indenyl)}zirconium dichloride,
rac-dimethylsilyl-bis{1-(2-methyl-4-(9-phenanthryl) indenyl)}zirconium dichloride,
rac-dimethylsilyl-bis{1-(2-methyl-4-(o-methylphenyl) indenyl)}zirconium dichloride,
rac-dimethylsilyl-bis{1-(2-methyl-4-(m-methylphenyl) indenyl)}zirconium dichloride,
rac-dimethylsilyl-bis{1-(2-methyl-4-(p-methylphenyl) indenyl)}zirconium dichloride,
rac-dimethylsilyl-bis{1-(2-methyl-4-(2,3-dimethylphenyl) indenyl)}zirconium dichloride,
rac-dimethylsilyl-bis{1-(2-methyl-4-(2,4-dimethylphenyl) indenyl)}zirconium dichloride,
rac-dimethylsilyl-bis{1-(2-methyl-4-(2,5-dimethylphenyl) indenyl)}zirconium dichloride,
rac-dimethylsilyl-bis{1-(2-methyl-4-(2,4,6-trimethyl-phenyl)indenyl)}zirconium dichloride,
rac-dimethylsilyl-bis{1-(2-methyl-4-(o-chlorophenyl) indenyl)}zirconium dichloride,
rac-dimethylsilyl-bis{1-(2-methyl-4-(m-chlorophenyl) indenyl)}zirconium dichloride,
rac-dimethylsilyl-bis{1-(2-methyl-4-(p-chlorophenyl) indenyl)}zirconium dichloride,
rac-dimethylsilyl-bis{1-(2-methyl-4-(p-trifluoromethyl-phenyl)indenyl)}zirconium dichloride,
rac-dimethylsilyl-bis{1-(2-methyl-4-(2,3-dichlorophenyl) indenyl)}zirconium dichloride,
rac-dimethylsilyl-bis{1-(2-methyl-4-(2,6-dichlorophenyl) indenyl)}zirconium dichloride,
rac-dimethylsilyl-bis{1-(2-methyl-4-(3,5-dichlorophenyl) indenyl)}zirconium dichloride,
rac-dimethylsilyl-bis{1-(2-methyl-4-(2-bromophenyl) indenyl)}zirconium dichloride,
rac-dimethylsilyl-bis{1-(2-methyl-4-(3-bromophenyl) indenyl)}zirconium dichloride,
rac-dimethylsilyl-bis{1-(2-methyl-4-(4-bromophenyl) indenyl)}zirconium dichloride,
rac-dimethylsilyl-bis{1-(2-methyl-4-(4-biphenylyl) indenyl)}zirconium dichloride,
rac-dimethylsilyl-bis{1-(2-methyl-4-(4-trimethylsilyl-phenyl)indenyl)}zirconium dichloride,
rac-dimethylsilyl-bis{1-(2-ethyl-4-phenylindenyl)}zirconium dichloride,
rac-dimethylsilyl-bis{1-(2-ethyl-4-(α-naphthyl)indenyl)}zirconium dichloride,
rac-dimethylsilyl-bis{1-(2-ethyl-4-(β-naphthyl)indenyl)}zirconium dichloride,
rac-dimethylsilyl-bis{1-(2-ethyl-4-(2-methyl-1-naphthyl) indenyl)}zirconium dichloride,
rac-dimethylsilyl-bis{1-(2-ethyl-4-(5-acenaphthyl) indenyl)}zirconium dichloride,
rac-dimethylsilyl-bis{1-(2-ethyl-4-(9-anthracenyl) indenyl)}zirconium dichloride,
rac-dimethylsilyl-bis{1-(2-ethyl-4-(9-phenanthryl) indenyl)}zirconium dichloride,
rac-dimethylsilyl-bis[1-(2-n-propyl-4-phenanthrylindenyl)]zirconium dichloride,
rac-dimethylsilyl-bis{1-(2-n-propyl-4-phenylindenyl)}zirconium dichloride,
rac-dimethylsilyl-bis{1-(2-n-propyl-4-(α-naphthyl) indenyl)}zirconium dichloride,
rac-dimethylsilyl-bis{1-(2-n-propyl-4-(β-naphthyl) indenyl)}zirconium dichloride,
rac-dimethylsilyl-bis{1-(2-n-propyl-4-(2-methyl-1-naphthyl)indenyl)}zirconium dichloride,
rac-dimethylsilyl-bis{1-(2-n-propyl-4-(5-acenaphthyl) indenyl)}zirconium dichloride,
rac-dimethylsilyl-bis{1-(2-n-propyl-4-(9-anthracenyl) indenyl)}zirconium dichloride,
rac-dimethylsilyl-bis{1-(2-n-propyl-4-(9-phenanthryl) indenyl)}zirconium dichloride,
rac-dimethylsilyl-bis{1-(2-n-propyl-4-(9-phenanthryl)-6-chloroindenyl)}zirconium dichloride,
rac-dimethylsilyl-bis{1-(6-chloro-2-methyl-4-(9-phenanthryl)indenyl)}zirconium dichloride,
rac-dimethylsilyl-bis{1-(6-chloro-2-ethyl-4-(9-phenanthryl) indenyl)}zirconium dichloride,
rac-dimethylsilyl-bis{1-(6-chloro-2-n-propyl-4-(9-phenanthryl)indenyl)}zirconium dichloride,
rac-dimethylsilyl-bis{1-(2-i-propyl-4-phenylindenyl)}zirconium dichloride,
rac-dimethylsilyl-bis{1-(2-i-propyl-4-(α-naphthyl) indenyl)}zirconium dichloride,
rac-dimethylsilyl-bis{1-(2-i-propyl-4-(3-naphthyl) indenyl)}zirconium dichloride, rac-dimethylsilyl-bis{1-(2-i-propyl-4-(8-methyl-9-naphthyl)indenyl)}zirconium dichloride,
rac-dimethylsilyl-bis{1-(2-i-propyl-4-(5-acenaphthyl) indenyl)}zirconium dichloride,
rac-dimethylsilyl-bis{1-(2-i-propyl-4-(9-anthracenyl) indenyl)}zirconium dichloride,
rac-dimethylsilyl-bis{1-(2-i-propyl-4-(9-phenanthryl) indenyl)}zirconium dichloride,
rac-dimethylsilyl-bis{1-(2-s-butyl-4-phenylindenyl)}zirconium dichloride,
rac-dimethylsilyl-bis{1-(2-s-butyl-4-($\alpha$-naphthyl)indenyl)}zirconium dichloride,
rac-dimethylsilyl-bis{1-(2-s-butyl-4-($\beta$-naphthyl)indenyl)}zirconium dichloride,
rac-dimethylsilyl-bis{1-(2-s-butyl-4-(2-methyl-1-naphthyl) indenyl)}zirconium dichloride,
rac-dimethylsilyl-bis{1-(2-s-butyl-4-(5-acenaphthyl) indenyl)}zirconium dichloride,
rac-dimethylsilyl-bis{1-(2-s-butyl-4-(9-anthracenyl) indenyl)}zirconium dichloride,
rac-dimethylsilyl-bis{1-(2-s-butyl-4-(9-phenanthryl) indenyl)}zirconium dichloride,
rac-dimethylsilyl-bis{1-(2-n-pentyl-4-phenylindenyl)}zirconium dichloride,
rac-dimethylsilyl-bis{1-(2-n-pentyl-4-($\alpha$-naphthyl) indenyl)}zirconium dichloride,
rac-dimethylsilyl-bis{1-(2-n-butyl-4-phenylindenyl)}zirconium dichloride,
rac-dimethylsilyl-bis{1-(2-n-butyl-4-($\alpha$-naphthyl)indenyl)}zirconium dichloride,
rac-dimethylsilyl-bis{1-(2-n-butyl-4-($\beta$-naphthyl)indenyl)}zirconium dichloride,
rac-dimethylsilyl-bis{1-(2-n-butyl-4-(2-methyl-1-naphthyl) indenyl)}zirconium dichloride,
rac-dimethylsilyl-bis{1-(2-n-butyl-4-(5-acenaphthyl) indenyl)}zirconium dichloride,
rac-dimethylsilyl-bis{1-(2-n-butyl-4-(9-anthracenyl) indenyl)}zirconium dichloride,
rac-dimethylsilyl-bis{1-(2-n-butyl-4-(9-phenanthryl) indenyl)}zirconium dichloride,
rac-dimethylsilyl-bis{1-(2-i-butyl-4-phenylindenyl)}zirconium dichloride,
rac-dimethylsilyl-bis{1-(2-i-butyl-4-($\alpha$-naphthyl)indenyl)}zirconium dichloride,
rac-dimethylsilyl-bis{1-(2-i-butyl-4-($\beta$-naphthyl)indenyl)}zirconium dichloride,
rac-dimethylsilyl-bis{1-(2-butyl-4-(2-methyl-1-naphthyl) indenyl)}zirconium dichloride,
rac-dimethylsilyl-bis{1-(2-i-butyl-4-(5-acenaphthyl) indenyl)}zirconium dichloride,
rac-dimethylsilyl-bis{1-(2-i-butyl-4-(9-anthracenyl) indenyl)}zirconium dichloride,
rac-dimethylsilyl-bis{1-(2-i-butyl-4-(9-phenanthryl) indenyl)}zirconium dichloride,
rac-dimethylsilyl-bis{1-(2-neopentyl-4-phenylindenyl)}zirconium dichloride,
rac-dimethylsilyl-bis{1-(2-neopentyl-4-($\alpha$-naphthyl) indenyl)}zirconium dichloride,
rac-dimethylsilyl-bis{1-(2-n-hexyl-4-phenylindenyl)}zirconium dichloride,
rac-dimethylsilyl-bis{1-(2-n-hexyl-4-($\alpha$-naphthyl)indenyl)}zirconium dichloride,
rac-methylphenylsilyl-bis{1-(2-ethyl-4-phenylindenyl)}zirconium dichloride,
rac-methylphenylsilyl-bis{1-(2-ethyl-4-($\alpha$-naphthyl) indenyl)}zirconium dichloride,
rac-methylphenylsilyl-bis{1-(2-ethyl-4-(9-anthracenyl) indenyl)}zirconium dichloride,
rac-methylphenylsilyl-bis{1-(2-ethyl-4-(9-phenanthryl) indenyl)}zirconium dichloride,
rac-diphenylsilyl-bis{1-(2-ethyl-4-phenylindenyl)}zirconium dichloride,
rac-diphenylsilyl-bis{1-(2-ethyl-4-($\alpha$-naphthyl)indenyl) }zirconium dichloride,
rac-diphenylsilyl-bis{1-(2-ethyl-4-(9-anthracenyl) indenyl) }zirconium dichloride,
rac-diphenylsilyl-bis{1-(2-ethyl-4-(9-phenanthryl) indenyl) }zirconium dichloride,
rac-diphenylsilyl-bis{1-(2-ethyl-4-(4-biphenylyl)indenyl) }zirconium dichloride,
rac-diphenylsilyl-bis{1-(2-n-propyl-4-phenylindenyl)}zirconium dichloride,
rac-diphenylsilyl-bis{1-(2-n-propyl-4-($\alpha$-naphthyl) indenyl) }zirconium dichloride,
rac-diphenylsilyl-bis{1-(2-n-propyl-4-(9-anthracenyl) indenyl)}zirconium dichloride,
rac-diphenylsilyl-bis{1-(2-n-propyl-4-(9-phenanthryl) indenyl)}zirconium dichloride,
rac-diphenylsilyl-bis{1-(2-n-propyl-4-(4-biphenylyl) indenyl)}zirconium dichloride,
rac-methylene-bis{1-(2-methyl-4-phenylindenyl)}zirconium dichloride,
rac-methylene-bis{1-(2-ethyl-4-phenylindenyl)}zirconium dichloride,
rac-methylene-bis{1-(2-n-propyl-4-phenylindenyl)}zirconium dichloride,
rac-methylene-bis{1-(2-methyl-4-($\alpha$-naphthyl)indenyl)}zirconium dichloride,
rac-methylene-bis{1-(2-ethyl-4-($\alpha$-naphthyl)indenyl)}zirconium dichloride,
rac-methylene-bis{1-(2-n-propyl-4-($\alpha$-naphthyl)indenyl) }zirconium dichloride,
rac-methylene-bis{1-(2-methyl-4-(9-phenanthryl)indenyl) }zirconium dichloride,
rac-methylene-bis{1-(2-ethyl-4-(9-phenanthryl)indenyl) }zirconium dichloride,
rac-methylene-bis{1-(2-n-propyl-4-(9-phenanthryl)indenyl) }zirconium dichloride,
rac-isopropylidene-bis{1-(2-methyl-4-phenylindenyl)}zirconium dichloride,
rac-isopropylidene-bis{1-(2-ethyl-4-phenylindenyl)}zirconium dichloride,
rac-isopropylidene-bis{1-(2-n-propyl-4-phenylindenyl)}zirconium dichloride,
rac-isopropylidene-bis{1-(2-methyl-4-(9-phenanthryl) indenyl)}zirconium dichloride,
rac-isopropylidene-bis{1-(2-ethyl-4-(9-phenanthryl) indenyl)}zirconium dichloride,
rac-isopropylidene-bis{1-(2-n-propyl-4-(9-phenanthryl) indenyl)}zirconium dichloride,
rac-diphenylmethylene-bis{1-(2-methyl-4-phenylindenyl) }zirconium dichloride,
rac-diphenylmethylene-bis{1-(2-ethyl-4-phenylindenyl) }zirconium dichloride,
rac-diphenylmethylene-bis{1-(2-n-propyl-4-phenylindenyl) }zirconium dichloride,
rac-diphenylmethylene-bis{1-(2-methyl-4-(9-phenanthryl) indenyl)}zirconium dichloride,
rac-diphenylmethylene-bis{1-(2-ethyl-4-(9-phenanthryl) indenyl)}zirconium dichloride,
rac-diphenylmethylene-bis{1-(2-n-propyl-4-(9-phenanthryl) indenyl)}zirconium dichloride, rac-di(p-tolyl)methylene-bis{1-(2-methyl-4-phenylindenyl)}zirconium dichloride,
rac-di(p-tolyl)methylene-bis{1-(2-ethyl-4-phenylindenyl)}zirconium dichloride,
rac-di(p-tolyl)methylene-bis{1-(2-n-propyl-4-phenyl-indenyl)}zirconium dichloride,
rac-di(p-tolyl)methylene-bis{1-(2-methyl-4-(9-phenanthryl) indenyl)}zirconium dichloride,
rac-di(p-tolyl)methylene-bis{1-(2-ethyl-4-(9-phenanthryl) indenyl)}zirconium dichloride,
rac-di(p-tolyl)methylene-bis{1-(2-n-propyl-4-(9-phenanthryl)indenyl)}zirconium dichloride,
rac-di(p-tert-butylphenyl)methylene-bis{1-(2-methyl-4-phenylindenyl)}zirconium dichloride,
rac-di(p-tert-butylphenyl)methylene-bis{1-(2-ethyl-4-phenylindenyl)}zirconium dichloride,
rac-di(p-tert-butylphenyl)methylene-bis{1-(2-n-propyl-4-phenylindenyl)}zirconium dichloride,
rac-di(p-tert-butylphenyl)methylene-bis{1-(2-methyl-4-(9-phenanthryl)indenyl)}zirconium dichloride,
rac-di(p-tert-butylphenyl)methylene-bis{1-(2-ethyl-4-(9-phenanthryl)indenyl)}zirconium dichloride,
rac-di(p-tert-butylphenyl)methylene-bis{1-(2-n-propyl-4-(9-phenanthryl)indenyl)}zirconium dichloride,
rac-(methyl)(phenyl)methylene-bis{1-(2-methyl-4-phenylindenyl)}zirconium dichloride,
rac-(methyl)(phenyl)methylene-bis{1-(2-ethyl-4-phenylindenyl)}zirconium dichloride,
rac-(methyl)(phenyl)methylene-bis{1-(2-n-propyl-4-phenylindenyl)}zirconium dichloride,
rac-(methyl)(phenyl)methylene-bis{1-(2-methyl-4-(9-phenanthryl)indenyl)}zirconium dichloride,
rac-(methyl)(phenyl)methylene-bis{1-(2-ethyl-4-(9-phenanthryl)indenyl)}zirconium dichloride,
rac-(methyl)(phenyl)methylene-bis{1-(2-n-propyl-4-(9-phenanthryl)indenyl)}zirconium dichloride,
rac-(p-tolyl)(phenyl)methylene-bis{1-(2-ethyl-4-phenylindenyl)}zirconium dichloride,
rac-(p-tolyl)(phenyl)methylene-bis{1-(2-n-propyl-4-phenylindenyl)}zirconium dichloride,
rac-(p-tolyl)(phenyl)methylene-bis{1-(2-methyl-4-(9-phenanthryl)indenyl)}zirconium dichloride,
rac-(p-tolyl)(phenyl)methylene-bis{1-(2-ethyl-4-(9-phenanthryl)indenyl)}zirconium dichloride,
rac-(p-tolyl)(phenyl)methylene-bis{1-(2-n-propyl-4-(9-phenanthryl)indenyl)}zirconium dichloride,
rac-dibenzylmethylene-bis{1-(2-ethyl-4-phenylindenyl)}zirconium dichloride,
rac-dibenzylmethylene-bis{1-(2-n-propyl-4-phenylindenyl)}zirconium dichloride,
rac-dibenzylmethylene-bis{1-(2-methyl-4-(9-phenanthryl)indenyl)}zirconium dichloride,
rac-dibenzylmethylene-bis{1-(2-ethyl-4-(9-phenanthryl)indenyl)}zirconium dichloride,
rac-dibenzylmethylene-bis{1-(2-n-propyl-4-(9-phenanthryl) indenyl)}zirconium dichloride,
rac-fluorenylidene-bis{1-(2-ethyl-4-phenylindenyl)}zirconium dichloride,
rac-fluorenylidene-bis{1-(2-n-propyl-4-phenylindenyl)}zirconium dichloride,
rac-fluorenylidene-bis{1-(2-methyl-4-(9-phenanthryl) indenyl)}zirconium dichloride,
rac-fluorenylidene-bis{1-(2-ethyl-4-(9-phenanthryl) indenyl)}zirconium dichloride,
rac-fluorenylidene-bis{1-(2-n-propyl-4-(9-phenanthryl) indenyl)}zirconium dichloride,
rac-ethylene-bis{1-(2-n-propyl-4-(α-naphthyl)indenyl)}zirconium dichloride,
rac-dimethylgermyl-bis{1-(2-ethyl-4-phenylindenyl)}zirconium dichloride,
rac-dimethylgermyl-bis{1-(2-ethyl-4-(α-naphthyl)indenyl)}zirconium dichloride,
rac-dimethylgermyl-bis{1-(2-n-propyl-4-phenylindenyl)}zirconium dichloride,
rac-dimethylsilyl-{1-(2-ethyl-4-(5-(2,2-dimethyl-2,3-dihydro-1H-cyclopentanenaphthalenyl))indenyl)}{1-(2-n-propyl-4-(5-(2,2-dimethyl-2,3-dihydro-1H-cyclopentanecyclopentanenaphthalenyl))indenyl)}zirconium dichloride,
rac-dimethylsilyl-bis[1-(2-methyl-4,5-benzoindenyl)]zirconium dichloride,
rac-dimethylsilyl-bis[1-(2-ethyl-4,5-benzoindenyl)]zirconium dichloride,
rac-dimethylsilyl-bis[1-(2-n-propyl-4,5-benzoindenyl)]zirconium dichloride,
rac-dimethylsilyl-bis[1-(2-i-propyl-4,5-benzoindenyl)]zirconium dichloride,
rac-dimethylsilyl-bis[1-(2-s-butyl-4,5-benzoindenyl)]zirconium dichloride,
rac-dimethylsilyl-bis[1-(2-n-pentyl-4,5-benzoindenyl)]zirconium dichloride,
rac-dimethylsilyl-bis[1-(2-n-hexyl-4,5-benzoindenyl)]zirconium dichloride,
rac-diphenylsilyl-bis[1-(2-methyl-4,5-benzoindenyl)]zirconium dichloride,
rac-diphenylsilyl-bis[1-(2-ethyl-4,5-benzoindenyl)]zirconium dichloride,
rac-diphenylsilyl-bis[1-(2-n-propyl-4,5-benzoindenyl)]zirconium dichloride,
rac-diphenylsilyl-bis[1-(2-i-propyl-4,5-benzoindenyl)]zirconium dichloride,
rac-diphenylsilyl-bis[1-(2-s-butyl-4,5-benzoindenyl)]zirconium dichloride,
rac-diphenylsilyl-bis[1-(2-n-pentyl-4,5-benzoindenyl)]zirconium dichloride,
rac-diphenylsilyl-bis[1-(2-n-hexyl-4,5-benzoindenyl)]zirconium dichloride,
rac-(methyl)(phenyl)silyl-bis[1-(2-methyl-4,5-benzoindenyl)]zirconium dichloride,
rac-(methyl)(phenyl)silyl-bis[1-(2-ethyl-4,5-benzoindenyl)]zirconium dichloride,
rac-(methyl)(phenyl)silyl-bis[1-(2-n-propyl-4,5-benzoindenyl)]zirconium dichloride,
rac-(methyl)(phenyl)silyl-bis[1-(2-i-propyl-4,5-benzoindenyl)]zirconium dichloride,
rac-(methyl)(phenyl)silyl-bis[1-(2-s-butyl-4,5-benzoindenyl)]zirconium dichloride,
rac-(methyl) (phenyl)silyl-bis[1-(2-n-pentyl-4,5-benzoindenyl)]zirconium dichloride,
rac-(methyl)(phenyl)silyl-bis[1-(2-n-hexyl-4,5-benzoindenyl)]zirconium dichloride,
rac-(methyl)(phenyl)silyl-bis{1-(6-chloro-2-methyl-4-(9-phenanthryl)indenyl)}zirconium dichloride,
rac-(methyl)(phenyl)silyl-bis{1-(6-chloro-2-ethyl-4-(9-phenanthryl)indenyl)}zirconium dichloride, and
rac-(methyl)(phenyl)silyl-bis{1-(6-chloro-2-n-propyl-4-(9-phenanthryl)indenyl)}zirconium dichloride.

Examples of the transition metal compounds represented by Formula (II) further include transition metal compounds that correspond to the above compounds except that the zirconium atom has been replaced by titanium, hafnium, vanadium, niobium, tantalum, chromium, molybdenum or tungsten.

The transition metal compounds represented by Formula (II) may be produced by the methods disclosed in Journal of Organometallic Chem. 288 (1985), pp. 63-67, European Patent Application No. 320762, JP-A-H04-268307, European Patent Application No. 549900, European Patent Application No. 576970, European Patent Application No. 629632 and CA2084017.

The transition metal compound represented by Formula (II) that is used as an olefin polymerization catalyst component is usually a racemic mixture. However, an R-isomer or an S-isomer may be used.

[Transition Metal Compounds Represented by Formulae (III) to (V)]

[Chem. 17]

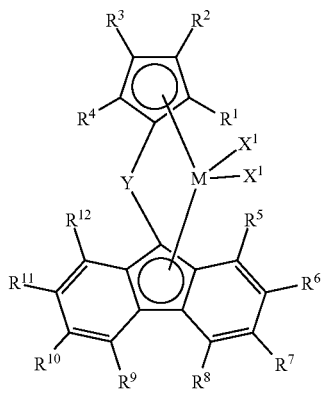

(III)

In the above formula, H is a transition metal atom of Group 4 to Group 6 in the periodic table, $R^1$, $R^2$ and $R^3$ are the same or different from one another and are each a hydrogen atom, a hydrocarbon group, a halogenated hydrocarbon group, a silicon-containing group, an oxygen-containing group, a sulfur-containing group, a nitrogen-containing group or a phosphorus-containing group, $R^4$ is a hydrocarbon group, a halogenated hydrocarbon group, a silicon-containing group, an oxygen-containing group, a sulfur-containing group, a nitrogen-containing group or a phosphorus-containing group, when $R^1$, $R^2$ and $R^3$ are each a group selected from a hydrocarbon group, a halogenated hydrocarbon group, a silicon-containing group, an oxygen-containing group, a sulfur-containing group, a nitrogen-containing group and a phosphorus-containing group, $R^1$ and $R^4$, and $R^2$ and $R^3$ are not individually identical at the same time, part of the adjacent groups $R^2$, $R^3$ and $R^4$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group, a hydrogen atom or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —$SO_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

[Chem. 18]

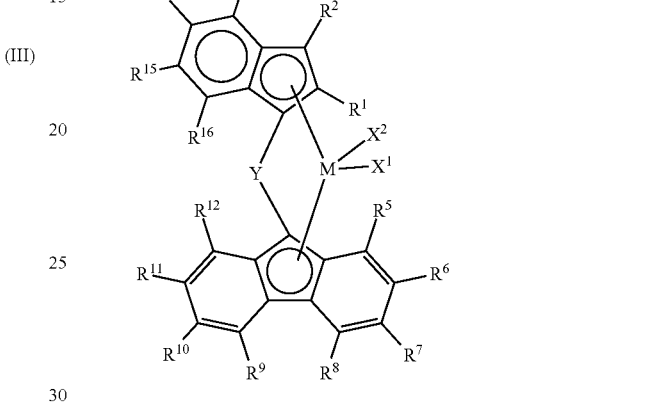

(IV)

In the above formula, M is a transition metal atom of Group 4 to Group 6 in the periodic table, $R^1$, $R^2$, $R^{13}$, $R^{14}$, $R^{15}$ and $R^{16}$ are the same or different from one another and are each a hydrogen atom, a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, part of the adjacent groups $R^{13}$, $R^{14}$, $R^{15}$ and $R^{16}$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group, a hydrogen atom or a halogen atom, and Y is a divalent hydrocarbon group, a divalent halogenated hydrocarbon group, a divalent silicon-containing group, divalent germanium-containing group, a divalent tin-containing group, —O—, —CO—, —S—, —SO—, —$SO_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

[Chem. 19]

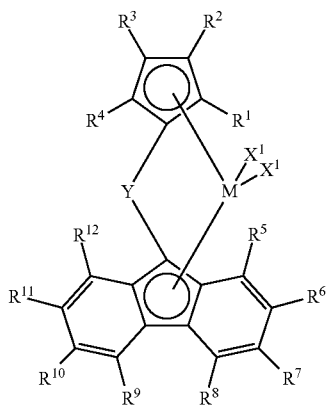

(V)

In the above formula, M is a transition metal atom of Group 4 to Group 6 in the periodic table, $R^1$ and $R^3$ are each a hydrogen atom, $R^2$ and $R^4$ are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group, a hydrogen atom or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O) (R) —, —BR— or —AlR— (wherein R is a hydrogen atom, a halogen atom, a hydrocarbon group, a halogenated hydrocarbon group or an alkoxy group).

First, the transition metal compounds represented by Formulae (III) and (V) will be described below.

The transition metal compounds having Formula (V) represent preferred examples of the transition metal compounds of Formula (III) for use in the invention.

In Formulae (III) and (V), M is a transition metal atom of Group 4 to Group 6 in the periodic table. In detail, M is titanium, zirconium, hafnium, vanadium, niobium, tantalum, chromium, molybdenum or tungsten, preferably titanium, zirconium or hafnium, and particularly preferably zirconium.

In Formula (III), $R^1$, $R^2$ and $R^3$ are the same or different from one another and are each a hydrogen atom, a hydrocarbon group, a halogenated hydrocarbon group, a silicon-containing group, an oxygen-containing group, a sulfur-containing group, a nitrogen-containing group or a phosphorus-containing group. $R^4$ is a hydrocarbon group, a halogenated hydrocarbon group, a silicon-containing group, an oxygen-containing group, a sulfur-containing group, a nitrogen-containing group or a phosphorus-containing group. When $R^1$, $R^2$ and $R^3$ are each a group selected from a hydrocarbon group, a halogenated hydrocarbon group, a silicon-containing group, an oxygen-containing group, a sulfur-containing group, a nitrogen-containing group and a phosphorus-containing group, $R^1$ and $R^4$, and $R^2$ and $R^3$ are not individually identical at the same time. Part of the adjacent groups $R^2$, $R^3$ and $R^4$ may be linked together to form a ring in combination with the carbon atoms to which the groups are bonded.

In Formula (V), $R^1$ and $R^3$ are each a hydrogen atom, and $R^2$ and $R^4$ are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

In Formulae (III) and (V), $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded.

Examples of the hydrocarbon groups include $C_{1-20}$ hydrocarbon groups described below.

The $C_{1-20}$ hydrocarbon groups include alkyl groups such as methyl, ethyl, n-propyl, isopropyl, n-butyl, isobutyl, sec-butyl, tert-butyl, n-pentyl, neopentyl, n-hexyl and cyclohexyl; alkenyl groups such as vinyl and propenyl; phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, aromatic groups such as phenyl, α-naphthyl, β-naphthyl, anthracenyl and phenanthryl are preferred.

Examples of the halogenated hydrocarbon groups include $C_{1-20}$ halogenated hydrocarbon groups described below.

The $C_{1-20}$ halogenated hydrocarbon groups include the above $C_{1-20}$ hydrocarbon groups in which at least one hydrogen atom has been substituted with a halogen atom such as fluorine, chlorine, bromine or iodine, with specific examples including trifluoromethyl, and $C_{6-20}$ halogenated aryl groups such as 2,3,4,5,6-pentafluorophenyl, 3,5-difluorophenyl and 3,5-ditrifluoromethylphenyl.

Examples of the silicon-containing groups include hydrocarbon-substituted silyl groups of 1 to 20 carbon atoms such as trimethylsilyl, methyldiphenylsilyl, dimethylphenylsilyl and triphenylsilyl.

Examples of the oxygen-containing groups include oxy group; peroxy group; hydroxyl group; hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; acetoxy group; carbonyl group; acetylacetonate group (acac); and oxo group.

Examples of the sulfur-containing groups include substituents corresponding to the above oxygen-containing compounds except that oxygen is replaced by sulfur; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; sulfinate groups such as methylsulfinate, phenylsulfinate, benzylsulfinate, p-toluenesulfinate, trimethylbenzenesulfinate and pentafluorobenzenesulfinate; alkylthio groups; arylthio groups; sulfate group; sulfide group; polysulfide group; and thiolate group.

Examples of the nitrogen-containing groups include amino group; alkylamino groups such as methylamino, dimethylamino, diethylamino, dipropylamino, dibutylamino and dicyclohexylamino; arylamino groups and alkylarylamino groups such as phenylamino, diphenylamino, ditolylamino, dinaphthylamino and methylphenylamino; alkylimino groups such as methylimino, ethylimino, i-propylimino and tert-butylimino; arylimino groups such as phenylimino, 2-methylphenylimino, 2,6-dimethylphenylimino, 2,4,6-trimethylphenylimino, 2-i-propylphenylimino, 2,6-di-i-propylphenylimino, 2,4,6-tri-i-propylphenylimino, 2-tert-butylphenylimino, 2,6-di-tert-butylphenylimino and 2,4,6-tri-tert-butylphenylimino; and alkylamine and arylamine groups such as trimethylamine, triethylamine, triphenylamine, N,N,N',N'-tetramethylethylenediamine (tmeda) and N,N,N',N'-tetraphenylpropylenediamine (tppda).

Examples of the phosphorus-containing groups include trialkylphosphine groups such as trimethylphosphine, tributylphosphine and tricyclohexylphosphine; triarylphosphine groups such as triphenylphosphine and tritolylphosphine; phosphite groups (phosphide groups) such as methylphosphite, ethylphosphite and phenylphosphite; phosphonate group; and phosphinate group.

Preferably, $R^5$, $R^8$, $R^9$ and $R^{12}$ are the same or different from one another and are each a hydrogen atom, a halogen atom or a $C_{1-20}$ hydrocarbon group.

In a preferred embodiment of Formulae (III) and (V), $R^6$, $R^7$, $R^{10}$ and $R^{11}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

In Formulae (III) and (V), $X^1$s are the same or different from each other and are each a hydrocarbon group, a halogenated hydrocarbon group, an oxygen-containing group, a sulfur-containing group, a silicon-containing group, a hydrogen atom or a halogen atom.

Examples of the hydrocarbon groups include the aforementioned $C_{1-20}$ hydrocarbon groups. Examples of the halogenated hydrocarbon groups include the aforementioned $C_{1-20}$ halogenated hydrocarbon groups.

Examples of the oxygen-containing groups include hydroxyl group; alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy.

Examples of the sulfur-containing groups include substituents corresponding to the above oxygen-containing compounds except that oxygen is replaced by sulfur; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; and sulfinate groups such as methylsulfinate, phenylsulfinate, benzenesulfinate, p-toluenesulfinate, trimethylbenzenesulfinate and pentafluorobenzenesulfinate.

Examples of the silicon-containing groups include hydrocarbon-substituted silyl groups of 1 to 20 carbon atoms such as trimethylsilyl, methyldiphenylsilyl, dimethylphenylsilyl and triphenylsilyl.

Preferably, $X^1$s in Formulae (III) and (V) are the same or different from each other and are each a hydrocarbon group, a halogenated hydrocarbon group, an oxygen-containing group, a sulfur-containing group, a silicon-containing group or a halogen atom, and are more preferably each a halogen atom or a $C_{1-20}$ hydrocarbon group.

In Formulae (III) and (V), Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

Preferred examples of the divalent hydrocarbon groups include divalent $C_{1-20}$ hydrocarbon groups. Specific examples include alkylene groups such as methylene, dimethylmethylene, 1,2-ethylene, dimethyl-1,2-ethylene, 1,3-trimethylene, 1,4-tetramethylene, 1,2-cyclohexylene and 1,4-cyclohexylene; and arylalkylene groups such as diphenylmethylene and diphenyl-1,2-ethylene.

Of the divalent hydrocarbon groups, such alkylene groups as dimethylmethylene, 1,2-ethylene, dimethyl-1,2-ethylene, 1,3-trimethylene, 1,4-tetramethylene, 1,2-cyclohexylene and 1,4-cyclohexylene; and such arylalkylene groups as diphenylmethylene and diphenyl-1,2-ethylene are preferable.

Preferred examples of the divalent halogenated hydrocarbon groups include those resulting from the halogenation of at least one hydrogen atom of the above divalent $C_{1-20}$ hydrocarbon groups. Specific examples include halogenated products of the above divalent $C_{1-20}$ hydrocarbon groups, such as chloromethylene.

Examples of the divalent silicon-containing groups include alkylsilylene groups, alkylarylsilylene groups and arylsilylene groups such as methylsilylene, dimethylsilylene, diethylsilylene, di(n-propyl)silylene, di(iso-propyl)silylene, di(cyclohexyl)silylene, methylphenylsilylene, diphenylsilylene, di(p-tolyl)silylene and di(p-chlorophenyl)silylene; and alkyldisilyl groups, alkylaryldisilyl groups and aryldisilyl groups such as tetramethyl-1,2-disilyl and tetraphenyl-1,2-disilyl.

Examples of the divalent germanium-containing groups include those groups corresponding to the aforementioned divalent silicon-containing groups except that silicon is replaced by germanium.

Examples of the divalent tin-containing groups include those groups corresponding to the aforementioned divalent silicon-containing groups except that silicon is replaced by tin.

R is a hydrogen atom, a halogen atom, a hydrocarbon group, a halogenated hydrocarbon group or an alkoxy group. The hydrocarbon groups and the halogenated hydrocarbon groups indicated by R may be similar to the hydrocarbon groups and the halogenated hydrocarbon groups described for $X^1$. The alkoxy groups indicated by R include alkoxy groups such as methoxy, ethoxy, propoxy and butoxy; aryloxy groups such as phenoxy, methylphenoxy, dimethylphenoxy and naphthoxy; and arylalkoxy groups such as phenylmethoxy and phenylethoxy.

Preferably, Y in Formulae (III) and (V) is a divalent $C_{1-20}$ hydrocarbon group or a divalent silicon-containing group, and more preferably an arylalkylene group or an arylsilylene group.

Specific examples of the transition metal compounds represented by Formula (V) include
isopropylidene(3-tert-butyl-5-methyl-cyclopentadienyl) (fluorenyl)zirconium dichloride, isopropylidene(3-tert-butyl-5-methyl-cyclopentadienyl) (2,7-di-tert-butylfluorenyl)zirconium dichloride,
isopropylidene(3-tert-butyl-5-methyl-cyclopentadienyl) (3,6-di-tert-butylfluorenyl)zirconium dichloride,
isopropylidene(3-tert-butyl-5-methyl-cyclopentadienyl) (octamethyloctahydrodibenzofluorenyl)zirconium dichloride,
diphenylmethylene(3,5-dimethyl-cyclopentadienyl) (fluorenyl)zirconium dichloride,
diphenylmethylene(3,5-dimethyl-cyclopentadienyl) (2,7-di-tert-butylfluorenyl)zirconium dichloride,
diphenylmethylene(3,5-dimethyl-cyclopentadienyl) (3,6-di-tert-butylfluorenyl)zirconium dichloride,
diphenylmethylene(3,5-dimethyl-cyclopentadienyl) (octamethyloctahydrodibenzofluorenyl)zirconium dichloride,
diphenylmethylene(3-tert-butyl-5-methyl-cyclopentadienyl) (fluorenyl)zirconium dichloride,
diphenylmethylene(3-tert-butyl-5-methyl-cyclopentadienyl) (2,7-di-tert-butylfluorenyl)zirconium dichloride,
diphenylmethylene(3-tert-butyl-5-methyl-cyclopentadienyl) (3,6-di-tert-butylfluorenyl)zirconium dichloride,
diphenylmethylene(3-tert-butyl-5-methyl-cyclopentadienyl) (octamethyloctahydrodibenzofluorenyl)zirconium dichloride,
diphenylmethylene(3-(2-adamantyl)-5-methyl-cyclopentadienyl)(fluorenyl)zirconium dichloride,
diphenylmethylene(3-(2-adamantyl)-5-methyl-cyclopentadienyl)(2,7-di-tert-butylfluorenyl) zirconium dichloride,
diphenylmethylene(3-(2-adamantyl)-5-methyl-cyclopentadienyl)(3,6-di-tert-butylfluorenyl) zirconium dichloride,
diphenylmethylene(3-(2-adamantyl)-5-methyl-cyclopentadienyl)(octamethyloctahydrodibenzo-fluorenyl)zirconium dichloride,
diphenylmethylene(3-tert-butyl-5-ethyl-cyclopentadienyl) (fluorenyl)zirconium dichloride,
diphenylmethylene(3-tert-butyl-5-ethyl-cyclopentadienyl) (2,7-di-tert-butylfluorenyl)zirconium dichloride,
diphenylmethylene(3-tert-butyl-5-ethyl-cyclopentadienyl) (3,6-di-tert-butylfluorenyl)zirconium dichloride,
diphenylmethylene(3-tert-butyl-5-ethyl-cyclopentadienyl) (octamethyloctahydrodibenzofluorenyl)zirconium dichloride,
diphenylmethylene(3-tert-butyl-2,5-dimethyl-cyclopentadienyl)(fluorenyl)zirconium dichloride,
diphenylmethylene(3-tert-butyl-2,5-dimethyl-cyclopentadienyl)(2,7-di-tert-butylfluorenyl)zirconium dichloride,
diphenylmethylene(3-tert-butyl-2,5-dimethyl-cyclopentadienyl)(3,6-di-tert-butylfluorenyl)zirconium dichloride,
diphenylmethylene(3-tert-butyl-2,5-dimethyl-cyclopentadienyl)(octamethyloctahydrodibenzofluorenyl)zirconium dichloride,
di(p-tolyl)methylene(3,5-dimethyl-cyclopentadienyl) (fluorenyl)zirconium dichloride,
di(p-tolyl)methylene(3,5-dimethyl-cyclopentadienyl) (2,7-di-tert-butylfluorenyl)zirconium dichloride,
di(p-tolyl)methylene(3,5-dimethyl-cyclopentadienyl) (3,6-di-tert-butylfluorenyl)zirconium dichloride,
di(p-tolyl)methylene(3,5-dimethyl-cyclopentadienyl) (octamethyloctahydrodibenzofluorenyl)zirconium dichloride,
di(p-tolyl)methylene(3-tert-butyl-5-methyl-cyclopenta-dienyl)(fluorenyl)zirconium dichloride,
di(p-tolyl)methylene(3-tert-butyl-5-methyl-cyclopenta-dienyl)(2,7-di-tert-butylfluorenyl)zirconium dichloride,
di(p-tolyl)methylene(3-tert-butyl-5-methyl-cyclopenta-dienyl)(3,6-di-tert-butylfluorenyl)zirconium dichloride,
di(p-tolyl)methylene(3-tert-butyl-5-methyl-cyclopenta-dienyl)(octamethyloctahydrodibenzofluorenyl)zirconium dichloride,
di(p-tolyl)methylene(3-(2-adamantyl)-5-methyl-cyclo-penta-dienyl)(fluorenyl)zirconium dichloride,
di(p-tolyl)methylene(3-(2-adamantyl)-5-methyl-cyclo-penta-dienyl)(2,7-di-tert-butylfluorenyl)zirconium dichloride,
di(p-tolyl)methylene(3-(2-adamantyl)-5-methyl-cyclo-penta-dienyl) (3,6-di-tert-butylfluorenyl)zirconium dichloride,
di(p-tolyl)methylene(3-(2-adamantyl)-5-methyl-cyclo-penta-dienyl) (octamethyloctahydrodibenzofluorenyl)zirconium dichloride,
di(p-tolyl)methylene(3-tert-butyl-5-ethyl-cyclopenta-dienyl) (fluorenyl)zirconium dichloride,
di(p-tolyl)methylene(3-tert-butyl-5-ethyl-cyclopenta-dienyl)(2,7-di-tert-butylfluorenyl)zirconium dichloride,
di(p-tolyl)methylene(3-tert-butyl-5-ethyl-cyclopenta-dienyl)(3,6-di-tert-butylfluorenyl)zirconium dichloride,
di(p-tolyl)methylene(3-tert-butyl-5-ethyl-cyclopenta-dienyl)(octamethyloctahydrodibenzofluorenyl)zirconium dichloride,
di(p-tolyl)methylene(3-tert-butyl-2,5-dimethyl-cyclopenta-dienyl)(fluorenyl)zirconium dichloride,
di(p-tolyl)methylene(3-tert-butyl-2,5-dimethyl-cyclopenta-dienyl)(2,7-di-tert-butylfluorenyl)zirconium dichloride,
di(p-tolyl)methylene(3-tert-butyl-2,5-dimethyl-cyclopenta-dienyl)(3,6-di-tert-butylfluorenyl)zirconium dichloride,
di(p-tolyl)methylene(3-tert-butyl-2,5-dimethyl-cyclopenta-dienyl)(octamethyloctahydrodibenzofluorenyl)zirconium dichloride,
di(p-tert-butylphenyl)methylene(3,5-dimethyl-cyclopenta-dienyl)(fluorenyl)zirconium dichloride,
di(p-tert-butylphenyl)methylene(3,5-dimethyl-cyclopenta-dienyl)(2,7-di-tert-butylfluorenyl)zirconium dichloride,
di(p-tert-butylphenyl)methylene(3,5-dimethyl-cyclopenta-dienyl)(3,6-di-tert-butylfluorenyl)zirconium dichloride,
di(p-tert-butylphenyl)methylene(3,5-dimethyl-cyclopenta-dienyl)(octamethyloctahydrodibenzofluorenyl)zirconium dichloride,
di(p-tert-butylphenyl)methylene(3-tert-butyl-5-methyl-cyclopentadienyl)(fluorenyl)zirconium dichloride,
di(p-tert-butylphenyl)methylene(3-tert-butyl-5-methyl-cyclopentadienyl)(2,7-di-tert-butylfluorenyl) zirconium dichloride,
di(p-tert-butylphenyl)methylene(3-tert-butyl-5-methyl-cyclopentadienyl)(3,6-di-tert-butylfluorenyl) zirconium dichloride,
di(p-tert-butylphenyl)methylene(3-tert-butyl-5-methyl-cyclopentadienyl)(octamethyloctahydrodibenzo-fluorenyl) zirconium dichloride,
di(p-tert-butylphenyl)methylene(3-(2-adamantyl)-5-methyl-cyclopentadienyl)(fluorenyl)zirconium dichloride,
di(p-tert-butylphenyl)methylene(3-(2-adamantyl)-5-methyl-cyclopentadienyl)(2,7-di-tert-butylfluorenyl) zirconium dichloride,
di(p-tert-butylphenyl)methylene(3-(2-adamantyl)-5-methyl-cyclopentadienyl)(3,6-di-tert-butylfluorenyl) zirconium dichloride,
di(p-tert-butylphenyl)methylene(3-(2-adamantyl)-5-methyl-cyclopentadienyl)(octamethyloctahydrodibenzo-fluorenyl)zirconium dichloride,
di(p-tert-butylphenyl)methylene(3-tert-butyl-5-ethyl-cyclopentadienyl)(fluorenyl)zirconium dichloride, di(p-tert-butylphenyl)methylene(3-tert-butyl-5-ethyl-cyclopentadienyl)(2,7-di-tert-butylfluorenyl) zirconium dichloride,
di(p-tert-butylphenyl)methylene(3-tert-butyl-5-ethyl-cyclopentadienyl)(3,6-di-tert-butylfluorenyl) zirconium dichloride,
di(p-tert-butylphenyl)methylene(3-tert-butyl-5-ethyl-cyclopentadienyl)(octamethyloctahydrodibenzo-fluorenyl)zirconium dichloride,
di(p-tert-butylphenyl)methylene(3-tert-butyl-2,5-dimethyl-cyclopentadienyl)(fluorenyl)zirconium dichloride,
di(p-tert-butylphenyl)methylene(3-tert-butyl-2,5-dimethyl-cyclopentadienyl)(2,7-di-tert-butylfluorenyl) zirconium dichloride,
di(p-tert-butylphenyl)methylene(3-tert-butyl-2,5-dimethyl-cyclopentadienyl)(3,6-di-tert-butylfluorenyl) zirconium dichloride,
di(p-tert-butylphenyl)methylene(3-tert-butyl-2,5-dimethyl-cyclopentadienyl)(octamethyloctahydrodibenzo-fluorenyl)zirconium dichloride,
(methyl)(phenyl)methylene(3-tert-butyl-5-methyl-cyclopentadienyl)(fluorenyl)zirconium dichloride,
(methyl)(phenyl)methylene(3-tert-butyl-5-methyl-cyclopentadienyl)(2,7-di-tert-butylfluorenyl) zirconium dichloride,
(methyl)(phenyl)methylene(3-tert-butyl-5-methyl-cyclopentadienyl)(3,6-di-tert-butylfluorenyl) zirconium dichloride,
(methyl)(phenyl)methylene(3-tert-butyl-5-methyl-cyclopentadienyl)(octamethyloctahydrodibenzo-fluorenyl)zirconium dichloride,
(p-tolyl)(phenyl)methylene(3-tert-butyl-5-methyl-cyclopentadienyl)(fluorenyl)zirconium dichloride,
(p-tolyl)(phenyl)methylene(3-tert-butyl-5-methyl-cyclopentadienyl)(2,7-di-tert-butylfluorenyl) zirconium dichloride,
(p-tolyl)(phenyl)methylene(3-tert-butyl-5-methyl-cyclopentadienyl)(3,6-di-tert-butylfluorenyl) zirconium dichloride,
(p-tolyl)(phenyl)methylene(3-tert-butyl-5-methyl-cyclopentadienyl)(octamethyloctahydrodibenzo-fluorenyl)zirconium dichloride,
dibenzylmethylene(3-tert-butyl-5-methyl-cyclopentadienyl)(fluorenyl)zirconium dichloride,
dibenzylmethylene(3-tert-butyl-5-methyl-cyclopentadienyl)(2,7-di-tert-butylfluorenyl)zirconium dichloride,
dibenzylmethylene(3-tert-butyl-5-methyl-cyclopentadienyl)(3,6-di-tert-butylfluorenyl)zirconium dichloride,
dibenzylmethylene(3-tert-butyl-5-methyl-cyclopentadienyl)(octamethyloctahydrodibenzofluorenyl)zirconium dichloride,
fluorenylidene(3-tert-butyl-5-methyl-cyclopentadienyl)(fluorenyl)zirconium dichloride,
fluorenylidene(3-tert-butyl-5-methyl-cyclopentadienyl)(2,7-di-tert-butylfluorenyl)zirconium dichloride,
fluorenylidene(3-tert-butyl-5-methyl-cyclopentadienyl)(3,6-di-tert-butylfluorenyl)zirconium dichloride,
fluorenylidene(3-tert-butyl-5-methyl-cyclopentadienyl) (octamethyloctahydrodibenzofluorenyl)zirconium dichloride,
diphenylmethylene(3-tert-butyl-5-methyl-cyclopentadienyl)(fluorenyl)titanium dichloride,
diphenylmethylene(3-tert-butyl-5-methyl-cyclopentadienyl)(2,7-di-tert-butylfluorenyl)titanium dichloride,
diphenylmethylene(3-tert-butyl-5-methyl-cyclopentadienyl)(3,6-di-tert-butylfluorenyl)titanium dichloride,
diphenylmethylene(3-tert-butyl-5-methyl-cyclopentadienyl)(octamethyloctahydrodibenzofluorenyl)titanium dichloride,
diphenylmethylene(3-tert-butyl-5-methyl-cyclopentadienyl)(fluorenyl)hafnium dichloride,
diphenylmethylene(3-tert-butyl-5-methyl-cyclopentadienyl)(2,7-di-tert-butylfluorenyl)hafnium dichloride,
diphenylmethylene(3-tert-butyl-5-methyl-cyclopentadienyl)(3,6-di-tert-butylfluorenyl)hafnium dichloride, and
diphenylmethylene(3-tert-butyl-5-methyl-cyclopentadienyl)(octamethyloctahydrodibenzofluorenyl)hafnium dichloride.

Examples of the transition metal compounds represented by Formula (V) further include transition metal compounds that correspond to the above compounds except that the zirconium atom has been replaced by titanium, hafnium, vanadium, niobium, tantalum, chromium, molybdenum or tungsten.

The transition metal compounds represented by Formula (V) may be produced by the methods disclosed in WO 2004/087775 and WO 2001/27124.

Next, the transition metal compounds represented by Formula (IV) will be described.

The transition metal compounds having Formula (IV) represent preferred examples of the transition metal compounds of Formula (III) for use in the invention.

In Formula (IV), M is a transition metal atom of Group 4 to Group 6 in the periodic table. In detail, M is titanium, zirconium, hafnium, vanadium, niobium, tantalum, chromium, molybdenum or tungsten, preferably titanium, zirconium or hafnium, and particularly preferably zirconium.

In Formula (IV), $R^1$, $R^2$, $R^{13}$, $R^{14}$, $R^{15}$ and $R^{16}$ are the same or different from one another and are each a hydrogen atom, a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group. Part of the adjacent groups $R^{13}$, $R^{14}$, $R^{15}$ and $R^{16}$ may be linked together to form a ring in combination with the carbon atoms to which the groups are bonded.

In Formula (IV) $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded.

Examples of the $C_{1-20}$ hydrocarbon groups include alkyl groups such as methyl, ethyl, n-propyl, isopropyl, n-butyl, isobutyl, sec-butyl, tert-butyl, n-pentyl, neopentyl, n-hexyl and cyclohexyl; alkenyl groups such as vinyl and propenyl; phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, aromatic groups such as phenyl, α-naphthyl, β-naphthyl, anthracenyl and phenanthryl are preferred.

Examples of the $C_{1-20}$ halogenated hydrocarbon groups include the above $C_{1-20}$ hydrocarbon groups in which at least one hydrogen atom has been substituted with a halogen atom such as fluorine, chlorine, bromine or iodine, with specific examples including trifluoromethyl, and $C_{6-20}$ halogenated aryl groups such as 2,3,4,5,6-pentafluorophenyl, 3,5-difluorophenyl and 3,5-ditrifluoromethylphenyl.

Examples of the silicon-containing groups include hydrocarbon-substituted silyl groups of 1 to 20 carbon atoms such as trimethylsilyl, methyldiphenylsilyl, dimethylphenylsilyl and triphenylsilyl.

Examples of the oxygen-containing groups include oxy group; peroxy group; hydroxyl group; hydroperoxy group; alkoxy groups such as methoxy, ethoxy, propoxy and butoxy; aryloxy groups such as phenoxy, methylphenoxy, dimethylphenoxy and naphthoxy; arylalkoxy groups such as phenylmethoxy and phenylethoxy; acetoxy group; carbonyl group; acetylacetonate group (acac); and oxo group.

Examples of the sulfur-containing groups include substituents corresponding to the above oxygen-containing compounds except that oxygen is replaced by sulfur; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate and pentafluorobenzenesulfonate; sulfinate groups such as methylsulfinate, phenylsulfinate, benzylsulfinate, p-toluenesulfinate, trimethylbenzenesulfinate and pentafluorobenzenesulfinate; alkylthio groups; arylthio groups; sulfate group; sulfide group; polysulfide group; and thiolate group.

Examples of the nitrogen-containing groups include amino group; alkylamino groups such as methylamino, dimethylamino, diethylamino, dipropylamino, dibutylamino and dicyclohexylamino; arylamino groups and alkylarylamino groups such as phenylamino, diphenylamino, ditolylamino, dinaphthylamino and methylphenylamino; alkylimino groups such as methylimino, ethylimino, i-propylimino and tert-butylimino; arylimino groups such as phenylimino, 2-methylphenylimino, 2,6-dimethylphenylimino, 2,4,6-trimethylphenylimino, 2-i-propylphenylimino, 2,6-di-i-propylphenylimino, 2,4,6-tri-i-propylphenylimino, 2-tert-butylphenylimino, 2,6-di-tert-butylphenylimino and 2,4,6-tri-tert-butylphenylimino; and alkylamine and arylamine groups such as trimethylamine, triethylamine, triphenylamine, N,N,N',N'-tetramethylethylenediamine (tmeda) and N,N,N',N'-tetraphenylpropylenediamine (tppda).

Examples of the phosphorus-containing groups include trialkylphosphine groups such as trimethylphosphine, tributylphosphine and tricyclohexylphosphine; triarylphosphine groups such as triphenylphosphine and tritolylphosphine; phosphite groups (phosphide groups) such as methylphosphite, ethylphosphite and phenylphosphite; phosphonate group; and phosphinate group.

Preferably, $R^5$, $R^8$, $R^9$ and $R^{12}$ are the same or different from one another and are each a hydrogen atom, a halogen atom or a $C_{1-20}$ hydrocarbon group.

In a preferred embodiment of Formula (IV), $R^1$ and $R^{13}$ are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

In a preferred embodiment of Formula (IV), $R^6$, $R^7$, $R^{10}$ and $R^{11}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

In a particularly preferred embodiment of Formula (IV), part of the adjacent groups $R^6$, $R^7$, $R^{10}$ and $R^1$ may be linked together to form a ring in combination with the carbon atoms to which the groups are bonded, and $R^1$, $R^{13}$, $R^6$, $R^7$, $R^{10}$ and $R^{11}$ are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

In another preferred embodiment of Formula (IV), $R^{13}$ is an aromatic group, in particular a $C_{6-16}$ aryl group. Specific examples include phenyl, α-naphthyl, β-naphthyl, anthracenyl, phenanthryl, pyrenyl, acenaphthyl, phenalenyl, aceanthrylenyl, tetrahydronaphthyl, indanyl and biphenylyl. Of these, phenyl, naphthyl, anthracenyl and phenanthryl are preferred.

The above aryl groups may be substituted with halogen atoms such as fluorine, chlorine, bromine and iodine; $C_{1-20}$ hydrocarbon groups including alkyl groups such as methyl, ethyl, propyl, butyl, hexyl, cyclohexyl, octyl, nonyl, dodecyl, eicosyl, norbornyl and adamantyl, alkenyl groups such as vinyl, propenyl and cyclohexenyl, arylalkyl groups such as benzyl, phenylethyl and phenylpropyl, and aryl groups such as phenyl, tolyl, dimethylphenyl, trimethylphenyl, ethylphenyl, propylphenyl, biphenyl, naphthyl, methylnaphthyl, anthracenyl and phenanthryl; and organosilyl groups such as trimethylsilyl, triethylsilyl and triphenylsilyl.

In Formula (IV), $X^1$ and $X^2$ are the same or different from each other and are each a hydrocarbon group, a halogenated hydrocarbon group, an oxygen-containing group, a sulfur-containing group, a silicon-containing group, a hydrogen atom or a halogen atom. Specific examples of $X^1$ and $X^2$ and preferred substituents are similar to those described for $X^1$ in Formula (III).

In Formula (IV), Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR—(wherein R is a hydrogen atom, a halogen atom, a hydrocarbon group, a halogenated hydrocarbon group or an alkoxy group). Specific examples of Y are similar to those described for Y in Formula (III).

Specific examples of the transition metal compounds represented by Formula (IV) include
dimethylsilyl{1-(2-ethyl-4-phenylindenyl)}(fluorenyl) zirconium dichloride,
dimethylsilyl{1-(2-ethyl-4-(α-naphthyl)indenyl)}(fluorenyl)zirconium dichloride,
dimethylsilyl{1-(2-ethyl-4-(β-naphthyl)indenyl)}(fluorenyl)zirconium dichloride,
dimethylsilyl{1-(2-ethyl-4-(2-methyl-1-naphthyl)indenyl)}(fluorenyl)zirconium dichloride,
dimethylsilyl{1-(2-ethyl-4-(5-acenaphthyl)indenyl)}(fluorenyl)zirconium dichloride,
dimethylsilyl{1-(2-ethyl-4-(9-anthracenyl)indenyl)}(fluorenyl)zirconium dichloride,
dimethylsilyl{1-(2-ethyl-4-(9-phenanthryl)indenyl)}(fluorenyl)zirconium dichloride,
dimethylsilyl{1-(2-ethyl-4-(o-methylphenyl)indenyl)}(fluorenyl)zirconium dichloride,
dimethylsilyl{1-(2-ethyl-4-(m-methylphenyl)indenyl)}(fluorenyl)zirconium dichloride,
dimethylsilyl{1-(2-ethyl-4-(p-methylphenyl)indenyl)}(fluorenyl)zirconium dichloride,
dimethylsilyl{1-(2-ethyl-4-(2,3-dimethylphenyl)indenyl)}(fluorenyl)zirconium dichloride,
dimethylsilyl{1-(2-ethyl-4-(2,4-dimethylphenyl)indenyl)}(fluorenyl)zirconium dichloride,
dimethylsilyl{1-(2-ethyl-4-(2,5-dimethylphenyl)indenyl)}(fluorenyl)zirconium dichloride,
dimethylsilyl{1-(2-ethyl-4-(2,4,6-trimethylphenyl) indenyl)}(fluorenyl)zirconium dichloride, dimethylsilyl{1-(2-ethyl-4-(o-chlorophenyl)indenyl)}(fluorenyl)zirconium dichloride,
dimethylsilyl{1-(2-ethyl-4-(m-chlorophenyl)indenyl)}(fluorenyl)zirconium dichloride,
dimethylsilyl{1-(2-ethyl-4-(p-chlorophenyl)indenyl)}(fluorenyl)zirconium dichloride,
dimethylsilyl{1-(2-ethyl-4-(2,3-dichlorophenyl)indenyl)}(fluorenyl)zirconium dichloride,
dimethylsilyl{1-(2-ethyl-4-(2,6-dichlorophenyl)indenyl)}(fluorenyl)zirconium dichloride,
dimethylsilyl{1-(2-ethyl-4-(3,5-dichlorophenyl)indenyl)}(fluorenyl)zirconium dichloride,
dimethylsilyl{1-(2-ethyl-4-(2-bromophenyl)indenyl)}(fluorenyl)zirconium dichloride,
dimethylsilyl{1-(2-ethyl-4-(3-bromophenyl)indenyl)}(fluorenyl)zirconium dichloride,
dimethylsilyl{1-(2-ethyl-4-(4-bromophenyl)indenyl)}(fluorenyl)zirconium dichloride,
dimethylsilyl{1-(2-ethyl-4-(4-biphenylyl)indenyl)}(fluorenyl)zirconium dichloride,
dimethylsilyl{1-(2-ethyl-4-(4-trimethylsilylphenyl) indenyl)}(fluorenyl)zirconium dichloride,
dimethylsilyl{1-(2-n-propyl-4-phenylindenyl)}(fluorenyl)zirconium dichloride,
dimethylsilyl{1-(2-n-propyl-4-(α-naphthyl)indenyl)}(fluorenyl)zirconium dichloride,
dimethylsilyl{1-(2-n-propyl-4-(β-naphthyl)indenyl)}(fluorenyl)zirconium dichloride,
dimethylsilyl{1-(2-n-propyl-4-(2-methyl-1-naphthyl) indenyl)}(fluorenyl)zirconium dichloride,
dimethylsilyl{1-(2-n-propyl-4-(5-acenaphthyl)indenyl)}(fluorenyl)zirconium dichloride,
dimethylsilyl{1-(2-n-propyl-4-(9-anthracenyl)indenyl)}(fluorenyl)zirconium dichloride,
dimethylsilyl{1-(2-n-propyl-4-(9-phenanthryl)indenyl)}(fluorenyl)zirconium dichloride,
dimethylsilyl{1-(2-i-propyl-4-phenylindenyl)}(fluorenyl)zirconium dichloride,
dimethylsilyl{1-(2-i-propyl-4-(α-naphthyl)indenyl)}(fluorenyl)zirconium dichloride,
dimethylsilyl{1-(2-i-propyl-4-(β-naphthyl)indenyl)}(fluorenyl)zirconium dichloride,
dimethylsilyl{1-(2-i-propyl-4-(8-methyl-9-naphthyl) indenyl)}(fluorenyl)zirconium dichloride,
dimethylsilyl{1-(2-i-propyl-4-(5-acenaphthyl)indenyl)}(fluorenyl)zirconium dichloride,
dimethylsilyl{1-(2-i-propyl-4-(9-anthracenyl)indenyl)}(fluorenyl)zirconium dichloride,
dimethylsilyl{1-(2-i-propyl-4-(9-phenanthryl)indenyl)}(fluorenyl)zirconium dichloride,
dimethylsilyl{1-(2-s-butyl-4-phenylindenyl)}(fluorenyl) zirconium dichloride,
dimethylsilyl{1-(2-s-butyl-4-(α-naphthyl)indenyl)}(fluorenyl)zirconium dichloride,
dimethylsilyl{1-(2-s-butyl-4-(β-naphthyl)indenyl)}(fluorenyl)zirconium dichloride,
dimethylsilyl{1-(2-s-butyl-4-(2-methyl-1-naphthyl) indenyl)}(fluorenyl)zirconium dichloride,
dimethylsilyl{1-(2-s-butyl-4-(5-acenaphthyl)indenyl)}(fluorenyl)zirconium dichloride,
dimethylsilyl{1-(2-s-butyl-4-(9-anthracenyl)indenyl)}(fluorenyl)zirconium dichloride,
dimethylsilyl{1-(2-s-butyl-4-(9-phenanthryl)indenyl)}(fluorenyl)zirconium dichloride,
dimethylsilyl{1-(2-n-pentyl-4-phenylindenyl)}(fluorenyl)zirconium dichloride,
dimethylsilyl{1-(2-n-pentyl-4-(α-naphthyl)indenyl)}(fluorenyl)zirconium dichloride,
dimethylsilyl{1-(2-n-butyl-4-phenylindenyl)}(fluorenyl) zirconium dichloride,
dimethylsilyl{1-(2-n-butyl-4-(α-naphthyl)indenyl)}(fluorenyl)zirconium dichloride,
dimethylsilyl{1-(2-n-butyl-4-(β-naphthyl)indenyl)}(fluorenyl)zirconium dichloride,
dimethylsilyl{1-(2-n-butyl-4-(2-methyl-1-naphthyl) indenyl)}(fluorenyl)zirconium dichloride,
dimethylsilyl{1-(2-n-butyl-4-(5-acenaphthyl)indenyl)}(fluorenyl)zirconium dichloride,
dimethylsilyl{1-(2-n-butyl-4-(9-anthracenyl)indenyl)}(fluorenyl)zirconium dichloride,
dimethylsilyl{1-(2-n-butyl-4-(9-phenanthryl)indenyl)}(fluorenyl)zirconium dichloride,
dimethylsilyl{1-(2-i-butyl-4-phenylindenyl)}(fluorenyl) zirconium dichloride,
dimethylsilyl{1-(2-i-butyl-4-(α-naphthyl)indenyl)}(fluorenyl)zirconium dichloride,
dimethylsilyl{1-(2-i-butyl-4-(β-naphthyl)indenyl)}(fluorenyl)zirconium dichloride,
dimethylsilyl{1-(2-i-butyl-4-(2-methyl-1-naphthyl) indenyl)}(fluorenyl)zirconium dichloride,
dimethylsilyl{1-(2-i-butyl-4-(5-acenaphthyl)indenyl)}(fluorenyl)zirconium dichloride,
dimethylsilyl{1-(2-i-butyl-4-(9-anthracenyl)indenyl)}(fluorenyl)zirconium dichloride,
dimethylsilyl{1-(2-i-butyl-4-(9-phenanthryl)indenyl)}(fluorenyl)zirconium dichloride,
dimethylsilyl{1-(2-neopentyl-4-phenylindenyl)}(fluorenyl)zirconium dichloride,
dimethylsilyl{1-(2-neopentyl-4-(α-naphthyl)indenyl)}(fluorenyl)zirconium dichloride,
dimethylsilyl{1-(2-n-hexyl-4-phenylindenyl)}(fluorenyl)zirconium dichloride,
dimethylsilyl{1-(2-n-hexyl-4-(α-naphthyl)indenyl)}(fluorenyl)zirconium dichloride,
diphenylsilyl{1-(2-n-propyl-4-phenylindenyl)}(fluorenyl)zirconium dichloride,
diphenylsilyl{1-(2-n-propyl-4-(α-naphthyl)indenyl)}(fluorenyl)zirconium dichloride,
diphenylsilyl{1-(2-n-propyl-4-(9-anthracenyl)indenyl)}(fluorenyl)zirconium dichloride,
diphenylsilyl{1-(2-n-propyl-4-(9-phenanthryl)indenyl)}(fluorenyl)zirconium dichloride,
diphenylsilyl{1-(2-n-propyl-4-(4-biphenylyl)indenyl)}(fluorenyl)zirconium dichloride,
dimethylsilyl{1-(2-n-propyl-4-phenylindenyl)}(2,7-di-tert-butylfluorenyl)zirconium dichloride,
dimethylsilyl{1-(2-n-propyl-4-(α-naphthyl)indenyl)}(2,7-di-tert-butylfluorenyl)zirconium dichloride,
dimethylsilyl{1-(2-n-propyl-4-(9-anthracenyl)indenyl)}(2,7-di-tert-butylfluorenyl)zirconium dichloride,
dimethylsilyl{1-(2-n-propyl-4-(9-phenanthryl)indenyl)}(2,7-di-tert-butylfluorenyl)zirconium dichloride,
dimethylsilyl{1-(2-n-propyl-4-(4-biphenylyl)indenyl)}(2,7-di-tert-butylfluorenyl)zirconium dichloride,
diphenylsilyl{1-(2-n-propyl-4-phenylindenyl)}(2,7-di-tert-butylfluorenyl)zirconium dichloride,
diphenylsilyl{1-(2-n-propyl-4-(α-naphthyl)indenyl)}(2,7-di-tert-butylfluorenyl)zirconium dichloride,
diphenylsilyl{1-(2-n-propyl-4-(9-anthracenyl)indenyl)}(2,7-di-tert-butylfluorenyl)zirconium dichloride,
diphenylsilyl{1-(2-n-propyl-4-(9-phenanthryl)indenyl)}(2,7-di-tert-butylfluorenyl)zirconium dichloride, diphenylsilyl{1-(2-n-propyl-4-(4-biphenylyl)indenyl)}(2,7-di-tert-butylfluorenyl)zirconium dichloride,
dimethylsilyl{1-(2-n-propyl-4-phenylindenyl)}(3,6-di-tert-butylfluorenyl)zirconium dichloride,
dimethylsilyl{1-(2-n-propyl-4-(α-naphthyl)indenyl)}(3,6-di-tert-butylfluorenyl)zirconium dichloride,
dimethylsilyl{1-(2-n-propyl-4-(9-anthracenyl)indenyl)}(3,6-di-tert-butylfluorenyl)zirconium dichloride,
dimethylsilyl{1-(2-n-propyl-4-(9-phenanthryl)indenyl)}(3,6-di-tert-butylfluorenyl)zirconium dichloride,
dimethylsilyl{1-(2-n-propyl-4-(4-biphenylyl)indenyl)}(3,6-di-tert-butylfluorenyl)zirconium dichloride,
diphenylsilyl{1-(2-n-propyl-4-phenylindenyl)}(3,6-di-tert-butylfluorenyl)zirconium dichloride,
diphenylsilyl{1-(2-n-propyl-4-(α-naphthyl)indenyl)}(3,6-di-tert-butylfluorenyl)zirconium dichloride,
diphenylsilyl{1-(2-n-propyl-4-(9-anthracenyl)indenyl)}(3,6-di-tert-butylfluorenyl)zirconium dichloride,
diphenylsilyl{1-(2-n-propyl-4-(9-phenanthryl)indenyl)}(3,6-di-tert-butylfluorenyl)zirconium dichloride,
diphenylsilyl{1-(2-n-propyl-4-(4-biphenylyl)indenyl)}(3,6-di-tert-butylfluorenyl)zirconium dichloride,
dimethylsilyl{1-(2-n-propyl-4-phenylindenyl)}(octamethyloctahydrodibenzofluorenyl)zirconium dichloride,
dimethylsilyl{1-(2-n-propyl-4-(α-naphthyl)indenyl)}(octamethyloctahydrodibenzofluorenyl)zirconium dichloride,
dimethylsilyl{1-(2-n-propyl-4-(9-anthracenyl)indenyl)}(octamethyloctahydrodibenzofluorenyl)zirconium dichloride,
dimethylsilyl{1-(2-n-propyl-4-(9-phenanthryl)indenyl)}(octamethyloctahydrodibenzofluorenyl)zirconium dichloride,
dimethylsilyl{1-(2-n-propyl-4-(4-biphenylyl)indenyl)}(octamethyloctahydrodibenzofluorenyl)zirconium dichloride,
diphenylsilyl{1-(2-n-propyl-4-phenylindenyl)}(octamethyloctahydrodibenzofluorenyl)zirconium dichloride,
diphenylsilyl{1-(2-n-propyl-4-(α-naphthyl)indenyl)}(octamethyloctahydrodibenzofluorenyl)zirconium dichloride,
diphenylsilyl{1-(2-n-propyl-4-(9-anthracenyl)indenyl)}(octamethyloctahydrodibenzofluorenyl)zirconium dichloride,
diphenylsilyl{1-(2-n-propyl-4-(9-phenanthryl)indenyl)}(octamethyloctahydrodibenzofluorenyl)zirconium dichloride,
diphenylsilyl{1-(2-n-propyl-4-(4-biphenylyl)indenyl)}(octamethyloctahydrodibenzofluorenyl))zirconium dichloride,
dimethylsilyl{1-(2-methyl-4,5-benzoindenyl)}(fluorenyl)zirconium dichloride,
dimethylsilyl{1-(2-methyl-4,5-benzoindenyl)}(2,7-di-tert-butylfluorenyl)zirconium dichloride,
dimethylsilyl{1-(2-methyl-4,5-benzoindenyl)}(3,6-di-tert-butylfluorenyl)zirconium dichloride,
dimethylsilyl{1-(2-methyl-4,5-benzoindenyl)}(octamethyloctahydrodibenzofluorenyl)zirconium dichloride,
diphenylsilyl{1-(2-methyl-4,5-benzoindenyl)}(fluorenyl)zirconium dichloride,
diphenylsilyl{1-(2-methyl-4,5-benzoindenyl)}(2,7-di-tert-butylfluorenyl)zirconium dichloride,
diphenylsilyl{1-(2-methyl-4,5-benzoindenyl)}(3,6-di-tert-butylfluorenyl)zirconium dichloride,
diphenylsilyl{1-(2-methyl-4,5-benzoindenyl)}(2,7-di-tert-butylfluorenyl)zirconium dichloride,
diphenylsilyl{1-(2-methyl-4,5-benzoindenyl)}(octamethyloctahydrodibenzofluorenyl)zirconium dichloride,
dimethylsilyl{1-(2-n-propyl-4,5-benzoindenyl)}(fluorenyl)zirconium dichloride,
dimethylsilyl{1-(2-n-propyl-4,5-benzoindenyl)}(2,7-di-tert-butylfluorenyl)zirconium dichloride,
dimethylsilyl{1-(2-n-propyl-4,5-benzoindenyl)}(3,6-di-tert-butylfluorenyl)zirconium dichloride,
dimethylsilyl{1-(2-n-propyl-4,5-benzoindenyl)}(octamethyloctahydrodibenzofluorenyl)zirconium dichloride,
diphenylsilyl{1-(2-n-propyl-4,5-benzoindenyl)}(fluorenyl)zirconium dichloride,
diphenylsilyl{1-(2-n-propyl-4,5-benzoindenyl)}(2,7-di-tert-butylfluorenyl)zirconium dichloride,
diphenylsilyl{1-(2-n-propyl-4,5-benzoindenyl)}(3,6-di-tert-butylfluorenyl)zirconium dichloride, and
diphenylsilyl{1-(2-n-propyl-4,5-benzoindenyl)}(octamethyloctahydrodibenzofluorenyl)zirconium dichloride.

Examples of the transition metal compounds represented by Formula (IV) further include transition metal compounds that correspond to the above compounds except that the zirconium atom has been replaced by titanium, hafnium, vanadium, niobium, tantalum, chromium, molybdenum or tungsten.

The transition metal compounds represented by Formula (IV) may be produced by the method disclosed in J. Organomet. Chem. 2003, (688), 153.

In the invention, the transition metal compound (A) represented by Formula (I) or (II) is preferably used. The use of such a compound results in a copolymer that contains in balanced proportions structural units resulting from 1,2-addition of a conjugated diene and having a side-chain double bond, structural units resulting from 1,4-addition of a conjugated diene, structural units resulting from 1,3-addition of a conjugated diene, and the total of structural units resulting from 1,2-addition of a conjugated diene and having a 1,2-cyclopropane skeleton and structural units resulting from 1,2-addition of a conjugated diene and having a 1,2-cyclopentane skeleton. Thus, property advantages are obtained.

[Components (B)]

The addition polymerization catalyst used in the copolymer production process of the invention is formed of the aforementioned transition metal compound (A) and at least one compound (B) selected from (B-1) organometallic compounds, (B-2) organoaluminum oxy-compounds, and (B-3) compounds capable of reacting with the transition metal compound (A) to form an ion pair.

In the following description, the compound capable of reacting with the transition metal compound (A) to form an ion pair will be also referred to as the "ionized ionic compound". The organometallic compounds (B-1), the organoaluminum oxy-compounds (B-2) and the compounds (B-3) capable of reacting with the transition metal compound (A) to form an ion pair will be otherwise referred to as the components (B-1), (B-2) and (B-3), respectively. Hereinbelow, the components (B-1) to (B-3) will be described.

(Organometallic Compounds (B-1))

Examples of the organometallic compounds (B-1) include organometallic compounds of metals of Groups 1, 2, 12 and 13 in the periodic table described below.

(B-1a) Organoaluminum compounds represented by

wherein $R^a$ and $R^b$ may be the same or different from each other and each represent a hydrocarbon group of 1 to 15, preferably 1 to 4 carbon atoms, X represents a halogen atom, $0<m\leq3$, $0\leq n<3$, $0\leq p<3$, $0\leq q<3$, and $m+n+p+q=3$.

(B-1b) Alkyl complex compounds of Group 1 metal and aluminum represented by

$M^2AlR^a_4$ wherein $M^2$ represents Li, Na or K, and $R^a$ represents a hydrocarbon group of 1 to 15, preferably 1 to 4 carbon atoms.

(B-1c) Dialkyl compounds of Group 2 or 12 metal represented by

$R^a R^b M^3$ wherein $R^a$ and $R^b$ may be the same or different from each other and each represent a hydrocarbon group of 1 to 15, preferably 1 to 4 carbon atoms, and $M^3$ is Mg, Zn or Cd.

Examples of the organoaluminum compounds (B-1a) include:

organoaluminum compounds represented by

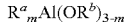

$R^a_m Al(OR^b)_{3-m}$ wherein $R^a$ and $R^b$ may be the same or different from each other and each represent a hydrocarbon group of 1 to 15, preferably 1 to 4 carbon atoms, and m is preferably $1.5 \leq m \leq 3$;

organoaluminum compounds represented by

$R^a_m AlX_{3-m}$ wherein $R^a$ represents a hydrocarbon group of 1 to 15, preferably 1 to 4 carbon atoms, X is a halogen atom, and m is preferably $0 < m < 3$;

organoaluminum compounds represented by

$R^a_m AlH_{3-m}$ wherein $R^a$ represents a hydrocarbon group of 1 to 15, preferably 1 to 4 carbon atoms, and m is preferably $2 \leq m < 3$; and organoaluminum compounds represented by

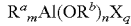

$R^a_m Al(OR^b)_n X_q$ wherein $R^a$ and $R^b$ may be the same or different from each other and each represent a hydrocarbon group of 1 to 15, preferably 1 to 4 carbon atoms, X is a halogen atom, $0 < m \leq 3$, $0 \leq n < 3$, $0 \leq q < 3$, and $m+n+q=3$.

Specific examples of the organoaluminum compounds (B-1a) include tri-n-alkylaluminums such as trimethylaluminum, triethylaluminum, tri-n-butylaluminum, tripropylaluminum, tripentylaluminum, tridecylaluminum, trioctylaluminum and tridecylaluminum; tri-branched-alkylaluminums such as triisopropylaluminum, triisobutylaluminum, tri-sec-butylaluminum, tri-tert-butylaluminum, tri-2-methylbutylaluminum, tri-3-methylbutylaluminum, tri-2-methylpentylaluminum, tri-3-methylpentylaluminum, tri-4-methylpentylaluminum, tri-2-methylhexylaluminum, tri-3-methylhexylaluminum and tri-2-ethylhexylaluminum; tricycloalkylaluminums such as tricyclohexylaluminum and tricyclooctylaluminum; triarylaluminums such as triphenylaluminum and tritolylaluminum; dialkylaluminum hydrides such as diethylaluminum hydride and diisobutylaluminum hydride; trialkenylaluminums represented by $(i-C_4H_9)_x Al_y (C_5H_{10})_z$ (wherein x, y and z are positive numbers, and $z \geq 2x$) such as triisoprenylaluminum; alkylaluminum alkoxides such as isobutylaluminum methoxide, isobutylaluminum ethoxide and isobutylaluminum isopropoxide; dialkylaluminum alkoxides such as dimethylaluminum methoxide, diethylaluminum ethoxide and dibutylaluminum butoxide; alkylaluminum sesquialkoxides such as ethylaluminum sesquiethoxide and butylaluminum sesquibutoxide; partially alkoxylated alkylaluminums having an average composition represented by $R^a_{2.5} Al(OR^b)_{0.5}$; dialkylaluminum aryloxides such as diethylaluminum phenoxide, diethylaluminum (2,6-di-t-butyl-4-methylphenoxide), ethylaluminum bis(2,6-di-t-butyl-4-methylphenoxide), diisobutylaluminum (2,6-di-t-butyl-4-methylphenoxide) and isobutylaluminum bis(2,6-di-t-butyl-4-methylphenoxide); dialkylaluminum halides such as dimethylaluminum chloride, diethylaluminum chloride, dibutylaluminum chloride, diethylaluminum bromide and diisobutylaluminum chloride; alkylaluminum sesquihalides such as ethylaluminum sesquichloride, butylaluminum sesquichloride and ethylaluminum sesquibromide; partially halogenated alkylaluminums such as alkylaluminum dihalides including ethylaluminum dichloride, propylaluminum dichloride and butylaluminum dibromide; dialkylaluminum hydrides such as diethylaluminum hydride and dibutylaluminum hydride; partially hydrogenated alkylaluminums such as alkylaluminum dihydrides including ethylaluminum dihydride and propylaluminum dihydride; and partially alkoxylated and halogenated alkylaluminums such as ethylaluminum ethoxychloride, butylaluminum butoxychloride and ethylaluminum ethoxybromide.

Compounds analogous to the compounds (B-1a) may be used. Examples of such compounds include organoaluminum compounds in which two or more aluminum compounds are linked through a nitrogen atom, such as $(C_2H_5)_2 AlN(C_2H_5) Al(C_2H_5)_2$.

Examples of the compounds (B-1b) include $LiAl(C_2H_5)_4$ and $LiAl(C_7H_{15})_4$.

Examples of the organometallic compounds (B-1) further include methyllithium, ethyllithium, propyllithium, butyllithium, methylmagnesium bromide, methylmagnesium chloride, ethylmagnesium bromide, ethylmagnesium chloride, propylmagnesium bromide, propylmagnesium chloride, butylmagnesium bromide, butylmagnesium chloride, dimethylmagnesium, diethylmagnesium, dibutylmagnesium and butylethylmagnesium.

Further, compounds capable of forming the above organoaluminum compounds in the polymerization system may be used, with examples including combinations of aluminum halides and alkyllithiums and combinations of aluminum halides and alkylmagnesiums. Of the organometallic compounds (B-1), the organoaluminum compounds are preferable.

The organometallic compounds (B-1) may be used singly, or two or more may be used in combination.

(Organoaluminum Oxy-Compounds (B-2))

The organoaluminum oxy-compounds (B-2) that are used as required in the invention may be conventional aluminoxanes, or benzene-insoluble organoaluminum oxy-compounds disclosed JP-A-H02-78687. For example, the conventional aluminoxanes may be prepared by the following processes, and are usually obtained as a solution in a hydrocarbon solvent.

[1] An organoaluminum compound such as trialkylaluminum is added to a hydrocarbon medium suspension of a compound containing adsorbed water or a salt containing water of crystallization (such as magnesium chloride hydrate, copper sulfate hydrate, aluminum sulfate hydrate, nickel sulfate hydrate or cerous chloride hydrate), to react the organoaluminum compound with the adsorbed water or the water of crystallization.

[2] Water, ice or water vapor is allowed to act directly on an organoaluminum compound such as trialkylaluminum in a medium such as benzene, toluene, ethyl ether or tetrahydrofuran.

[3] An organoaluminum compound such as trialkylaluminum is reacted with an organotin oxide such as dimethyltin oxide or dibutyltin oxide in a medium such as decane, benzene or toluene.

The aluminoxane may contain small amounts of organometallic components. After the solvent and unreacted organoaluminum compound are distilled away from the recovered solution of the aluminoxane, the aluminoxane obtained may be redissolved in a solvent or suspended in a poor solvent for the aluminoxane.

Examples of the organoaluminum compounds used in preparing the aluminoxanes include the organoaluminum compounds mentioned above as the organoaluminum compounds (B-1a). Of those compounds, the trialkylaluminums and the tricycloalkylaluminums are preferred, and trimethylaluminum is particularly preferred. The organoaluminum compounds may be used singly, or two or more may be used in combination.

Examples of the solvents used in the preparation of the aluminoxanes include aromatic hydrocarbons such as benzene, toluene, xylene, cumene and cymene; aliphatic hydrocarbons such as pentane, hexane, heptane, octane, decane, dodecane, hexadecane and octadecane; alicyclic hydrocarbons such as cyclopentane, cyclohexane, cyclooctane and methylcyclopentane; petroleum fractions such as gasoline, kerosine and light oil; and halides (for example, chlorides or bromides) of the above aromatic hydrocarbons, aliphatic hydrocarbons and alicyclic hydrocarbons. Ethers such as ethyl ether and tetrahydrofuran may also be used. Of the solvents, the aromatic hydrocarbons and the aliphatic hydrocarbons are preferable, and the aliphatic hydrocarbons are particularly preferable.

The benzene-insoluble organoaluminum oxy-compounds desirably contain Al components that dissolve in benzene at 60° C., in an amount of not more than 10%, preferably not more than 5%, and particularly preferably not more than 2% in terms of Al atoms. That is, the organoaluminum oxy-compounds are preferably insoluble or hardly soluble in benzene.

Examples of the organoaluminum oxy-compounds further include boron-containing organoaluminum oxy-compounds (G-1) represented by Formula (iii) below:

[Chem. 20]

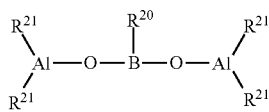

(iii)

wherein $R^{20}$ is a $C_{1-10}$ hydrocarbon group; and $R^{21}$s are each a hydrogen atom, a halogen atom or a $C_{1-10}$ hydrocarbon group and may be the same or different from one another. The boron-containing organoaluminum oxy-compound (G-1) represented by Formula (iii) may be prepared by reacting an alkylboronic acid (G-2) represented by Formula (iv):

$$R^{20}\text{—B(OH)}_2 \quad (iv)$$

wherein $R^{20}$ is as defined above, with an organoaluminum compound in an inert solvent under an inert gas atmosphere at a temperature of −80° C. to room temperature for 1 minute to 24 hours.

Examples of the alkylboronic acids (G-2) represented by Formula (iv) include methylboronic acid, ethylboronic acid, isopropylboronic acid, n-propylboronic acid, n-butylboronic acid, isobutylboronic acid, n-hexylboronic acid, cyclohexylboronic acid, phenylboronic acid, 3,5-difluorophenylboronic acid, pentafluorophenylboronic acid and 3,5-bis(trifluoromethyl)phenylboronic acid. Of these, methylboronic acid, n-butylboronic acid, isobutylboronic acid, 3,5-difluorophenylboronic acid and pentafluorophenylboronic acid are preferable. The alkylboronic acids may be used singly, or two or more may be used in combination.

Examples of the organoaluminum compounds to be reacted with the alkylboronic acids include the organoaluminum compounds described above for the organoaluminum compounds (B-1a). Of these, the trialkylaluminums and the tricycloalkylaluminums are preferable, and trimethylaluminum, triethylaluminum and triisobutylaluminum are particularly preferable. The organoaluminum compounds may be used singly, or two or more may be used in combination.

The organoaluminumoxy-compounds (B-2) may be used singly, or two or more may be used in combination.

(Ionized Ionic Compounds (B-3))

The ionized ionic compounds (B-3) can react with the transition metal compounds (A) to form an ion pair.

Examples of the compounds include Lewis acids, ionic compounds, borane compounds and carborane compounds described in JP-A-H01-501950, JP-A-H01-502036, JP-A-H03-179005, and U.S. Pat. No. 5,321,106. Heteropoly compounds and isopoly compounds may also be employed.

The Lewis acids include compounds represented by $BR_3$ (wherein R is a fluorine atom or a phenyl group which may have a substituent group such as fluorine, methyl or trifluoromethyl). Specific examples include trifluoroboron, triphenylboron, tris(4-fluorophenyl)boron, tris(3,5-difluorophenyl)boron, tris(4-fluoromethylphenyl)boron, tris(pentafluorophenyl)boron, tris(p-tolyl)boron, tris(o-tolyl)boron and tris(3,5-dimethylphenyl)boron.

The ionic compounds include compounds represented by Formula (v):

[Chem. 21]

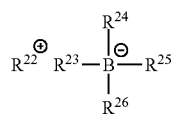

(v)

wherein $R^{22+}$ is $H^+$, carbonium cation, oxonium cation, ammonium cation, phosphonium cation, cycloheptyltrienyl cation, or ferrocenium cation having a transition metal. $R^{23}$ to $R^{26}$ may be the same or different from one another and are each an organic group, and preferably an aryl group or a substituted aryl group.

Examples of the carbonium cations include tri-substituted carbonium cations such as triphenylcarbonium cation, tri(methylphenyl)carbonium cation and tri(dimethylphenyl)carbonium cation. Examples of the ammonium cations include trialkylammonium cations such as trimethylammonium cation, triethylammonium cation, tripropylammonium cation, tributylammonium cation and tri(n-butyl)ammonium cation; N,N-dialkylanilinium cations such as N,N-dimethylanilinium cation, N,N-diethylanilinium cation and N,N,2,4,6-pentamethylanilinium cation; and dialkylammonium cations such as di(isopropyl)ammonium cation and dicyclohexylammonium cation.

Examples of the phosphonium cations include triarylphosphonium cations such as triphenylphosphonium cation, tri(methylphenyl)phosphonium cation and tri(dimethylphenyl)phosphonium cation.

$R^{22}$ is preferably carbonium cation or ammonium cation, and particularly preferably triphenylcarbonium cation, N,N-dimethylanilinium cation or N,N-diethylanilinium cation.

Examples of the ionic compounds further include trialkyl-substituted ammonium salts, N,N-dialkylanilinium salts, dialkylammonium salts and triarylphosphonium salts.

Examples of the trialkyl-substituted ammonium salts include triethylammonium tetra(phenyl)borate, tripropylammonium tetra(phenyl)borate, tri(n-butyl)ammonium tetra(phenyl)borate, trimethylammonium tetra(p-tolyl)borate, trimethylammonium tetra(o-tolyl)borate, tri(n-butyl)ammonium tetra(pentafluorophenyl)borate, tripropylammonium tetra(o,p-dimethylphenyl)borate, tri(n-butyl)ammonium tetra(m,m-dimethylphenyl)borate, tri(n-butyl)ammonium tetra(p-trifluoromethylphenyl)borate, tri(n-butyl)ammonium tetra(3,5-ditrifluoromethylphenyl)borate and tri(n-butyl)ammonium tetra(o-tolyl)borate.

Examples of the N,N-dialkylanilinium salts include N,N-dimethylanilinium tetra(phenyl)borate, N,N-diethylanilinium tetra(phenyl)borate and N,N,2,4,6-pentamethylanilinium tetra(phenyl)borate. Examples of the dialkylammonium salts include di(1-propyl)ammonium tetra(pentafluorophenyl)borate and dicyclohexylammonium tetra(phenyl)borate.

Examples of the ionic compounds further include triphenylcarbenium tetrakis(pentafluorophenyl)borate, N,N-dimethylanilinium tetrakis(pentafluorophenyl)borate, ferrocenium tetra(pentafluorophenyl)borate, triphenylcarbenium pentaphenylcyclopentadienyl complex, N,N-diethylanilinium pentaphenylcyclopentadienyl complex, and boron compounds represented by Formula (vi) or (vii).

[Chem. 22]

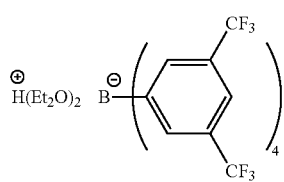

(vi)

In the formula, Et denotes an ethyl group.

[Chem. 23]

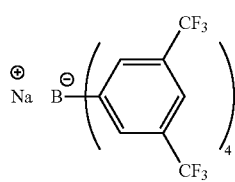

(vii)

Examples of the borane compounds include decaborane; salts of anions such as bis[tri(n-butyl)ammonium]nonaborate, bis[tri(n-butyl)ammonium]decaborate, bis[tri(n-butyl)ammonium]undecaborate, bis[tri(n-butyl)ammonium]dodecaborate, bis[tri(n-butyl)ammonium]decachlorodecaborate and bis[tri(n-butyl)ammonium]dodecachlorododecaborate; and salts of metal cations and borane anions such as tri(n-butyl)ammonium bis(dodecahydridododecaborate) cobaltate (III) and bis[tri(n-butyl)ammonium]bis(dodecahydridododecaborate) nickelate (III).

Examples of the carborane compounds include 4-carbanonaborane, 1,3-dicarbanonaborane, 6,9-dicarbadecaborane, dodecahydrido-1-phenyl-1,3-dicarbanonaborane, dodecahydrido-1-methyl-1,3-dicarbanonaborane, undecahydrido-1,3-dimethyl-1,3-dicarbanonaborane, 7,8-dicarbaundecaborane, 2,7-dicarbaundecaborane, undecahydrido-7,8-dimethyl-7,8-dicarbaundecaborane, dodecahydrido-11-methyl-2,7-dicarbaundecaborane; salts of anions such as tri(n-butyl)ammonium 1-carbadecaborate, tri(n-butyl)ammonium 1-carbaundecaborate, tri(n-butyl)ammonium 1-carbadodecaborate, tri(n-butyl)ammonium 1-trimethylsilyl-1-carbadecaborate, tri(n-butyl)ammonium bromo-1-carbadodecaborate, tri(n-butyl)ammonium 6-carbadecaborate, tri(n-butyl)ammonium 6-carbadecaborate, tri(n-butyl)ammonium 7-carbaundecaborate, tri(n-butyl)ammonium 7,8-dicarbaundecaborate, tri(n-butyl)ammonium 2,9-dicarbaundecaborate, tri(n-butyl)ammonium dodecahydrido-8-methyl-7,9-dicarbaundecaborate, tri(n-butyl)ammonium undecahydrido-8-ethyl-7,9-dicarbaundecaborate, tri(n-butyl)ammonium undecahydrido-8-butyl-7,9-dicarbaundecaborate, tri(n-butyl)ammonium undecahydrido-8-allyl-7,9-dicarbaundecaborate, tri(n-butyl)ammonium undecahydrido-9-trimethylsilyl-7,8-dicarbaundecaborate and tri(n-butyl)ammonium undecahydrido-4,6-dibromo-7-carbaundecaborate; and salts of metal cations and carborane anions such as tri(n-butyl)ammonium bis(nonahydrido-1,3-dicarbanonaborate) cobaltate (III), tri(n-butyl)ammonium bis(undecahydrido-7,8-dicarbaundecaborate) ferrate (III), tri(n-butyl)ammonium bis(undecahydrido-7,8-dicarbaundecaborate) cobaltate (III), tri(n-butyl)ammonium bis(undecahydrido-7,8-dicarbaundecaborate) nickelate (III), tri(n-butyl)ammonium bis(undecahydrido-7,8-dicarbaundecaborate) cuprate (III), tri(n-butyl)ammonium bis(undecahydrido-7,8-dicarbaundecaborate) aurate (III), tri(n-butyl)ammonium bis(nonahydrido-7,8-dimethyl-7,8-dicarbaundecaborate) ferrate (III), tri(n-butyl)ammonium bis(nonahydrido-7,8-dimethyl-7,8-dicarbaundecaborate) chromate (III), tri(n-butyl)ammonium bis(tribromooctahydrido-7,8-dicarbaundecaborate) cobaltate (III), tris[tri(n-butyl)ammonium]bis(undecahydrido-7-carbaundecaborate) chromate (III), bis[tri(n-butyl)ammonium]bis(undecahydrido-7-carbaundecaborate) manganate (IV), bis[tri(n-butyl)ammonium]bis(undecahydrido-7-carbaundecaborate) cobaltate (III) and bis[tri(n-butyl)ammonium]bis(undecahydrido-7-carbaundecaborate) nickelate (IV).

The heteropoly compounds contain an atom selected from silicon, phosphorus, titanium, germanium, arsenic and tin, and one or more atoms selected from vanadium, niobium, molybdenum and tungsten. Examples of such compounds include phosphovanadic acid, germanovanadic acid, arsenovanadic acid, phosphoniobic acid, germanoniobic acid, siliconomolybdic acid, phosphomolybdic acid, titanomolybdic acid, germanomolybdic acid, arsenomolybdic acid, stannomolybdic acid, phosphotungstic acid, germanotungstic acid, stannotungstic acid, phosphomolybdovanadic acid, phosphotungstovanadic acid, germanotungstovanadic acid, phosphomolybdotungstovanadic acid, germanomolybdotungstovanadic acid, phosphomolybdotungstic acid, phosphomolybdoniobic acid; salts of these acids with for example Group 1 or Group 2 metals in the periodic table such as lithium, sodium, potassium, rubidium, cesium, beryllium, magnesium, calcium, strontium and barium; organic salts of the above acids such as triphenylethyl salts; and isopoly compounds. The heteropoly compounds and the isopoly compounds described above may be used singly, or two or more may be used in combination.

The ionized ionic compounds (B-3) may be used singly, or two or more may be used in combination.

Next, the copolymer production processes of the invention will be described in detail.

In the copolymer production process of the invention, at least ethylene and a conjugated diene are copolymerized. The conjugated dienes used in the invention are not particularly limited. In a usual embodiment, a conjugated diene represented by Formula (i) below is used.

[Chem. 24]

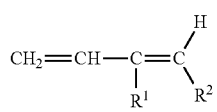

(i)

In Formula (i), $R^1$ and $R^2$ are each independently a hydrogen atom, a $C_{1-8}$ alkyl group or an aryl group. At least one of $R^1$ and $R^2$ is a hydrogen atom.

The conjugated diene monomer (i) is not particularly limited and may be an aromatic or aliphatic conjugated diene.

Examples of the conjugated dienes include 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene and 2-phenyl-1,3-butadiene. The conjugated dienes may be used singly, or two or more may be used in combination. A particularly preferred conjugated diene is 1,3-butadiene which is inexpensive and has excellent copolymerizability and crosslinking efficiency. When 1,3-butadiene is used as the conjugated diene, the obtainable copolymer has a vinyl group in a side chain as a side-chain double bond.

In the copolymer production process of the invention, ethylene and the conjugated diene may be used in appropriate amounts that will give a copolymer having the specific composition described hereinabove. The amounts may be determined appropriately depending on conditions such as the type of the catalyst used in the copolymerization, the polymerization temperature, and the types and amounts of the solvent and the organic alkylaluminum compound.

In the process of the invention, other monomers may be used in addition to ethylene and the conjugated diene. Examples of the additional monomers include $C_{3-20}$ α-olefins, derivatives thereof, non-conjugated dienes, derivatives thereof, non-conjugated polyenes, derivatives thereof, styrene and derivatives thereof.

Examples of the $C_{3-20}$ α-olefins and the derivatives thereof include α-olefins such as propylene, 1-butene, 2-butene, 1-pentene, 1-hexene, 1-heptene, 1-octene, 1-nonene, 1-decene, 1-undecene, 1-dodecene, 1-tetradecene, 1-hexadecene, 1-octadecene, 1-eicosene, 3-methyl-1-butene, 3-methyl-1-pentene, 4-methyl-1-pentene, 4-methyl-1-hexene, 4,4-dimethyl-1-hexene, 4,4-dimethyl-1-pentene, 4-ethyl-1-hexene and 3-ethyl-1-hexene, and α-olefin derivatives such as 3-phenylpropylene and 4-phenylbutene.

Examples of styrene and the derivatives thereof include styrene; mono- or poly-alkyl styrenes such as o-methylstyrene, m-methylstyrene, p-methylstyrene, o,p-dimethylstyrene, o-ethylstyrene, m-ethylstyrene and p-ethylstyrene; functional group-containing styrene derivatives such as methoxystyrene, ethoxystyrene, vinylbenzoic acid, methyl vinylbenzoate, vinylbenzyl acetate, hydroxystyrene, o-chlorostyrene, p-chlorostyrene and divinylbenzene; and α-methylstyrene.

Examples of the non-conjugated dienes and the derivatives thereof include 1,4-pentadiene, 1,5-hexadiene, 1,4-hexadiene, 1,4-octadiene, 1,5-octadiene, 1,6-octadiene, 1,7-octadiene, 7-methyl-1,6-octadiene and 4-ethylidene-8-methyl-1,7-nonadiene.

Examples of the non-conjugated polyenes and the derivatives thereof include 5,9-dimethyl-1,4,8-decatriene.

The additional monomers may be used singly, or two or more may be used in combination.

In the case where the additional monomers are used, the amounts thereof are not particularly limited. However, it is preferable that the molar ratio of ethylene and the additional monomer(s) (ethylene/additional monomer(s)) is 99/1 to 40/60. In view of lowering the glass transition temperature Tg of the obtainable copolymer, the molar ratio is more preferably 90/10 to 60/40, and particularly preferably 85/15 to 70/30. When the copolymer will be used as an elastomer, the molar ratio is particularly preferably 80/20 to 55/45.

In the copolymerization process of the invention, at least ethylene and the conjugated diene are copolymerized in the presence of the addition polymerization catalyst formed of the components (A) and (B). In carrying out the copolymerization, a hydrocarbon solvent is usually used. Alternatively, the monomer may serve as a solvent. The copolymerization may be carried out by a batch process or a continuous process.

In the polymerization, the components (A) and (B) may be used in any manner and may be added to the polymerizer in any sequence by an appropriate method. For example, these components may be used as follows.

(1) The components (A) and (B) are added to the polymerizer in an arbitrary sequence.

(2) The components (A) and (B) are brought into contact beforehand, and the resultant catalyst is added to the polymerizes.

(3) The components (A) and (B) are brought into contact beforehand to give a catalyst component. The catalyst component and the component (B) are added to the polymerizer in an arbitrary sequence. In the method (3), the components (B) may be the same or different.

In the copolymerization catalyzed by the above-described catalyst, the component (A) is generally used in an amount of $10^{-13}$ to $10^{-2}$ mol, and preferably $10^{-11}$ to $10^{-3}$ mol per 1 liter of the reaction volume. According to the copolymer production process of the invention, a copolymer may be produced with high polymerization activity even when the component (A) is used in a relatively low concentration.

When the component (B) is the component (B-1), it is used in an amount such that the molar ratio of the component (B-1) to the transition metal atoms (M) in the component (A), [(B-1)/M], is 0.01 to 100000, and preferably 0.05 to 50000.

When the component (B) is the component (B-2), it is used in an amount such that the molar ratio of the aluminum atoms in the component (B-2) to the transition metal atoms (M) in the component (A), [(B-2)/M], is 1 to 500000, and preferably 10 to 100000.

When the component (B) is the component (B-3), it is used in an amount such that the molar ratio of the component (B-3) to the transition metal atoms (M) in the component (A), [(B-3)/M], is 1 to 10, and preferably 1 to 5.

The amount of ethylene fed in the polymerization is not particularly limited and may be determined appropriately depending on, for example, the target composition of the copolymer.

In the copolymer production process of the invention, the polymerization temperature is usually in the range of −50 to 200° C., and preferably 0 to 170° C. The polymerization pressure is usually atmospheric pressure to 100 kg/cm$^2$, and preferably atmospheric pressure to 50 kg/cm$^2$. The polymerization reaction may be carried out batchwise, semi-continuously or continuously. The polymerization may be performed in two or more stages under different reaction conditions.

The reaction time (the average residence time in the case of continuous copolymerization) may vary depending on conditions such as the catalyst concentration and the polymerization temperature, but is usually 5 minutes to 3 hours, and preferably 10 minutes to 1.5 hours.

The molecular weight and the molecular weight distribution of the copolymers produced by the inventive process may be controlled by using a molecular weight modifier such as hydrogen.

Alternatively, the molecular weight and the molecular weight distribution of the copolymers produced by the inventive process may be controlled by changing the polymerization temperature.

Still alternatively, the molecular weight and the molecular weight distribution of the copolymers produced in the invention may be controlled by regulating the amount of the organometallic compound (B-1) and/or the organoaluminum oxycompound (B-2). Generally, the molecular weight may be lowered by increasing the organoaluminum compound/transition metal molar ratio. The molecular weight distribution can be narrowed by increasing the ratio of the number of the moles of the organoaluminum compound to that of the formed polymer.

Still alternatively, the molecular weight and the molecular weight distribution of the copolymers produced by the inventive process may be controlled by adjusting the concentration of the copolymer in the polymerization liquid. To control the molecular weight and the molecular weight distribution of the copolymer, the concentration of the copolymer in the polymerization liquid may be 0.01 to 500 g/L, preferably 0.1 to 100 g/L, and more preferably 1 to 20 g/L. Lowering the copolymer concentration in the polymerization liquid increases the molecular weight and narrows the molecular weight distribution.

Since the copolymer produced according to one aspect of the invention has a side-chain double bond, the copolymer may undergo various modifications. For example, the copolymer may be modified with a peroxide. In the modification with a peroxide, the side-chain double bond of the copolymer is epoxidized. The epoxy group introduced in the copolymer provides high reactivity.

The copolymers according to the invention and modified products thereof may be used as thermosetting resins or reactive resins. Since the copolymers according to an aspect of the invention have a double bond in a side chain, they may be subjected to reactions such as the Diels-Alder reaction and the Michael addition reaction.

For example, the double bonds in the copolymer may be partially or completely modified with an unsaturated carboxylic acid, a derivative thereof or an aromatic vinyl compound to give a modified product. Such modified products have excellent adhesion with polyester resins, polycarbonate resins, saponified products of olefin/vinyl acetate copolymers, polyolefins and the like. Thus, the modified products may be used as adhesives for bonding these resins. The modification percentage in the modified product ([modified product (weight)−copolymer (weight)]/[copolymer (weight)]× 100) is preferably in the range of 0.01 to 30% by weight.

In an embodiment, the copolymer according to the invention may be crosslinked in the presence of an organic peroxide to give a crosslinked product. Since the copolymer of the invention has highly reactive double bonds in side chains, the copolymer may be modified with a reduced amount of a radical initiator compared to copolymers having no side-chain double bonds.

When a copolymer having no side-chain double bonds is modified, an initiator abstracts hydrogen from the copolymer and the resultant radical provides a reaction site for the subsequent reaction. Since the probability for 1 mol of the initiator to undergo the hydrogen-abstracting reaction is not so high, the initiator has to be used in a large amount to make sure that a sufficient number of reaction sites are produced in the copolymer having no side-chain double bonds. Further, the initiator also induces a decomposition reaction. In general, a reaction of a polymer with an initiator decreases the molecular weight of the polymer. In particular, the decrease of the molecular weight is remarkable when the polymer has unsaturated bonds in the main chain, resulting in high surface stickiness of the resultant crosslinked product.

In contrast, the copolymer according to the invention has side-chain double bonds and thus allows for the reduction of the usage amount of a radical initiator. Further, the radical that is generated in the modification mainly reacts with the side-chain double bonds. That is, since the copolymer according to the invention has side-chain double bonds and is substantially free of unsaturated bonds in the main chain, the main chain is prevented from being decomposed, thereby suppressing the lowering of the molecular weight. As a result, the obtainable crosslinked product has a low surface stickiness, is free of internal bubble contamination and achieves excellent thermal aging resistance (heat resistance) and collapse resistance.

The copolymers in an aspect of the invention are substantially free of unsaturated bonds in the main chain and have a cyclic structure in the main chain and a double bond in a side chain. Because of this configuration, the copolymers of the invention show excellent properties such as weathering resistance, heat resistance and oil resistance, have a low glass transition temperature and excellent cold resistance, and have excellent crosslinking efficiency and modification efficiency. In particular, the copolymers can be crosslinked or modified with organic peroxides with excellent efficiency, and are also crosslinkable with sulfur. Products obtained by crosslinking the copolymers with organic peroxides have a low surface stickiness, are free of internal bubble contamination and have excellent thermal aging resistance (heat resistance) and collapse resistance.

EXAMPLES

The present invention will be described in detail by presenting examples hereinbelow without limiting the scope of the invention.

Properties of the obtained polymers were measured or determined as described below.

(Molecular Weight and Molecular Weight Distribution)

The molecular weight and the molecular weight distribution of the polymers were measured by high-temperature gel permeation chromatography (GPC) under the following conditions.

The molecular weight was determined by calibration with a calibration curve that had been prepared using polystyrene standards. (Hereinafter, the molecular weight will also be referred to as PS-calibrated molecular weight.)

<Sample Pretreatment>

A sample weighing 30 mg was completely dissolved in 20 mL of o-dichlorobenzene at 145° C. The solution was filtered through a sintered filter having a pore diameter of 0.45 mm, thereby preparing an analysis sample.

<Measurement Apparatus>

Gel permeation chromatograph: Alliance GPC 2000 (manufactured by Waters)

<Analyzer>

Data processing software: Empower professional (manufactured by Waters)

<Measurement Conditions>

Columns: Two TSK gel GMH6-HT columns+two TSK gel GMH6-HTL columns (each 7.5 mm in inner diameter and 30 cm in length, manufactured by TOSOH CORPORATION)

Column temperature: 140° C.

Mobile phase: o-dichlorobenzene (containing 0.025% BHT) (ODCB)

Detector: differential refractometer

Flow rate: 1 mL/min

Molecular weight calibration:

PS-calibration/calibration against standards (Determination of butadiene content, vinyl group content, cyclopropane skeleton content, cyclopentene skeleton content, 1,4-addition unit content and 1,3-addition unit content)

The ethylene/butadiene copolymer obtained was analyzed by $^{13}$C-NMR (1,1,2,2-tetrachloroethane-d2, 140° C.). The spectrum was analyzed with reference to the chemical shifts of the signals assigned to the vinyl group, the cyclopropane skeleton, the cyclopentene skeleton, the 1,4-addition unit and the 1,3-addition unit in ethylene/butadiene copolymer which were described in J. Am. Chem. Soc. 2003 (125), 8970, and Macromolecules, 2003 (36), 9067. The peaks were thereby assigned to the respective structural units and were quantified, thereby determining the butadiene content (1) and the vinyl group content (2), the cyclopropane skeleton content (3), the cyclopentene skeleton content (4), the 1,4-addition unit content (5) and the 1,3-addition unit content (6) relative to all the butadiene-derived structural units. The determination was performed in accordance with the following equations (1) to (6).

Proportion (mol %) of structural units derived from 1,3-butadiene relative to all the monomer units in the copolymer=$100 \times (A+B+C+D+E)/[(A+B+C+D+E)+[(1000-(A+B+C+D+E)\times 4)]/2]$ (1)

Proportion (mol %) of the vinyl groups relative to all the structural units derived from 1,3-butadiene=$100 \times A/(A+B+C+D+E)$ (2)

Proportion (mol %) of the cyclopropane skeletons relative to all the structural units derived from 1,3-butadiene=$100 \times B/(A+B+C+D+E)$ (3)

Proportion (mol %) of the cyclopentene skeletons relative to all the structural units derived from 1,3-butadiene=$100 \times C/(A+B+C+D+E)$ (4)

Proportion (mol %) of the 1,4-addition units relative to all the structural units derived from 1,3-butadiene=$100 \times D/(A+B+C+D+E)$ (5)

Proportion (mol %) of the 1,3-addition units relative to all the structural units derived from 1,3-butadiene=$100 \times E/(A+B+C+D+E)$ (6)

The letters A to E indicate the respective integrated values per one carbon of the structural units derived from the structures illustrated below, based on the total integrated value, 1000, of all the peaks in the $^{13}$C-NMR spectrum of the ethylene/butadiene copolymer.

A: (Integrated value per one carbon of the vinyl groups)=integrated value of the peak at 113.8 ppm ($R^1$—CH(HC=$CH_2$)—$R^2$)

B: (Integrated value per one carbon of the cyclopropane skeletons)=[(integrated value of the peak at 17.2 ppm (cis CH in Chemical Formula (α)))+(integrated value of the peak at 19.2 ppm (trance CH in Chemical Formula (α)))]/2

[Chem. 25]

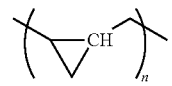

(α)

C: (Integrated value per one carbon of the cyclopentene skeletons)=[(integrated value of the peak at 43.1 ppm (cis CH in Chemical Formula (β)))+(integrated value of the peak at 46.3 ppm (trans CH in Chemical Formula (β)))]/2

[Chem. 26]

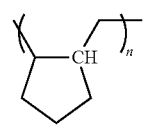

(β)

D: (Integrated value per one carbon of the 1,4-addition units)=[integrated value of the peaks at 131-130 ppm ($R^1$—HC=CH—$R^2$)]/2

E: (Integrated value per one carbon of the 1,3-addition units)=[integrated value of the peak at 137.3 ppm ($R^1$—HC=CH—CH(Me)—$R^2$)]

(Measurement of Glass Transition Temperature (Tg) and Melting Point (Tm))

The glass transition temperature (Tg) and the melting point (Tm) of the polymers were measured by DSC (differential scanning calorimetry) under the following conditions.

<Measurement Apparatus>

DSC-60 (manufactured by Shimadzu Corporation)

<Measurement Conditions>

In a $N_2$ (nitrogen) atmosphere, the polymer was heated from ordinary temperature to 200° C. at a temperature increasing rate of 50° C./min, held at the temperature for 5 minutes, cooled to −100° C. at a temperature decreasing rate of 10° C./min, and held at the temperature for 5 minutes. The temperature was again increased to 200° C. at a temperature increasing rate of 10° C./min. In Examples and Comparative Examples, the glass transition temperature and the melting point were obtained from an endothermic curve recorded during the second scanning.

Example 1

A 15 mL volume reactor (a parallel pressure catalytic reactor (product name: Endeavor) manufactured by Argonaut Inc., a system having parallel eight reactors) that had been thoroughly purged with nitrogen was charged with toluene and 0.2 mmol of triisobutylaluminum (also referred to as iBu$_3$Al). The liquid phase and the gas phase were saturated with 1,3-butadiene at 1.0 kg/cm$^2$·G at a temperature of 30° C. The mixture was heated to 40° C., and the reactor internal pressure was 1.1 kg/cm$^2$·G. The system was pressurized with ethylene gas so that the liquid phase and the gas phase were saturated and the reactor internal pressure was 2.0 kg/cm$^2$·G.

Thereafter, there was added 0.2 mL of a toluene solution (10 mmol/L) of dimethylsilyl[1-(2-methyl-4,5-benzoindenyl)](2,7-di-tert-butylfluorenyl) zirconium dichloride (complex 1) prepared with reference to the method described in J. Organomet. Chem. 2003, (688), 153. Subsequently, a toluene solution (4 mmol/L) of triphenylcarbenium tetrakis(pentafluorophenyl) borate (also referred to as Ph$_3$CB(C$_6$F$_5$)$_4$) was added in 1.0 equivalent relative to Zr, thereby initiating polymerization. The final amount of the supplied toluene was 5 mL. Ethylene gas was continuously fed to maintain the total pressure at 2.0 kg/cm$^2$·G. After the reaction was performed at 40° C. for 20 minutes, the polymerization was terminated by adding a small amount of methanol. After the completion of the polymerization, the reaction product was suspended in hexane, washed with diluted hydrochloric acid, concentrated, and dried under a reduced pressure at 20° C. for 10 hours. Thus, an ethylene/1,3-butadiene copolymer was obtained.

[Chem. 27]

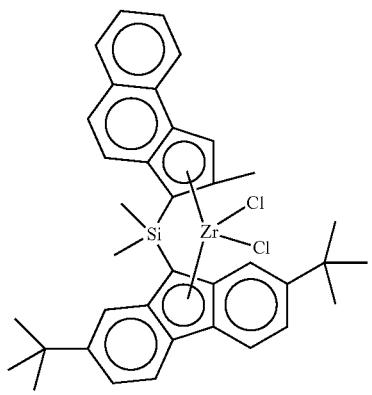

(Complex 1)

The yield of the ethylene/1,3-butadiene copolymer was 0.04 g. The reaction activity (yield per unit time [kg/h]/moles of the complex [mmol]) was 0.05 [kg/(mmol·h)]. The results are described in Tables 1 and 2.

Example 2

A 15 mL volume reactor (a parallel pressure catalytic reactor (product name: Endeavor) manufactured by Argonaut Inc., a system having parallel eight reactors) that had been thoroughly purged with nitrogen was charged with toluene and 1.5 mmol in terms of aluminum of a toluene solution of dry methylaluminoxane (Al=1.32 M) (containing methylaluminoxane (20 wt %) manufactured by Albemarle which had been distilled under reduced pressure to remove trimethylaluminum impurity, hereinafter, also referred to as DMAO). The liquid phase and the gas phase were saturated with 1,3-butadiene at 1.0 kg/cm$^2$·G at a temperature of 30° C. The mixture was heated to 40° C., and the reactor internal pressure was 1.1 kg/cm$^2$·G. The system was pressurized with ethylene gas so that the liquid phase and the gas phase were saturated and the reactor internal pressure was 9.0 kg/cm$^2$·G.

Thereafter, there was added 0.2 mL of a toluene solution (2.5 mmol/L) of rac-dimethylsilyl-bis [1-(2-methyl-4-phenylindenyl)]zirconium dichloride (complex 2) prepared by the method described in Organometallics 1994, 13, p. 954, thereby initiating polymerization. The final amount of the supplied toluene was 5 mL. Ethylene gas was continuously fed to maintain the total pressure at 9.0 kg/cm$^2$·G. After the reaction was performed at 40° C. for 20 minutes, the polymerization was terminated by adding a small amount of methanol. After the completion of the polymerization, the reaction product was suspended in hexane, washed with diluted hydrochloric acid, concentrated, and dried under a reduced pressure at 20° C. for 10 hours. Thus, an ethylene/1, 3-butadiene copolymer was obtained.

[Chem. 28]

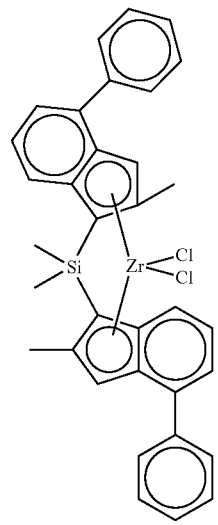

(complex 2)

The yield of the ethylene/1,3-butadiene copolymer was 1.29 g. The reaction activity (yield per unit time [kg/h]/moles of the complex [mmol]) was 1.93 [kg/(mmol·h)]. The results are described in Tables 1 and 2.

Example 3

1,3-Butadiene was fed to the reactor and heated to 40° C. in the same manner as described in Example 2, except that the toluene solution of methylaluminoxane (Al=1.32 M) in Example 2 was replaced by 0.05 mmol of triisobutylaluminum (also referred to as iBu$_3$Al).

The system was pressurized with ethylene gas so that the liquid phase and the gas phase were saturated and the reactor internal pressure was 2.0 kg/cm$^2$·G. Thereafter, there was added 0.2 mL of a toluene solution (2.5 mmol/L) of [hydrotris (3-mesitylpyrazol-1-yl)]borate zirconium trichloride (complex 3) prepared by the method described in Organometallics 2004, 23, p. 460. Subsequently, a toluene solution (4 mmol/L) of triphenylcarbenium tetrakis(pentafluorophenyl)borate (also referred to as Ph$_3$CB (C$_6$F$_5$)$_4$) was added in 1.0 equivalent relative to Zr, thereby initiating polymerization. The polymerization and the post treatments were carried out in the same manner as described in Example 2. Thus, an ethylene/ 1,3-butadiene copolymer was obtained.

[Chem. 29]

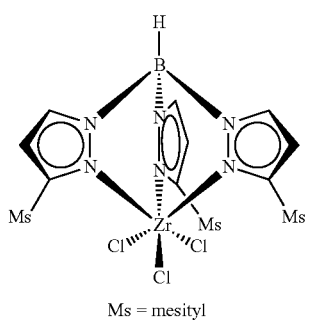

(complex 3)

Ms = mesityl

The yield of the ethylene/1,3-butadiene copolymer was 0.24 g. The reaction activity (yield per unit time [kg/h]/moles of the complex [mmol]) was 1.47 [kg/(mmol·h)]. The results are described in Tables 1 and 2.

Example 4

The polymerization and the post treatments were carried out in the same manner as described in Example 2, except that the system was pressurized with ethylene gas so that the liquid phase and the gas phase were saturated and the reactor internal pressure was 2.0 kg/cm$^2$·G, that there was added 0.2 mL of a toluene solution (2.5 mmol/L) of [hydrotris(3-mesitylpyrazol-1-yl)]borate zirconium trichloride (complex 3) prepared by the method described in Organometallics 2004, 23, p. 460, and that ethylene gas was continuously fed to maintain the total pressure at 2.0 kg/cm$^2$·G. Thus, an ethylene/1,3-butadiene copolymer was obtained.

The yield of the ethylene/1,3-butadiene copolymer was 0.53 g. The reaction activity (yield per unit time [kg/h]/moles of the complex [mmol]) was 3.21 [kg/(mmol·h)]. The results are described in Tables 1 and 2.

Example 5

The polymerization and the post treatments were carried out in the same manner as described in Example 4, except that after the liquid phase and the gas phase were saturated with 1,3-butadiene at 1.0 kg/cm$^2$·G at a temperature of 30° C., the mixture was heated to 60° C. and the reactor internal pressure was 1.5 kg/cm$^2$·G, that the system was pressurized with ethylene gas so that the liquid phase and the gas phase were saturated and the reactor internal pressure was 2.0 kg/cm$^2$·G, and that the polymerization was performed at 60° C. while continuously feeding ethylene gas to maintain the total pressure at 2.0 kg/cm$^2$·G. Thus, an ethylene/1,3-butadiene copolymer was obtained.

The yield of the ethylene/1,3-butadiene copolymer was 0.03 g. The reaction activity (yield per unit time [kg/h]/moles of the complex [mmol]) was 0.18 [kg/(mmol·h)]. The results are described in Tables 1 and 2.

Comparative Example 1

The polymerization and the post treatments were carried out in the same manner as described in Example 1, except that the amount of triisobutylaluminum was changed to 0.05 mmol, and that 0.2 mL of the toluene solution (10 mmol/L) of dimethylsilyl (2-methyl-4,5-benzoindenyl) (2,7-di-tert-butylfluorenyl) zirconium dichloride (complex 1) was replaced by 0.2 mL of a toluene solution (2.5 mmol/L) of [(tert-butylamido)dimethyl(tetramethylcyclopentadienyl) silane]titanium dichloride (complex 4) prepared by the method described in EP 416815 A2. Thus, an ethylene/1,3-butadiene copolymer was obtained.

[Chem. 30]

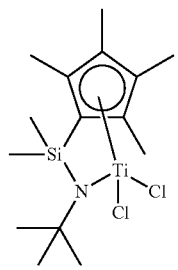

(complex 4)

The yield of the ethylene/1,3-butadiene copolymer was 0.18 g. The reaction activity (yield per unit time [kg/h]/moles of the complex [mmol]) was 1.08 [kg/(mmol·h)]. The results are described in Tables 1 and 2.

Comparative Example 2

The polymerization and the post treatments were carried out in the same manner as described in Example 1, except that the amount of triisobutylaluminum was changed to 0.05 mmol, and that 0.2 mL of the toluene solution (10 mmol/L) of dimethylsilyl[1-(2-methyl-4,5-benzoindenyl)](2,7-di-tert-butylfluorenyl)zirconium dichloride (complex 1) was replaced by 0.2 mL of a toluene solution (2.5 mmol/L) of [(tert-butylamido)dimethyl(fluorenyl)silane]titanium dimethyl (complex 5) prepared by the method descried in Macromolecules 1998, 31, p. 3184. Thus, an ethylene/1,3-butadiene copolymer was obtained.

[Chem. 31]

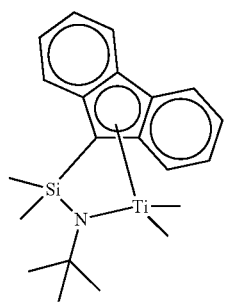

(complex 5)

The yield of the ethylene/1,3-butadiene copolymer was 0.37 g. The reaction activity (yield per unit time [kg/h]/moles of the complex [mmol]) was 2.24 [kg/(mmol·h)]. The results are described in Tables 1 and 2.

Comparative Example 3

The polymerization and the post treatments were carried out in the same manner as described in Example 1, except that the triisobutylaluminum was replaced by 1.5 mmol in terms of aluminum of a toluene solution of methylaluminoxane (Al=1.41 M), and that 0.2 mL of the toluene solution (10 mmol/L) of dimethylsilyl[1-(2-methyl-4,5-benzoindenyl)] (2,7-di-tert-butylfluorenyl) zirconium dichloride (complex 1) was replaced by 0.2 mL of a toluene solution (0.25 mmol/L) of [(tert-butylamido)dimethyl(fluorenyl)silane]titanium dimethyl (complex 5) prepared by the method descried in Macromolecules 1998, 31, p. 3184. Thus, an ethylene/1,3-butadiene copolymer was obtained.

The yield of the ethylene/1,3-butadiene copolymer was 0.13 g. The reaction activity (yield per unit time [kg/h]/moles of the complex [mmol]) was 0.80 [kg/(mmol·h)]. The results are described in Tables 1 and 2.

Comparative Example 4

1,3-Butadiene was fed to the reactor in the same manner as described in Example 1, except that the triisobutylaluminum was replaced by 1.5 mmol in terms of aluminum of a toluene solution of methylaluminoxane (Al-1.41 M). The mixture was heated to 40° C., and the reactor internal pressure was 1.1 kg/cm$^2$·G. The polymerization and the post treatments were carried out in the same manner as described in Example 1, except that the system was pressurized with ethylene gas so that the liquid phase and the gas phase were saturated and the reactor internal pressure was 9.0 kg/cm$^2$·G, and that 0.2 mL of the toluene solution (10 mmol/L) of dimethylsilyl[1-(2-methyl-4,5-benzoindenyl)](2,7-di-tert-butylfluorenyl)zirconium dichloride (complex 1) was replaced by 0.2 mL of a toluene solution (0.25 mmol/L) of [(tert-butylamido)dimethyl(fluorenyl)silane]titanium dimethyl (complex 5) prepared by the method descried in Macromolecules 1998, 31, p. 3184. Thus, an ethylene/1,3-butadiene copolymer was obtained.

The yield of the ethylene/1,3-butadiene copolymer was 1.70 g. The reaction activity (yield per unit time [kg/h]/moles of the complex [mmol]) was 10.20 [kg/(mmol·h)]. The results are described in Tables 1 and 2.

Comparative Example 5

The polymerization and the post treatments were carried out in the same manner as described in Example 3, except that the [hydrotris(3-mesitylpyrazol-1-yl)]borate zirconium trichloride (complex 3) was replaced by [(tert-butylamido) dimethyl(tetramethylcyclopentadienyl) silane]titanium dichloride (complex 4) prepared by the method described in EP 416815 A2. Thus, an ethylene/1,3-butadiene copolymer was obtained.

The yield of the ethylene/1,3-butadiene copolymer was 0.18 g. The reaction activity (yield per unit time [kg/h]/moles of the complex [mmol]) was 1.08 [kg/(mmol·h)]. The results are described in Tables 1 and 2.

Comparative Example 6

The polymerization and the post treatments were carried out in the same manner as described in Example 3, except that the [hydrotris(3-mesitylpyrazol-1-yl)]borate zirconium trichloride (complex 3) was replaced by [(tert-butylamido) dimethyl(fluorenyl)silane]titanium dimethyl (complex 5) prepared by the method descried in Macromolecules 1998, 31, p. 3184. Thus, an ethylene/1,3-butadiene copolymer was obtained.

The yield of the ethylene/1,3-butadiene copolymer was 0.37 g. The reaction activity (yield per unit time [kg/h]/moles of the complex [mmol]) was 2.24 [kg/(mmol·h)]. The results are described in Tables 1 and 2.

Comparative Example 7

The polymerization and the post treatments were carried out in the same manner as described in Example 4, except that the [hydrotris(3-mesitylpyrazol-1-yl)]borate zirconium trichloride (complex 3) was replaced by [(tert-butylamido) dimethyl(fluorenyl)silane]titanium dimethyl (complex 5) prepared by the method descried in Macromolecules 1998, 31, p. 3184. Thus, an ethylene/1,3-butadiene copolymer was obtained.

The yield of the ethylene/1,3-butadiene copolymer was 0.13 g. The reaction activity (yield per unit time [kg/h]/moles of the complex [mmol]) was 0.80 [kg/(mmol·h)]. The results are described in Tables 1 and 2.

Comparative Example 8

The polymerization and the post treatments were carried out in the same manner as described in Example 2, except that the rac-dimethylsilyl-bis[1-(2-methyl-4-phenylindenyl)]zirconium dichloride (complex 2) was replaced by [(tert-butylamido)dimethyl(fluorenyl)silane]titanium dimethyl (complex 5) prepared by the method descried in Macromolecules 1998, 31, p. 3184. Thus, an ethylene/1,3-butadiene copolymer was obtained.

The yield of the ethylene/1,3-butadiene copolymer was 1.70 g. The reaction activity (yield per unit time [kg/h]/moles of the complex [mmol]) was 10.20 [kg/(mmol·h)]. The results are described in Tables 1 and 2.

Example 6

A 4,000 mL volume SUS autoclave that had been thoroughly purged with nitrogen was charged with 1000 mL of hexane and 11.2 mmol in terms of aluminum of a toluene solution of dry methylaluminoxane (Al=1.50 M) (containing methylaluminoxane (20 wt %) manufactured by Albemarle which had been distilled under reduced pressure to remove trimethylaluminum impurity, hereinafter, also referred to as DMAO). Subsequently, 100 g of 1,3-butadiene was fed. (The internal pressure at 10° C. was 0.4 kg/cm$^2$·G). The mixture was heated to 60° C., and the autoclave internal pressure was 2.0 kg/cm$^2$·G. Further, 124 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm$^2$·G.

Subsequently, 8.0 mL of a toluene solution (0.5 mmol/L) of isopropylidene(3-tert-butyl-5-methyl-cyclopentadienyl) (fluorenyl)zirconium dichloride (complex 6) prepared by the method described in WO 2004/087775 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 8.0 kg/cm$^2$·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/1,3-butadiene copolymer was obtained.

[Chem. 32]

(complex 6)

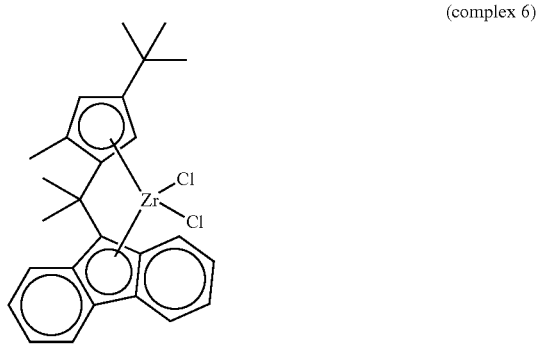

The yield of the ethylene/1,3-butadiene copolymer was 13.848 g. The reaction activity (yield per unit time [kg/h]/ moles of the complex [mmol]) was 10.39 [kg/(mmol·h)]. The results are described in Tables 3 and 4.

Example 7

The polymerization and the post treatments were carried out in the same manner as described in Example 6, except that 8.0 mL of the toluene solution (0.5 mmol/L) of isopropylidene(3-tert-butyl-5-methyl-cyclopentadienyl) (fluorenyl) zirconium dichloride (complex 6) was replaced by 8.0 mL of a toluene solution (0.5 mmol/L) of diphenylmethylene(3-tert-butyl-5-methyl-cyclopentadienyl) (2,7-di-tert-butylfluorenyl) zirconium dichloride (complex 7) prepared by the method described in WO 2004/087775. Thus, an ethylene/1,3-butadiene copolymer was obtained.

[Chem. 33]

(complex 7)

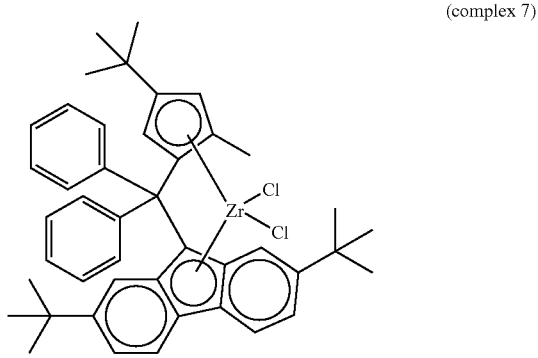

The yield of the ethylene/1,3-butadiene copolymer was 2.193 g. The reaction activity (yield per unit time [kg/h]/ moles of the complex [mmol]) was 1.64 [kg/(mmol·h)]. The results are described in Tables 3 and 4.

Example 8

The polymerization and the post treatments were carried out in the same manner as described in Example 6, except that 8.0 mL of the toluene solution (0.5 mmol/L) of isopropy-lidene(3-tert-butyl-5-methyl-cyclopentadienyl) (fluorenyl) zirconium dichloride (complex 6) was replaced by 8.0 mL of a toluene solution (0.5 mmol/L) of dimethylsilyl[1-(2-methyl-4,5-benzoindenyl)](2,7-di-tert-butylfluorenyl)zirconium dichloride (complex 1) prepared with reference to the method described in J. Organomet. Chem. 2003, (688), 153. Thus, an ethylene/1,3-butadiene copolymer was obtained.

The yield of the ethylene/1,3-butadiene copolymer was 4.294 g. The reaction activity (yield per unit time [kg/h]/ moles of the complex [mmol]) was 3.22 [kg/(mmol·h)]. The results are described in Tables 3 and 4.

Example 9

A 4,000 mL volume SUS autoclave that had been thoroughly purged with nitrogen was charged with 2000 mL of hexane and 11.2 mmol in terms of aluminum of a toluene solution of dry methylaluminoxane (Al=1.41 M) (containing methylaluminoxane (20 wt %) manufactured by Albemarle which had been distilled under reduced pressure to remove trimethylaluminum impurity, hereinafter, also referred to as DMAO). Subsequently, the liquid phase and the gas phase were saturated with 1,3-butadiene at 0.3 kg/cm²·G at a temperature of 10° C. The mixture was heated to 40° C., and the autoclave internal pressure was 0.8 kg/cm²·G. Further, the autoclave was pressurized with ethylene gas so that the liquid phase and the gas phase were saturated and the autoclave internal pressure was 4.0 kg/cm²·G.

Subsequently, 12.0 mL of a toluene solution (5.0 mmol/L) of isopropylidene(3-tert-butyl-5-methyl-cyclopentadienyl) (fluorenyl)zirconium dichloride (complex 6) prepared by the method described in WO 2004/087775 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 4.0 kg/cm²·G. After the reaction was performed at 40° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 10 hours. Thus, an ethylene/1,3-butadiene copolymer was obtained.

The yield of the ethylene/1,3-butadiene copolymer was 13.81 g. The reaction activity (yield per unit time [kg/h]/ moles of the complex [mmol]) was 0.69 [kg/(mmol·h)]. The results are described in Tables 3 and 4.

Example 10

The polymerization and the post treatments were carried out in the same manner as described in Example 9, except that the autoclave internal pressure after the liquid phase and the gas phase were saturated with 1,3-butadiene was changed from 0.3 kg/cm²·G at 10° C. and 0.8 kg/cm²·G at 40° C. to 0.7 kg/cm²·G at 10° C. and 1.3 kg/cm²·G at 40° C. (100 g of 1,3-butadiene was charged), and that the autoclave was pressurized with ethylene gas so that the liquid phase and the gas phase were saturated and the autoclave internal pressure was 8.0 kg/cm²·G. Thus, an ethylene/1,3-butadiene copolymer was obtained.

The yield of the ethylene/1,3-butadiene copolymer was 34.358 g. The reaction activity (yield per unit time [kg/h]/

Example 11

The polymerization and the post treatments were carried out in the same manner as described in Example 9, except that 12.0 mL of the toluene solution (5.0 mmol/L) of isopropylidene(3-tert-butyl-5-methyl-cyclopentadienyl) (fluorenyl) zirconium dichloride (complex 6) was replaced by 12.0 mL of a toluene solution (5.0 mmol/L) of diphenylmethylene(3-tert-butyl-5-methyl-cyclopentadienyl) (2,7-di-tert-butylfluorenyl) zirconium dichloride (complex 7) prepared by the method described in WO 2004/087775. Thus, an ethylene/1, 3-butadiene copolymer was obtained.

The yield of the ethylene/1,3-butadiene copolymer was 0.28 g. The reaction activity (yield per unit time [kg/h]/moles of the complex [mmol]) was 0.01 [kg/(mmol·h)]. The results are described in Tables 3 and 4.

Example 12

The polymerization and the post treatments were carried out in the same manner as described in Example 9, except that 12.0 mL of the toluene solution (5.0 mmol/L) of isopropylidene(3-tert-butyl-5-methyl-cyclopentadienyl) (fluorenyl) zirconium dichloride (complex 6) was replaced by 12.0 mL of a toluene solution (5.0 mmol/L) of dimethylsilyl[1-(2-methyl-4,5-benzoindenyl)](2,7-di-tert-butylfluorenyl) zirconium dichloride (complex 1) prepared with reference to the method described in J. Organomet. Chem. 2003, (688), 153. Thus, an ethylene/1,3-butadiene copolymer was obtained.

The yield of the ethylene/1,3-butadiene copolymer was 1.931 g. The reaction activity (yield per unit time [kg/h]/moles of the complex [mmol]) was 0.10 [kg/(mmol·h)]. The results are described in Tables 3 and 4.

Example 13

A 1,000 mL volume SUS autoclave that had been thoroughly purged with nitrogen was charged with 250 mL of hexane and 0.5 mmol in terms of aluminum of a toluene solution of triisobutylaluminum (Al=0.25 M). Subsequently, 25 g of 1,3-butadiene was charged. The mixture was heated to 60° C., and the autoclave internal pressure was 2.4 kg/cm²·G. Further, 372 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm²·G.

Subsequently, 4.0 mL of a toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was added to a 20 ml volume catalyst supply pot which had been connected to the autoclave and had been thoroughly purged with nitrogen. The complex was forcibly fed with nitrogen to the autoclave. Thereafter, a toluene solution (4.0 mmol/L) of triphenylcarbenium tetrakis(pentafluorophenyl)borate in 6.0 equivalents relative to Zr was forcibly fed with nitrogen to the autoclave, thereby initiating the polymerization.

Ethylene gas was continuously fed to maintain the autoclave internal pressure at 8.0 kg/cm²·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/1,3-butadiene copolymer was obtained.

The yield of the ethylene/1,3-butadiene copolymer was 9.42 g. The reaction activity (yield per unit time [kg/h]/moles of the complex [mmol]) was 14.13 [kg/(mmol·h)]. The results are described in Tables 3 and 4.

Example 14

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-dimethylsilyl-bis[1-(2-n-propyl-4-(9-phenanthryl) indenyl)]zirconium dichloride (complex 8) prepared by the method described in JP-A-H07-286005. Thus, an ethylene/1,3-butadiene copolymer was obtained.

[Chem. 34]

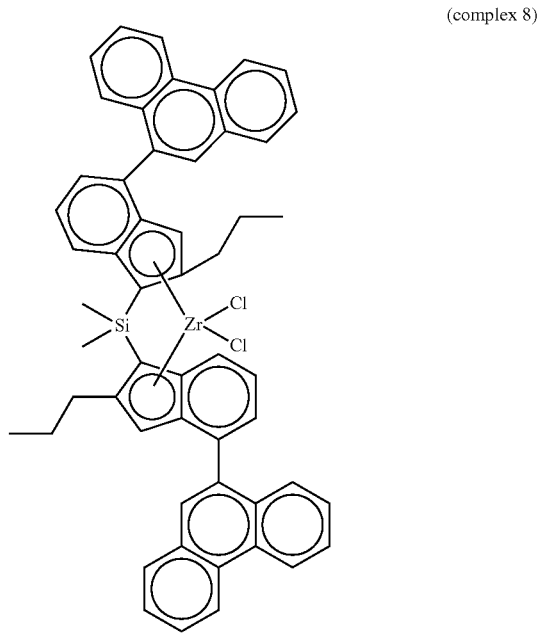

(complex 8)

The yield of the ethylene/1,3-butadiene copolymer was 2.43 g. The reaction activity (yield per unit time [kg/h]/moles of the complex [mmol]) was 3.64 [kg/(mmol·h)]. The results are described in Tables 3 and 4.

Example 15

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-dimethylsilyl-bis(2-ethyl-4-phenylindenyl) zirconium dichloride (complex 9) prepared by the method described in JP-A-H07-286005. Thus, an ethylene/1,3-butadiene copolymer was obtained.

[Chem. 35]

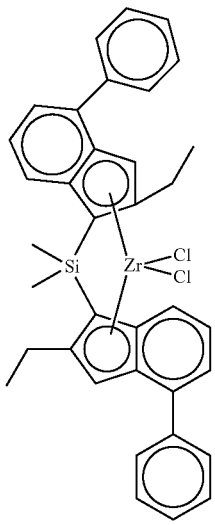

(complex 9)

The yield of the ethylene/1,3-butadiene copolymer was 4.16 g. The reaction activity (yield per unit time [kg/h]/moles of the complex [mmol]) was 6.23 [kg/(mmol·h)]. The results are described in Tables 3 and 4.

Example 16

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-dimethylsilyl-bis[1-(2-methyl-4-(p-trifluoromethylphenyl)indenyl)]zirconium dichloride (complex 10) prepared by the method described in JP-A-H07-138312. Thus, an ethylene/1,3-butadiene copolymer was obtained.

[Chem. 36]

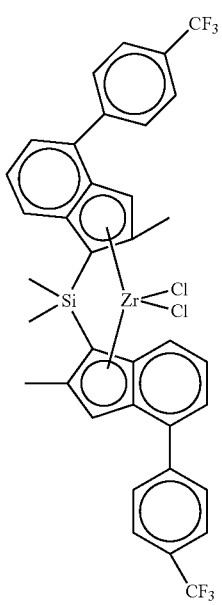

(complex 10)

The yield of the ethylene/1,3-butadiene copolymer was 2.26 g. The reaction activity (yield per unit time [kg/h]/moles of the complex [mmol]) was 3.39 [kg/(mmol·h)]. The results are described in Tables 3 and 4.

Example 17

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) rac-dimethylsilyl-bis[1-(2-n-propyl-4-(1-naphthyl) indenyl)]zirconium dichloride (complex 11) prepared by the method described in JP-A-H07-286005. Thus, an ethylene/1,3-butadiene copolymer was obtained.

[Chem. 37]

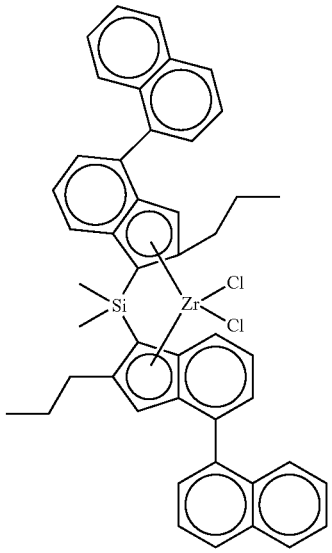

(complex 11)

The yield of the ethylene/1,3-butadiene copolymer was 4.56 g. The reaction activity (yield per unit time [kg/h]/moles of the complex [mmol]) was 6.84 [kg/(mmol·h)]. The results are described in Tables 3 and 4.

Example 18

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-(methyl) (phenyl) silyl-bis[1-(6-chloro-2-ethyl-4-(9-phenanthryl-indenyl))] zirconium dichloride (complex 12) prepared by the method described in JP-A-H07-286005. Thus, an ethylene/1,3-butadiene copolymer was obtained.

[Chem. 38]

(complex 12)

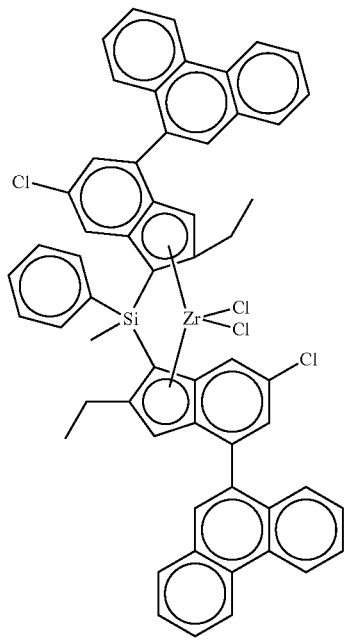

[Chem. 39]

(complex 13)

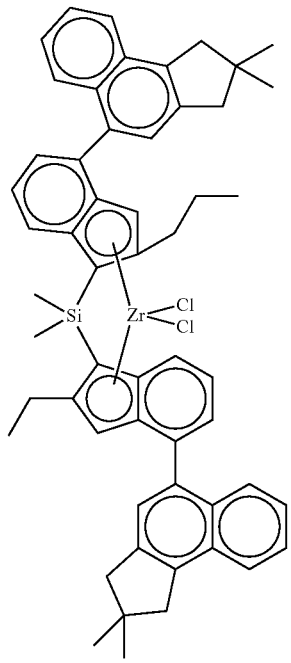

The yield of the ethylene/1,3-butadiene copolymer was 0.69 g. The reaction activity (yield per unit time [kg/h]/moles of the complex [mmol]) was 1.04 [kg/(mmol·h)]. The results are described in Tables 3 and 4.

Example 19

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-dimethylsilyl-[1-(2-ethyl-4-(5-(2,2-dimethyl-2,3-dihydro-1H-cyclopenta[a]naphthalenyl)indenyl))][1-(2-n-propyl-4-(5-(2,2-dimethyl-2,3-dihydro-1H-cyclopenta[a]naphthalenyl)indenyl))]zirconium dichloride (complex 13) prepared by the method described in JP-A-H10-087716. Thus, an ethylene/1,3-butadiene copolymer was obtained.

The yield of the ethylene/1,3-butadiene copolymer was 3.53 g. The reaction activity (yield per unit time [kg/h]/moles of the complex [mmol]) was 5.29 [kg/(mmol·h)]. The results are described in Tables 3 and 4.

Example 20

The polymerization and the post treatments were carried out in the same manner as described in Example 13, except that 4.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 4.0 mL of a toluene solution (0.5 mmol/L) of rac-dimethylsilyl-bis[1-(2-methyl-4,5-benzoindenyl)]zirconium dichloride (complex 14) prepared by the method described in Organometallics 1994, 13, p. 954. Thus, an ethylene/1,3-butadiene copolymer was obtained.

[Chem. 40]

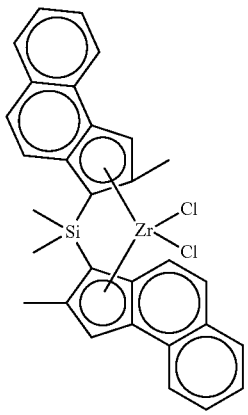

(complex 14)

The yield of the ethylene/1,3-butadiene copolymer was 29.94 g. The reaction activity (yield per unit time [kg/h]/moles of the complex [mmol]) was 44.91 [kg/(mmol·h)]. The results are described in Tables 3 and 4.

Example 21

A 1,000 mL volume SUS autoclave that had been thoroughly purged with nitrogen was charged with 500 mL of hexane and 5.60 mmol in terms of aluminum of a toluene solution of dry methylaluminoxane (Al=1.63 M) (containing methylaluminoxane (20 wt %) manufactured by Albemarle which had been distilled under reduced pressure to remove trimethylaluminum impurity, hereinafter, also referred to as DMAO). Subsequently, 25 g of 1,3-butadiene was added. (The internal pressure at 10° C. was 0.4 kg/cm²·G.) The mixture was heated to 40° C., and the autoclave internal pressure was 1.0 kg/cm²·G. Further, 310 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm²·G.

Subsequently, 4.0 mL of a toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 8.0 kg/cm²·G. After the reaction was performed at 40° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/1,3-butadiene copolymer was obtained.

The yield of the ethylene/1,3-butadiene copolymer was 6.53 g. The reaction activity (yield per unit time [kg/h]/moles of the complex [mmol]) was 9.79 [kg/(mmol·h)]. The results are described in Tables 3 and 4.

Example 22

A 1,000 mL volume SUS autoclave that had been thoroughly purged with nitrogen was charged with 500 mL of hexane and 2.0 mmol in terms of aluminum of a toluene solution of triisobutylaluminum (Al=0.25 M). Subsequently, 40 g of 1,3-butadiene was added. (The internal pressure at 10° C. was 0.7 kg/cm²·G.) The mixture was heated to 60° C., and the autoclave internal pressure was 2.2 kg/cm²·G. Further, 248 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm²·G.

Subsequently, 16.0 mL of a toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was added to a 20 ml volume catalyst supply pot which had been connected to the autoclave and had been thoroughly purged with nitrogen. The complex was forcibly fed with nitrogen to the autoclave. Thereafter, a toluene solution (4.0 mmol/L) of triphenylcarbenium tetrakis(pentafluorophenyl)borate in 6.0 equivalents relative to Zr was forcibly fed with nitrogen to the autoclave, thereby initiating the polymerization.

Ethylene gas was continuously fed to maintain the autoclave internal pressure at 8.0 kg/cm²·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/1,3-butadiene copolymer was obtained.

The yield of the ethylene/1,3-butadiene copolymer was 33.78 g. The reaction activity (yield per unit time [kg/h]/moles of the complex [mmol]) was 12.67 [kg/(mmol·h)]. The results are described in Tables 3 and 4.

Example 23

A 1,000 ml volume SUS autoclave that had been thoroughly purged with nitrogen was charged with 500 mL of hexane and 5.60 mmol in terms of aluminum of a toluene solution of modified methylaluminoxane (modified methylaluminoxane type 3A manufactured by Tosoh Finechem Corporation, also referred to as MMAO-3A) (Al=1.42 M). Subsequently, 50 g of 1,3-butadiene was added. The mixture was heated to 40° C., and the autoclave internal pressure was 1.8 kg/cm²·G. Further, 372 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm²·G.

Subsequently, 16.0 mL of a toluene solution (0.5 mmol/L) of rac-dimethylsilyl-bis[1-(2-n-propyl-4-(9-phenanthryl)indenyl)]zirconium dichloride (complex 8) prepared by the method described in JP-A-H07-286005 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 8.0 kg/cm²·G. After the reaction was performed at 40° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/1,3-butadiene copolymer was obtained.

The yield of the ethylene/1,3-butadiene copolymer was 4.80 g. The reaction activity (yield per unit time [kg/h]/moles of the complex [mmol]) was 1.80 [kg/(mmol·h)]. The results are described in Tables 3 and 4.

Example 24

The polymerization and the post treatments were carried out in the same manner as described in Example 23, except that the amount of 1,3-butadiene was changed from 50 g to 60 g, and that the polymerization temperature was changed from 40° C. to 60° C. (the autoclave internal pressure at 60° C. was 3.1 kg/cm²·G). Thus, an ethylene/1,3-butadiene copolymer was obtained.

The yield of the ethylene/1,3-butadiene copolymer was 1.05 g. The reaction activity (yield per unit time [kg/h]/moles of the complex [mmol]) was 0.39 [kg/(mmol·h)]. The results are described in Tables 3 and 4.

Example 25

The polymerization and the post treatments were carried out in the same manner as described in Example 22, except that 16.0 mL of the toluene solution (0.5 mmol/L) of rac-dimethylsilyl-bis[1-(2-methyl-4-phenylindenyl)]zirconium dichloride (complex 2) prepared by the method described in Organometallics 1994, 13, p. 954 was replaced by 16.0 mL of a toluene solution (0.5 mmol/L) of rac-dimethylsilyl-bis[1-(2-n-propyl-4-(9-phenanthryl) indenyl)]zirconium dichloride (complex 8) prepared by the method described in JP-A-H07-286005. Thus, an ethylene/1,3-butadiene copolymer was obtained.

The yield of the ethylene/1,3-butadiene copolymer was 13.38 g. The reaction activity (yield per unit time [kg/h]/moles of the complex [mmol]) was 5.02 [kg/(mmol·h)]. The results are described in Tables 3 and 4.

Example 26

The polymerization and the post treatments were carried out in the same manner as described in Example 25, except that the amount of hydrogen was changed to 372 mL (the volume at 20° C. and atmospheric pressure). Thus, an ethylene/1,3-butadiene copolymer was obtained.

The yield of the ethylene/1,3-butadiene copolymer was 11.49 g. The reaction activity (yield per unit time [kg/h]/moles of the complex [mmol]) was 4.310 [kg/(mmol·h)]. The results are described in Tables 3 and 4.

Example 27

The polymerization and the post treatments were carried out in the same manner as described in Example 26, except that the amount of 1,3-butadiene was changed from 40 g to 50 g (the internal pressure at 60° C. was 3.4 kg/cm²·G). Thus, an ethylene/1,3-butadiene copolymer was obtained.

The yield of the ethylene/1,3-butadiene copolymer was 7.03 g. The reaction activity (yield per unit time [kg/h]/moles of the complex [mmol]) was 2.64 [kg/(mmol·h)]. The results are described in Tables 3 and 4.

Example 28

The polymerization and the post treatments were carried out in the same manner as described in Example 27, except that 16.0 ml of the toluene solution (0.5 mmol/L) of rac-dimethylsilyl-bis[1-(2-n-propyl-4-(9-phenanthryl) indenyl)] zirconium dichloride (complex 8) prepared by the method described in JP-A-H07-286005 was replaced by 16.0 mL of a toluene solution (0.5 mmol/L) of rac-dimethylsilyl-bis[1-(2-ethyl-4-(9-phenanthryl) indenyl)]zirconium dichloride (complex 15) prepared by the method described in JP-A-H07-286005. Thus, an ethylene/1,3-butadiene copolymer was obtained.

[Chem. 41]

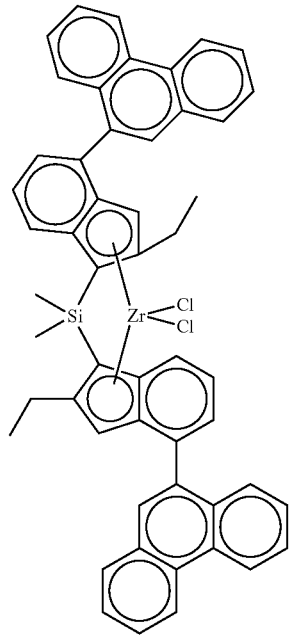

(complex 15)

The yield of the ethylene/1,3-butadiene copolymer was 6.23 g. The reaction activity (yield per unit time [kg/h]/moles of the complex [mmol]) was 2.34 [kg/(mmol·h)]. The results are described in Tables 3 and 4.

Example 29

A 4,000 mL volume SUS autoclave that had been thoroughly purged with nitrogen was charged with 1000 mL of hexane and 11.2 mmol in terms of aluminum of a toluene solution of methylaluminoxane (Al=1.41 M). Subsequently, the liquid phase and the gas phase were saturated with 1,3-butadiene at 0.4 kg/cm²·G at a temperature of 10° C. The mixture was heated to 60° C., and the autoclave internal pressure was 2.0 kg/cm²·G. Further, the autoclave was pressurized with ethylene gas so that the liquid phase and the gas phase were saturated and the autoclave internal pressure was 8.0 kg/cm²·G. Subsequently, 8.0 mL of a toluene solution (2.5 mmol/L) of rac-dimethylsilyl-bis[1-(2-methyl-4-phenylindenyl)]zirconium dichloride (complex 2) prepared by the method described in Organometallics 1994, 13, p. 954 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 8.0 kg/cm²·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 10 hours. Thus, an ethylene/1,3-butadiene copolymer was obtained. The results are described in Tables 3 and 4.

The yield of the ethylene/1,3-butadiene copolymer was 20.013 g. The reaction activity (yield per unit time [kg/h]/moles of the complex [mmol]) was 3.00 [kg/(mmol·h)]. The results are described in Tables 3 and 4.

Example 30

A 4,000 mL volume SUS autoclave that had been thoroughly purged with nitrogen was charged with 2000 mL of hexane and 11.2 mmol in terms of aluminum of a toluene solution of methylaluminoxane (Al=1.41 M). Subsequently, the liquid phase and the gas phase were saturated with 1,3-butadiene at 0.5 kg/cm$^2$·G at a temperature of 10° C. The mixture was heated to 40° C., and the autoclave internal pressure was 1.1 kg/cm$^2$·G. Further, 124 mL of hydrogen (the volume at 20° C. and atmospheric pressure) was added, and the autoclave was pressurized with ethylene gas so that the liquid phase and the gas phase were saturated and the autoclave internal pressure was 4.0 kg/cm$^2$·G. Subsequently, 8.0 mL of a toluene solution (2.5 mmol/L) of rac-dimethylsilyl-bis[1-(2-methyl-4-phenylindenyl)]zirconium dichloride (complex 2) prepared by the method described in Organometallics 1994, 13, p. 954 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 4.0 kg/cm$^2$·G. After the reaction was performed at 40° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 10 hours. Thus, an ethylene/1,3-butadiene copolymer was obtained.

The yield of the ethylene/1,3-butadiene copolymer was 3.243 g. The reaction activity (yield per unit time [kg/h]/moles of the complex [mmol]) was 0.49 [kg/(mmol·h)]. The results are described in Tables 3 and 4.

Example 31

A 4,000 mL volume SUS autoclave that had been thoroughly purged with nitrogen was charged with 2000 mL of hexane and 11.2 mmol in terms of aluminum of a toluene solution of methylaluminoxane (Al=1.41 M). Subsequently, the liquid phase and the gas phase were saturated with 1,3-butadiene at 0.3 kg/cm$^2$·G at a temperature of 10° C. The mixture was heated to 40° C., and the autoclave internal pressure was 0.8 kg/cm$^2$·G. Further, the autoclave was pressurized with ethylene gas so that the liquid phase and the gas phase were saturated and the autoclave internal pressure was 4.0 kg/cm$^2$·G. Subsequently, 12.0 mL of a toluene solution (5.0 mmol/L) of rac-dimethylsilyl-bis[1-(2-n-propyl-4-(9-phenanthryl) indenyl)]zirconium dichloride (complex 8) prepared by the method described in JP-A-H07-286005 was added to a 20 ml volume catalyst supply pot which had been connected to the autoclave and had been thoroughly purged with nitrogen. The complex was forcibly fed with nitrogen to the autoclave, thereby initiating the polymerization.

Ethylene gas was continuously fed to maintain the autoclave internal pressure at 4.0 kg/cm$^2$·G. After the reaction was performed at 40° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for TO hours. Thus, an ethylene/1,3-butadiene copolymer was obtained. The results are described in Tables 3 and 4.

The yield of the ethylene/1,3-butadiene copolymer was 1.409 g. The reaction activity (yield per unit time [kg/h]/moles of the complex [mmol]) was 0.07 [kg/(mmol·h)]. The results are described in Tables 3 and 4.

Example 32

A 1,000 mL volume SUS autoclave that had been thoroughly purged with nitrogen was charged with 500 mL of hexane, 2.0 mmol in terms of aluminum of a toluene solution of trisobutylaluminum (Al=0.25 M), and 5 mL of 1-octene. Subsequently, 40 g of 1,3-butadiene was added. (The internal pressure at 10° C. was 0.7 kg/cm$^2$·G.) The mixture was heated to 40° C., and the autoclave internal pressure was 1.4 kg/cm$^2$·G. Further, 248 mL of hydrogen (the volume at 20° C. and atmospheric pressure) was added, and the autoclave was pressurized with ethylene gas so that the liquid phase and the gas phase were saturated and the autoclave internal pressure was 8.0 kg/cm$^2$·G.

Subsequently, 16.0 mL of a toluene solution (0.5 mmol/L) of rac-dimethylsilyl-bis[1-(2-n-propyl-4-(9-phenanthryl)indenyl)]zirconium dichloride (complex 8) prepared by the method described in JP-A-H07-286005 was added to a 20 ml volume catalyst supply pot which had been connected to the autoclave and had been thoroughly purged with nitrogen. The complex was forcibly fed with nitrogen to the autoclave. Thereafter, a toluene solution (4.0 mmol/L) of triphenylcarbenium tetrakis(pentafluorophenyl)borate in 6.0 equivalents relative to Zr was forcibly fed with nitrogen to the autoclave, thereby initiating the polymerization.

Ethylene gas was continuously fed to maintain the autoclave internal pressure at 8.0 kg/cm$^2$·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 24 hours. Thus, an ethylene/octene/1,3-butadiene copolymer was obtained.

The yield of the ethylene/octene/1,3-butadiene copolymer was 7.40 g. The reaction activity (yield per unit time [kg/h]/moles of the complex [mmol]) was 2.78 [kg/(mmol·h)]. The results are described in Tables 3 and 4.

Example 33

The polymerization and the post treatments were carried out in the same manner as described in Example 32, except that the polymerization temperature was changed from 40° C. to 60° C. (the autoclave internal pressure at 60° C. was 2.4 kg/cm$^2$·G), and that the amount of hydrogen was changed from 248 mL to 372 mL (the volume at 20° C. and atmospheric pressure). Thus, an ethylene/octene/1,3-butadiene copolymer was obtained.

The yield of the ethylene/octene/1,3-butadiene copolymer was 13.83 g. The reaction activity (yield per unit time [kg/h]/moles of the complex [mmol]) was 5.19 [kg/(mmol·h)]. The results are described in Tables 3 and 4.

Example 34

A 4,000 mL volume SUS autoclave that had been thoroughly purged with nitrogen was charged with 1000 mL of hexane and 11.2 mmol in terms of aluminum of a toluene solution of methylaluminoxane (Al=1.24 M). Subsequently, 100 g of 1,3-butadiene was added. (The internal pressure at 10° C. was 0.4 kg/cm²·G.) The mixture was heated to 60° C., and the autoclave internal pressure was 2.1 kg/cm²·G. Further, 620 mL of hydrogen (the volume at 20° C. and atmospheric pressure) was added. (The autoclave internal pressure after the hydrogen addition was 2.4 kg/cm²·G.) The autoclave was pressurized with propylene gas so that the liquid phase and the gas phase were saturated and the autoclave internal pressure was 3.4 kg/cm²·G. Subsequently, the autoclave was further pressurized with ethylene gas so that the liquid phase and the gas phase were saturated and the autoclave internal pressure was 8.0 kg/cm²·G.

Thereafter, 8.0 mL of a toluene solution (0.5 mmol/L) of rac-dimethylsilyl-bis[1-(2-n-propyl-4-(9-phenanthryl) indenyl)]zirconium dichloride (complex 8) prepared by the method described in JP-A-H07-286005 was added to a 20 ml volume catalyst supply pot which had been connected to the autoclave and had been thoroughly purged with nitrogen. The complex was forcibly fed nitrogen to the autoclave, thereby initiating the polymerization.

Ethylene gas was continuously fed to maintain the autoclave internal pressure at 8.0 kg/cm²·G. After the reaction was performed at 60° C. for 20 minutes, the polymerization was terminated by adding a small amount of methanol. After the completion of the polymerization, the polymer solution was poured into a large excess of methanol containing hydrochloric acid to precipitate the polymer. The polymer was separated by filtration and was dried under reduced pressure at 20° C. for 20 hours. Thus, an ethylene/propylene/1,3-butadiene copolymer was obtained. The results are described in Tables 3 and 4.

The yield of the ethylene/1,3-butadiene copolymer was 7.61 g. The reaction activity (yield per unit time [kg/h]/moles of the complex [mmol]) was 5.71 [kg/(mmol·h)]. The results are described in Tables 3 and 4.

Comparative Example 9

The polymerization and the post treatments were carried out in the same manner as described in Example 6, except that 11.2 mmol in terms of aluminum of the toluene solution of dry methylaluminoxane (Al=1.50 M) was replaced by 1.0 mmol in terms of aluminum of a toluene solution (0.25 mol/L) of triisobutylaluminum, that hydrogen was not added, that 8.0 mL of the toluene solution (0.5 mmol/L) of isopropylidene(3-tert-butyl-5-methyl-cyclopentadienyl) (fluorenyl) zirconium dichloride (complex 6) prepared by the method described in WO 2004/087775 was replaced by 8.0 mL of a toluene solution (0.5 mmol/L) of (tert-butylamido)dimethyl (tetramethyl-$\eta^5$-cyclopentadienyl) silanetitanium dichloride (complex 4) prepared by the method described in EP 0416815 (A2), and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl)borate in 6.0 equivalents relative to Ti was forcibly fed to the autoclave, thereby initiating the polymerization. Thus, an ethylene/1,3-butadiene copolymer was obtained.

The yield of the ethylene/1,3-butadiene copolymer was 5.69 g. The reaction activity (yield per unit time [kg/h]/moles of the complex [mmol]) was 4.26 [kg/(mmol·h)]. The results are described in Tables 3 and 4.

Comparative Example 10

The polymerization and the post treatments were carried out in the same manner as described in Example 6, except that 11.2 mmol in terms of aluminum of the toluene solution of dry methylaluminoxane (Al=1.50 M) was replaced by 1.0 mmol in terms of aluminum of a toluene solution (0.25 mol/L) of triisobutylaluminum, that the amount of hydrogen was changed from 124 mL (the volume at 20° C. and atmospheric pressure) to 620 mL (the volume at 20° C. and atmospheric pressure) and thereby the ethylene partial pressure at 60° C. after the ethylene feed changed from 6.0 kg/cm²·G to 5.6 kg/cm²·G, that 8.0 mL of the toluene solution (0.5 mmol/L) of isopropylidene(3-tert-butyl-5-methyl-cyclopentadienyl) (fluorenyl)zirconium dichloride (complex 6) prepared by the method described in WO 2004/087775 was replaced by 8.0 mL of a toluene solution (0.5 mmol/L) of (tert-butylamido) dimethyl(tetramethyl-$\eta^5$-cyclopentadienyl) silanetitanium dichloride (complex 4) prepared by the method described in EP 0416815 (A2), and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl)borate in 6.0 equivalents relative to Ti was forcibly fed to the autoclave, thereby initiating the polymerization. Thus, an ethylene/1,3-butadiene copolymer was obtained.

The yield of the ethylene/1,3-butadiene copolymer was 1.22 g. The reaction activity (yield per unit time [kg/h]/moles of the complex [mmol]) was 0.92 [kg/(mmol·h)]. The results are described in Tables 3 and 4.

Comparative Example 11

The polymerization and the post treatments were carried out in the same manner as described in Example 6, except that 11.2 mmol in terms of aluminum of the toluene solution of dry methylaluminoxane (Al=1.50 M) was replaced by 1.0 mmol in terms of aluminum of a toluene solution (0.25 mol/L) of triisobutylaluminum, that hydrogen was not added, that 8.0 mL of the toluene solution (0.5 mmol/L) of isopropylidene(3-tert-butyl-5-methyl-cyclopentadienyl) (fluorenyl) zirconium dichloride (complex 6) prepared by the method described in WO 2004/087775 was replaced by 8.0 mL a toluene solution (0.5 mmol/L) of [(tert-butylamido)dimethyl (fluorenyl)silane]titanium dimethyl (complex 5) prepared by the method descried in Macromolecules 1998, 31, p. 3184, and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl)borate in 6.0 equivalents relative to Ti was forcibly fed to the autoclave, thereby initiating the polymerization. Thus, an ethylene/1,3-butadiene copolymer was obtained.

The yield of the ethylene/1,3-butadiene copolymer was 7.44 g. The reaction activity (yield per unit time [kg/h]/moles of the complex [mmol]) was 5.58 [kg/(mmol·h)]. The results are described in Tables 3 and 4.

Comparative Example 12

The polymerization and the post treatments were carried out in the same manner as described in Example 6, except that 11.2 mmol in terms of aluminum of the toluene solution of dry methylaluminoxane (Al=1.50 M) was replaced by 1.0 mmol in terms of aluminum of a toluene solution (0.25 mol/L) of triisobutylaluminum, that the amount of hydrogen was changed from 124 mL (the volume at 20° C. and atmospheric pressure) to 620 rut (the volume at 20° C. and atmospheric pressure) and thereby the ethylene partial pressure at 60° C. after the ethylene feed changed from 6.0 g/cm$^2$·G to 5.6 kg/cm$^2$·G, that 8.0 mL of the toluene solution (0.5 mmol/L) of isopropylidene(3-tert-butyl-5-methyl-cyclopentadienyl)(fluorenyl)zirconium dichloride (complex 6) prepared by the method described in WO 2004/087775 was replaced by 8.0 mL of a toluene solution (0.5 mmol/L) of [(tert-butylamido)dimethyl(fluorenyl)silane]titanium dimethyl (complex 5) prepared by the method descried in Macromolecules 1998, 31, p. 3184, and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl)borate in 6.0 equivalents relative to Ti was forcibly fed to the autoclave, thereby initiating the polymerization. Thus, an ethylene/1,3-butadiene copolymer was obtained.

The yield of the ethylene/1,3-butadiene copolymer was 86.48 g. The reaction activity (yield per unit time [kg/h]/moles of the complex [mmol]) was 64.86 [kg/(mmol·h)]. The results are described in Tables 3 and 4.

Comparative Example 13

The polymerization and the post treatments were carried out in the same manner as described in Example 9, except that 11.2 mmol in terms of aluminum of the toluene solution of methylaluminoxane (Al=1.41 M) was replaced by 3.0 mmol in terms of aluminum of a toluene solution of triisobutylaluminum (Al=0.25 M), that the autoclave internal pressure after the liquid phase and the gas phase were saturated with 1,3-butadiene was changed from 0.3 kg/cm$^2$·G at 10° C. and 0.8 kg/cm$^2$·G at 40° C. to 0.5 kg/cm$^2$·G at 10° C. and 1.1 kg/cm$^2$·G at 40° C., that 12.0 mL of the toluene solution (5.0 mmol/L) of isopropylidene(3-tert-butyl-5-methyl-cyclopentadienyl) (fluorenyl)zirconium dichloride (complex 6) prepared by the method described in WO 2004/087775 was replaced by 12.0 mL of a toluene solution (5.0 mmol/L) of [(tert-butylamide)dimethyl(fluorenyl)silane]titanium dimethyl (complex 5) prepared by the method descried in Macromolecules 1998, 31, p. 3184, and this toluene solution was added to the 20 ml volume catalyst supply pot which had been connected to the autoclave and had been thoroughly purged with nitrogen, that after the above toluene solution was forcibly fed with nitrogen to the autoclave, a toluene solution (4.0 mmol/L) of triphenylcarbenium tetrakis(pentafluorophenyl) borate in 1.2 equivalents relative to Ti was forcibly fed to the autoclave, thereby initiating the polymerization, and that the polymerization time was changed to 12 minutes. Thus, an ethylene/1,3-butadiene copolymer was obtained.

The yield of the ethylene/1,3-butadiene copolymer was 243.86 g. The reaction activity (yield per unit time [kg/h]/moles of the complex [mmol]) was 20.32 [kg/(mmol·h)]. The results are described in Tables 3 and 4.

In Comparative Example 13, the monomers (ethylene and butadiene) reacted in larger amounts than in Examples and other Comparative Examples, and consequently the reaction temperature was variable. The pressures of the components described in Table 2 (a) are pressures at a reaction temperature of 40° C.

Comparative Example 14

The polymerization and the post treatments were carried out in the same manner as described in Example 8, except that 8.0 mL of the toluene solution (0.5 mmol/L) of dimethylsilyl[1-(2-methyl-4,5-benzoindenyl)](2,7-di-tert-butylfluorenyl) zirconium dichloride (complex 1) prepared with reference to the method described in J. Organomet. Chem. 2003, (688), 153 was replaced by 8.0 mL of a toluene solution (0.5 mmol/L) of dimethylsilyl[1-(2-methyl-4,5-benzoindenyl)](fluorenyl) zirconium dichloride (complex 16) prepared by the method described in Journal of the American Chemical Society, 2003, (125), 8970. Thus, an ethylene/1,3-butadiene copolymer was obtained.

[Chem. 42]

(complex 16)

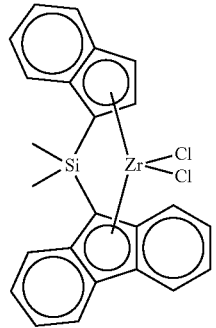

The yield of the ethylene/1,3-butadiene copolymer was 1.53 g. The reaction activity (yield per unit time [kg/h]/moles of the complex [mmol]) was 1.15 [kg/(mmol·h)]. The results are described in Tables 3 and 4.

Comparative Example 15

The polymerization and the post treatments were carried out in the same manner as described in Example 27, except that the amount of the toluene solution of triisobutylaluminum (Al=0.25 M) was changed from 2.0 mmol to 1.0 mmol in terms of aluminum, that 16.0 mL of the toluene solution (0.5 mmol/L) of rac-dimethylsilyl-bis[1-(2-n-propyl-4-(9-phenanthryl) indenyl)]zirconium dichloride (complex 8) prepared by the method described in JP-A-H07-286005 was replaced by 4.0 mL of a toluene solution (0.5 mmol/L) of (tert-butylamido)dimethyl(tetramethyl-η$^5$-cyclopentadienyl) silanetitanium dichloride (complex 4) prepared by the method described in EP 0416815 (A2), and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl) borate in 6.0 equivalents relative to Ti was forcibly fed to the autoclave, thereby initiating the polymerization. Thus, an ethylene/1,3-butadiene copolymer was obtained.

The yield of the ethylene/octene/1,3-butadiene copolymer was 11.44 g. The reaction activity (yield per unit time [kg/h]/moles of the complex [mmol]) was 17.15 [kg/(mmol·h)]. The results are described in Tables 3 and 4.

Comparative Example 16

The polymerization and the post treatments were carried out in the same manner as described in Example 27, except that the amount of the toluene solution of triisobutylaluminum (Al=0.25 M) was changed from 2.0 mmol to 1.0 mmol in terms of aluminum, that 16.0 mL of the toluene solution (0.5 mmol/L) of rac-dimethylsilyl-bis[1-(2-n-propyl-4-(9-phenanthryl) indenyl)]zirconium dichloride (complex 8) prepared by the method described in JP-A-H07-286005 was replaced by 4.0 mL of a toluene solution (0.5 mmol/L) of [(tert-butylamido)dimethyl(fluorenyl)silane]titanium dimethyl (complex 5) prepared by the method descried in Macromolecules 1998, 31, p. 3184, and this toluene solution was added to the 20 ml volume catalyst supply pot which had been connected to the autoclave and had been thoroughly purged with nitrogen, and that after the above toluene solution was forcibly fed with nitrogen to the autoclave, a toluene solution (4.0 mmol/L) of triphenylcarbenium tetrakis(pentafluorophenyl) borate in 6.0 equivalents relative to was forcibly fed to the autoclave, thereby initiating the polymerization. Thus, an ethylene/1,3-butadiene copolymer was obtained.

The yield of the ethylene/octene/1,3-butadiene copolymer was 7.87 g. The reaction activity (yield per unit time [kg/h]/moles of the complex [mmol]) was 11.81 [kg/(mmol·h)]. The results are described in Tables 3 and 4.

(Hot Air Crosslinking)

The copolymer obtained in Example, or a copolymer described below, was blended with carbon black, an organic peroxide and a crosslinking auxiliary. The resultant resin composition was subjected to hot air crosslinking, and the crosslinking state was evaluated (Examples 35 and 36, and Comparative Examples 17 and 18).

Example 35

The copolymer from Example 29 weighing 20 g was blended with the components described later in Table 3 in the amounts shown in the table. The blend was kneaded using a 6-inch open roll mill (manufactured by Nippon Roll MFG. Co., Ltd.) to give a resin composition.

The resin composition was crosslinked at 170° C., and the crosslinking state at the temperature was analyzed with RPA 2000P (RUBBER PROCESS ANALYZER RPA 2000P manufactured by ALPHA TECHNOLOGIES). The results are described in Table 5 and FIG. 1.

Example 36

The copolymer from Example 33 was combined with a copolymer manufactured under the same conditions, resulting in a resin weighing 89 g. The resin was blended with the components described later in Table 3 in the amounts shown in the table. The blend was kneaded using a 6-inch open roll mill (manufactured by Nippon Roll MFG. Co., Ltd.) to give a resin composition.

The resin composition was crosslinked at 170° C., and the crosslinking state at the temperature was analyzed with RPA 2000P. The results are described in Table 5 and FIG. 1.

Comparative Example 17

An ethylene/propylene/VNB copolymer shown in Table 3 was blended with the components described later in Table 3 in the amounts shown in the table. The blend was kneaded using a 6-inch open roll mill (manufactured by Nippon Roll MEG. Co., Ltd.) to give a resin composition.

The resin composition was crosslinked at 170° C., and the crosslinking state at the temperature was analyzed with RPA 2000P. The results are described in Table 5 and FIG. 1.

Comparative Example 18

An ethylene/propylene/ENB copolymer shown in Table 3 was blended with the components described later in Table 3 in the amounts shown in the table. The blend was kneaded using a 6-inch open roll mill (manufactured by Nippon Roll MFG. Co., Ltd.) to give a resin composition.

The resin composition was crosslinked at 170° C., and the crosslinking state at the temperature was analyzed with RPA 2000P. The results are described in Table 5 and FIG. 1.

The results in Table 5 and FIG. 1 showed that the ethylene/butadiene copolymer and the ethylene/octene/butadiene copolymer obtained according to the present invention involved a rapid increase of torque which indicated that they had excellent crosslinking reactivity. In contrast, the torque did not substantially increase for the ethylene/propylene/VNB copolymer and the ethylene/propylene/ENB copolymer because of their poor crosslinking reactivity.

TABLE 1

|  |  | Complex (mmol) | DMAO (mmol) | $^i Bu_3 Al$ (mmol) | $Ph_3 CB(C_6 F_5)_4$ (mmol) | Ethylene $(kg/cm^2 \cdot G)$ at Tp | Total pressure $(kg/cm^2 \cdot G)$ at Tp | Reaction temperature (° C.) |
|---|---|---|---|---|---|---|---|---|
| Ex. 1 | 1 | 0.002 |  | 0.2 | 0.002 | 0.9 | 2 | 40 |
| Ex. 2 | 2 | 0.0005 | 1.5 |  |  | 7.9 | 9 | 40 |
| Ex. 3 | 3 | 0.0005 |  | 0.05 | 0.0005 | 0.9 | 2 | 40 |
| Ex. 4 | 3 | 0.0005 | 1.5 |  |  | 0.9 | 2 | 40 |
| Ex. 5 | 3 | 0.0005 | 1.5 |  |  | 0.5 | 2 | 60 |
| Comp. Ex. 1 | 4 | 0.0005 |  | 0.05 | 0.0005 | 0.9 | 2 | 40 |
| Comp. Ex. 2 | 5 | 0.0005 |  | 0.05 | 0.0005 | 0.9 | 2 | 40 |
| Comp. Ex. 3 | 5 | 0.0005 | 1.5 |  |  | 0.9 | 2 | 40 |
| Comp. Ex. 4 | 5 | 0.0005 | 1.5 |  |  | 7.9 | 9 | 40 |

TABLE 1-continued

|  | Complex (mmol) | DMAO (mmol) | $^{i}Bu_3Al$ (mmol) | $Ph_3CB(C_6F_5)_4$ (mmol) | Ethylene (kg/cm² · G) at Tp | Total pressure (kg/cm² · G) at Tp | Reaction temperature (° C.) |
|---|---|---|---|---|---|---|---|
| Comp. Ex. 5 | 4 | 0.0005 |  | 0.05 | 0.0005 | 0.9 | 2 | 40 |
| Comp. Ex. 6 | 5 | 0.0005 |  | 0.05 | 0.0005 | 0.9 | 2 | 40 |
| Comp. Ex. 7 | 5 | 0.0005 | 1.5 |  | 0.9 | 2 | 40 |
| Comp. Ex. 8 | 5 | 0.0005 | 1.5 |  | 7.9 | 9 | 40 |

Polymerization conditions: Butadiene 1 (kg/cm² · G) at 30° C.
Toluene 5 mL, 20 min.
Tp: reaction temperature

TABLE 2

|  |  |  |  |  |  |  | Contents (mol %)ˣ⁾ of units relative to 100% of all structural units derived from butadiene ||||| 
|  |  |  |  |  |  | Butadiene | 1,2-addition units ||| | |
|  | Yield (g) | Activity (kg/mmol · h) | Mw (PS-calibrated) | Mn (PS-calibrated) | Mw/Mn | content (mol %) | Vinyl group | Cyclopropane ring | cyclopentene ring | 1,4-addition units | 1,3-addition units |
|---|---|---|---|---|---|---|---|---|---|---|---|
| Ex. 1 | 0.04 | 0.05 | 16,736 | 15,075 | 1.1 | 21 | 0 | 0 | 100 | 0 | 0 |
| Ex. 2 | 1.29 | 1.93 | 68,554 | 20,015 | 3.4 | 8 | 21 | 23 | 56 | 0 | 0 |
| Ex. 3 | 0.24 | 1.47 | 3,415,198 | 779,273 | 4.4 | 13 | 2 | 0 | 98 | 0 | 0 |
| Ex. 4 | 0.53 | 3.21 | 824,688 | 228,138 | 3.6 | 17 | 4 | 1 | 95 | 0 | 0 |
| Ex. 5 | 0.03 | 0.18 | 55,314 | 29,358 | 1.9 | 22 | 15 | 0 | 82 | 3 | 0 |
| Comp. Ex. 1 | 0.18 | 1.08 |  | Not dissolved |  | 34 | 14 | 0 | 44 | 42 | 0 |
| Comp. Ex. 2 | 0.37 | 2.24 |  | Not dissolved |  | 33 | 10 | 0 | 72 | 18 | 0 |
| Comp. Ex. 3 | 0.13 | 0.80 | 80,351 | 59,558 | 1.4 | 28 | 13 | 0 | 73 | 14 | 0 |
| Comp. Ex. 4 | 1.70 | 10.20 | 42,217 | 14,358 | 2.9 | 9 | 3 | 3 | 75 | 19 | 0 |
| Comp. Ex. 5 | 0.18 | 1.08 | Not dissolved |  |  | 34 | 14 | 0 | 44 | 42 | 0 |
| Comp. Ex. 6 | 0.37 | 2.24 | Not dissolved |  |  | 33 | 10 | 0 | 72 | 18 | 0 |
| Comp. Ex. 7 | 0.13 | 0.80 | 80,351 | 59,558 | 1.4 | 28 | 13 | 0 | 73 | 14 | 0 |
| Comp. Ex. 8 | 1.70 | 10.20 | 42,217 | 14,358 | 2.9 | 9 | 3 | 3 | 75 | 19 | 0 |

ˣ⁾determined by ¹³C-NMR

TABLE 3

|  | Complex (mmol) | DMAO (mmol) | $^{i}Bu_3Al$ (mmol) | $Ph_3CB(C_6F_5)_4$ (mmol) | Ethylene (kg/cm² · G) at Tp | α-Olefin |
|---|---|---|---|---|---|---|
| Ex. 6 | 6 | 0.004 | 11.2 |  | 6.0 |  |
| Ex. 7 | 7 | 0.004 | 11.2 |  | 6.0 |  |
| Ex. 8 | 1 | 0.004 | 11.2 |  | 6.0 |  |
| Ex. 9 | 6 | 0.06 | 11.2 |  | 3.2 |  |
| Ex. 10 | 6 | 0.06 | 11.2 |  | 6.7 |  |
| Ex. 11 | 7 | 0.06 | 11.2 |  | 3.2 |  |
| Ex. 12 | 1 | 0.06 | 11.2 |  | 3.2 |  |
| Ex. 13 | 2 | 0.002 |  | 0.5 | 0.012 | 5.0 |
| Ex. 14 | 8 | 0.002 |  | 0.5 | 0.012 | 5.0 |
| Ex. 15 | 9 | 0.002 |  | 0.5 | 0.012 | 5.0 |
| Ex. 16 | 10 | 0.002 |  | 0.5 | 0.012 | 5.0 |
| Ex. 17 | 11 | 0.002 |  | 0.5 | 0.012 | 5.0 |
| Ex. 18 | 12 | 0.002 |  | 0.5 | 0.012 | 5.0 |
| Ex. 19 | 13 | 0.002 |  | 0.5 | 0.012 | 5.0 |
| Ex. 20 | 14 | 0.002 |  | 0.5 | 0.012 | 5.0 |
| Ex. 21 | 2 | 0.002 | 5.6 |  | 6.5 |  |

TABLE 3-continued

| | | | | | | | |
|---|---|---|---|---|---|---|---|
| Ex. 22 | 2 | 0.008 | | 2 | 0.048 | 5.3 | |
| Ex. 23 | 8 | 0.008 | 5.6 | | | 5.6 | |
| Ex. 24 | 8 | 0.008 | 5.6 | | | 4.1 | |
| Ex. 25 | 8 | 0.008 | | 2 | 0.048 | 5.3 | |
| Ex. 26 | 8 | 0.008 | | 2 | 0.048 | 4.6 | |
| Ex. 27 | 8 | 0.008 | | 2 | 0.048 | 4.1 | |
| Ex. 28 | 15 | 0.008 | | 2 | 0.048 | 3.6 | |
| Ex. 29 | 2 | 0.02 | 11.2 | | | 6.0 | |
| Ex. 30 | 2 | 0.02 | 11.2 | | | 2.9 | |
| Ex. 31 | 8 | 0.06 | 11.2 | | | 3.2 | |
| Ex. 32 | 8 | 0.008 | | 2 | 0.048 | 6.3 | Octene 5 mL |
| Ex. 33 | 8 | 0.008 | | 2 | 0.048 | 4.9 | Octene 5 mL |
| Ex. 34 | 8 | 0.004 | 11.2 | | | 4.6 | Propylene 1 ($kg/cm^2 \cdot G$) at Tp |
| Comp. Ex. 9 | 4 | 0.004 | | 1 | 0.024 | 6.0 | |
| Comp. Ex. 10 | 4 | 0.004 | | 1 | 0.024 | 5.6 | |
| Comp. Ex. 11 | 5 | 0.004 | | 1 | 0.024 | 6.0 | |
| Comp. Ex. 12 | 5 | 0.004 | | 1 | 0.024 | 5.6 | |
| Comp. Ex. 13 | 5 | 0.06 | | 3 | 0.072 | 2.9 | |
| Comp. Ex. 14 | 16 | 0.004 | 11.2 | | | 6.0 | |
| Comp. Ex. 15 | 4 | 0.002 | | 1 | 0.012 | 4.2 | |
| Comp. Ex. 16 | 5 | 0.002 | | 1 | 0.012 | 3.5 | |

| | Butadiene ($kg/cm^2 \cdot G$) at Tp | (g) | H2 (ml) at 20° C. | Total pressure ($kg/cm^2 \cdot G$) | Hexane (mL) | Reaction temperature (° C.) | Time (min) |
|---|---|---|---|---|---|---|---|
| Ex. 6 | 2.0 | 100 | 124 | 8.0 | 1000 | 60 | 20 |
| Ex. 7 | 2.0 | 100 | 124 | 8.0 | 1000 | 60 | 20 |
| Ex. 8 | 2.0 | 100 | 124 | 8.0 | 1000 | 60 | 20 |
| Ex. 9 | 0.8 | | 0 | 4 | 2000 | 40 | 20 |
| Ex. 10 | 1.3 | 100 | 0 | 8 | 2000 | 40 | 20 |
| Ex. 11 | 0.8 | | 0 | 4 | 2000 | 40 | 20 |
| Ex. 12 | 0.8 | | 0 | 4 | 2000 | 40 | 20 |
| Ex. 13 | 2.5 | 25 | 372 | 8.0 | 250 | 60 | 20 |
| Ex. 14 | 2.5 | 25 | 372 | 8.0 | 250 | 60 | 20 |
| Ex. 15 | 2.5 | 25 | 372 | 8.0 | 250 | 60 | 20 |
| Ex. 16 | 2.5 | 25 | 372 | 8.0 | 250 | 60 | 20 |
| Ex. 17 | 2.5 | 25 | 372 | 8.0 | 250 | 60 | 20 |
| Ex. 18 | 2.5 | 25 | 372 | 8.0 | 250 | 60 | 20 |
| Ex. 19 | 2.5 | 25 | 372 | 8.0 | 250 | 60 | 20 |
| Ex. 20 | 2.5 | 25 | 372 | 8.0 | 250 | 60 | 20 |
| Ex. 21 | 1.0 | 25 | 310 | 8.0 | 500 | 40 | 20 |
| Ex. 22 | 2.2 | 40 | 248 | 8.0 | 500 | 60 | 20 |
| Ex. 23 | 1.8 | 50 | 372 | 8.0 | 500 | 40 | 20 |
| Ex. 24 | 3.1 | 60 | 372 | 8.0 | 500 | 60 | 20 |
| Ex. 25 | 2.2 | 40 | 248 | 8.0 | 500 | 60 | 20 |
| Ex. 26 | 2.7 | 40 | 372 | 8.0 | 500 | 60 | 20 |
| Ex. 27 | 3.4 | 50 | 372 | 8.0 | 500 | 60 | 20 |
| Ex. 28 | 3.6 | 50 | 372 | 8.0 | 500 | 60 | 20 |
| Ex. 29 | 2.0 | | 0 | 8.0 | 1000 | 60 | 20 |
| Ex. 30 | 1.1 | | 124 | 4.0 | 2000 | 40 | 20 |
| Ex. 31 | 0.8 | | 0 | 4.0 | 2000 | 40 | 20 |
| Ex. 32 | 1.4 | 40 | 248 | 8.0 | 500 | 40 | 20 |
| Ex. 33 | 2.4 | 40 | 372 | 8.0 | 500 | 60 | 20 |
| Ex. 34 | 2.1 | 100 | 620 | 8.0 | 1000 | 60 | 20 |
| Comp. Ex. 9 | 2.0 | 100 | 0 | 8.0 | 1000 | 60 | 20 |
| Comp. Ex. 10 | 2.0 | 100 | 620 | 8.0 | 1000 | 60 | 20 |
| Comp. Ex. 11 | 2.0 | 100 | 0 | 8.0 | 1000 | 60 | 20 |
| Comp. Ex. 12 | 2.0 | 100 | 620 | 8.0 | 1000 | 60 | 20 |
| Comp. Ex. 13 | 1.1 | | 0 | 4.0 | 2000 | 39-52 | 12 |
| Comp. Ex. 14 | 2.0 | 100 | 124 | 8.0 | 1000 | 60 | 20 |

TABLE 3-continued

| | | | | | | | |
|---|---|---|---|---|---|---|---|
| Comp. Ex. 15 | 3.1 | 50 | 372 | 8.0 | 500 | 60 | 20 |
| Comp. Ex. 16 | 3.7 | 50 | 372 | 8.0 | 500 | 60 | 20 |

Tp: reaction temperature

TABLE 4

| | Yield (g) | Activity (kg/mmol · h) | Mw (PS-calibr.) | Mn (PS-calibr.) | Mw/Mn | α-olefin content (mol %) | Butadiene content (mol %) |
|---|---|---|---|---|---|---|---|
| Ex. 6 | 13.85 | 10.39 | 1,530,000 | 268,000 | 5.7 | | 4 |
| Ex. 7 | 2.19 | 1.64 | 150,000 | 78,800 | 1.9 | | 3 |
| Ex. 8 | 4.29 | 3.22 | 228,000 | 111,000 | 2.1 | | 6 |
| Ex. 9 | 13.81 | 0.69 | 354,000 | 126,000 | 2.8 | | 4 |
| Ex. 10 | 34.36 | 1.72 | 3,231,100 | 230,900 | 14.0 | | 3 |
| Ex. 11 | 0.28 | 0.01 | 22,700 | 13,500 | 1.7 | | 3 |
| Ex. 12 | 1.93 | 0.10 | 99,700 | 63,400 | 1.6 | | 5 |
| Ex. 13 | 9.42 | 14.13 | 89,200 | 37,600 | 2.4 | | 7 |
| Ex. 14 | 2.43 | 3.64 | 77,900 | 27,100 | 2.9 | | 12 |
| Ex. 15 | 4.16 | 6.23 | 37,700 | 15,600 | 2.4 | | 9 |
| Ex. 16 | 2.26 | 3.39 | 39,400 | 6,710 | 5.9 | | 9 |
| Ex. 17 | 4.56 | 6.84 | 71,100 | 35,500 | 2.0 | | 8 |
| Ex. 18 | 0.69 | 1.04 | 59,800 | 25,800 | 2.3 | | 11 |
| Ex. 19 | 3.53 | 5.29 | 50,500 | 24,000 | 2.1 | | 9 |
| Ex. 20 | 29.94 | 44.91 | 156,600 | 49,300 | 3.2 | | 4 |
| Ex. 21 | 6.53 | 9.79 | 272,000 | 73,300 | 3.7 | | 5 |
| Ex. 22 | 33.78 | 12.67 | 872,000 | 64,400 | 13.5 | | 6 |
| Ex. 23 | 4.80 | 1.80 | 230,000 | 65,300 | 3.5 | | 12 |
| Ex. 24 | 1.05 | 0.39 | 21,300 | 9,890 | 2.2 | | 24 |
| Ex. 25 | 13.38 | 5.02 | 238,000 | 52,600 | 4.5 | | 9 |
| Ex. 26 | 11.49 | 4.31 | 98,900 | 31,700 | 3.1 | | 5 |
| Ex. 27 | 7.03 | 2.64 | 61,700 | 20,000 | 3.1 | | 10 |
| Ex. 28 | 6.23 | 2.34 | 57,600 | 20,900 | 2.8 | | 12 |
| Ex. 29 | 20.01 | 3.00 | 1,412,900 | 170,500 | 8.3 | | 7 |
| Ex. 30 | 3.24 | 0.49 | 377,000 | 43,900 | 8.6 | | 18 |
| Ex. 31 | 1.41 | 0.07 | 232,000 | 120,000 | 1.9 | | 30 |
| Ex. 32 | 7.40 | 2.78 | 269,000 | 100,000 | 2.7 | 3 | 18 |
| Ex. 33 | 13.83 | 5.19 | 113,000 | 38,600 | 2.9 | 4 | 19 |
| Ex. 34 | 7.61 | 5.71 | 123,000 | 41,100 | 3.0 | 14 | 24 |
| Comp. Ex. 9 | 5.69 | 4.26 | 892,700 | 170,900 | 5.2 | | 10 |
| Comp. Ex. 10 | 1.22 | 0.92 | 72,100 | 18,300 | 4.0 | | 11 |
| Comp. Ex. 11 | 7.44 | 5.58 | 1,580,000 | 288,000 | 5.5 | | 11 |
| Comp. Ex. 12 | 86.48 | 64.86 | 475,000 | 190,000 | 2.5 | | 12 |
| Comp. Ex. 13 | 243.86 | 20.32 | No data because polymer was not dissolved. | | | | 11 |
| Comp. Ex. 14 | 1.53 | 1.15 | 43,500 | 5,260 | 8.27 | | 8 |
| Comp. Ex. 15 | 11.44 | 17.15 | 102,500 | 13,000 | 7.9 | | 9 |
| Comp. Ex. 16 | 7.87 | 11.81 | 1,473,300 | 240,200 | 6.1 | | 8 |

Contents (mol %)[x)] of units relative to 100% of all structural units derived from butadiene

| | 1,2-addition units | | | | | | |
|---|---|---|---|---|---|---|---|
| | Vinyl group | Cyclopropane ring | Cyclopentene ring | 1,4-addition units | 1,3-addition units | Tg (° C.) | Tm (° C.) |
| Ex. 6 | 0 | 34 | 66 | 0 | 0 | — | 99 |
| Ex. 7 | 0 | 26 | 74 | 0 | 0 | — | 102 |
| Ex. 8 | 0 | 21 | 79 | 0 | 0 | — | 89 |
| Ex. 9 | 0 | 5 | 95 | 0 | 0 | — | 89 |
| Ex. 10 | 0 | 26 | 74 | 0 | 0 | — | 106 |
| Ex. 11 | 0 | 20 | 80 | 0 | 0 | — | 100 |
| Ex. 12 | 0 | 7 | 93 | 0 | 0 | — | 89 |
| Ex. 13 | 28 | 29 | 43 | 0 | 0 | −33 | 71/117 |
| Ex. 14 | 61 | 25 | 14 | 0 | 0 | −33 | 33/105 |
| Ex. 15 | 44 | 21 | 35 | 0 | 0 | −39 | 52/114 |
| Ex. 16 | 38 | 12 | 50 | 0 | 0 | −40 | 122 |

TABLE 4-continued

| | | | | | | | |
|---|---|---|---|---|---|---|---|
| Ex. 17 | 46 | 21 | 33 | 0 | 0 | −32 | 55 |
| Ex. 18 | 55 | 22 | 23 | 0 | 0 | −35 | 99/125 |
| Ex. 19 | 53 | 15 | 32 | 0 | 0 | −33 | 45 |
| Ex. 20 | 5 | 29 | 66 | 0 | 0 | — | 100 |
| Ex. 21 | 24 | 25 | 51 | 0 | 0 | −32 | 81/121 |
| Ex. 22 | 17 | 38 | 44 | 0 | 0 | −34 | 75 |
| Ex. 23 | 66 | 19 | 15 | 0 | 0 | −31 | — |
| Ex. 24 | 83 | 6 | 12 | 0 | 0 | −22 | — |
| Ex. 25 | 45 | 29 | 25 | 0 | 0 | −32 | 50 |
| Ex. 26 | 44 | 32 | 25 | 0 | 0 | −33 | 41 |
| Ex. 27 | 54 | 27 | 19 | 0 | 0 | −37 | 104 |
| Ex. 28 | 61 | 22 | 17 | 0 | 0 | −36 | 25 |
| Ex. 29 | 31 | 23 | 46 | 0 | 0 | −29 | 55 |
| Ex. 30 | 57 | 8 | 34 | 0 | 0 | −23 | — |
| Ex. 31 | 55 | 12 | 33 | 0 | 0 | −21 | — |
| Ex. 32 | 32 | 26 | 42 | 0 | 0 | −40 | 45 |
| Ex. 33 | 31 | 27 | 42 | 0 | 0 | −40 | 35 |
| Ex. 34 | 45 | 18 | 37 | 0 | 0 | −24 | — |
| Comp. Ex. 9 | 10 | 5 | 39 | 46 | 0 | −44 | 33 |
| Comp. Ex. 10 | 10 | 7 | 34 | 49 | 0 | −55 | 39 |
| Comp. Ex. 11 | 5 | 2 | 73 | 21 | 0 | −35 | 11 |
| Comp. Ex. 12 | 0 | 0 | 82 | 18 | 0 | −33 | 12 |
| Comp. Ex. 13 | 0 | 0 | 93 | 7 | 0 | −16 | — |
| Comp. Ex. 14 | 0 | 3 | 97 | 0 | 0 | −39 | 126.1 |
| Comp. Ex. 15 | 5 | 6 | 29 | 59 | 0 | −54 | 22 |
| Comp. Ex. 16 | 4 | 5 | 55 | 36 | 0 | −26 | — | x) determined by $^{13}$C-NMR

TABLE 5

Results of hot air crosslinking test

| | Ex. 35 | Amount (parts by weight) | Ex. 36 | Amount (parts by weight) |
|---|---|---|---|---|
| Copolymer | Copolymer from Ex. 29 | 100 | Mixture of copolymer from Ex. 33 and copolymer produced under the same conditions | 100 |
| Composition (mol %) | ethylene/butadiene = 93/7 | | ethylene/octene/butadiene = 77/4/19 | |
| Weight average molecular weight (PS-calibrated) | 1,412,900 | | 113,000 | |
| Mooney viscosity | — | | — | |
| Carbon black | SEAST SO ™ manufactured by Tokai Carbon Co., Ltd. | 10.0 | SEAST SWA ™ manufactured by Tokai Carbon Co., Ltd. | 10 |
| Organic peroxide | Kayacumyl D-40MB ™ manufactured by KAYAKU AKZO CO., LTD. | 6.0 | Kayacumyl D-40C ™ manufactured by KAYAKU AKZO CO., LTD. | 6.8 |
| Crosslinking auxiliary | TAIC ™ manufactured by Nippon Kasei Chemical Co., Ltd. | 1.0 | TAIC ™ manufactured by Nippon Kasei Chemical Co., Ltd. | 1 |
| (Uncrosslinked rubber properties) | | | | |
| Crosslinking rate | 170° C. × 20 min | | 170° C. × 30 min | |
| tc10 min | 0.9 | | 1.0 | |
| tc90 min | 11.0 | | 11.0 | |
| S'Max dNm | 87.5 | | 50.1 | |
| Peak rate dNm/min | 15.2 | | 10.0 | |
| (Surface condition after air Crosslinking) | No surface stickiness | | No surface stickiness | |

TABLE 5-continued

Results of hot air crosslinking test

| | Comp. Ex. 17 | | Comp. Ex. 18 | |
|---|---|---|---|---|
| | | Amount (parts by weight) | | Amount (parts by weight) |
| Copolymer | PX-062 (liquid EPT) | 100 | 4045 (ENB-EPT) | 100 |
| Composition (mol %) | ethylene/propylene/ VNB = 61.5/37.1/1.4 | | ethylene/propylene/ ENB = 66.6/31.1/2.3 | |
| Weight average molecular weight (PS-calibrated) | 3,160 | | — | |
| Mooney viscosity | 2500 (40° C.) | | 45 (100° C.) | |
| Carbon black | — | — | SEAST SO ™ manufactured by Tokai Carbon Co., Ltd. | 10.0 |
| Organic peroxide | DCP-40C ™ manufactured by Mitsui Chemicals, Inc. | 6 | Kayacumyl D-40MB ™ manufactured by KAYAKU AKZO CO., LTD. | 6.0 |
| Crosslinking auxiliary | TAIC ™ manufactured by Nippon Kasei Chemical Co., Ltd. | 1 | TAIC ™ manufactured by Nippon Kasei Chemical Co., Ltd. | 1.0 |
| (Uncrosslinked rubber properties) | | | | |
| Crosslinking rate | 170° C. × 20 min | | 170° C. × 20 min | |
| tc10 min | 2.2 | | 1.1 | |
| tc90 min | 11.4 | | 8.7 | |
| S'Max dNm | 8.2 | | 20.2 | |
| Peak rate dNm/min | 1.4 | | 5.8 | |
| (Surface condition after air Crosslinking) | Surface stickiness | | Surface stickiness | |

Kneading conditions:
6-inch open roll mill (manufactured by Nippon Roll MFG. Co., Ltd.): polymer and additives (kneaded for 10 minutes, deaerated for 3 minutes)
Crosslinking conditions:
8 m HAV: 250° C. × 10 minute crosslinking
150 t press: 170° C. × 15 minute crosslinking
VNB: vinylnorbornene
ENB: ethylidenenorbornene
SEAST SO ™ manufactured by Tokai Carbon Co., Ltd.: FEF class carbon black
SEAST SWA ™ manufactured by Tokai Carbon Co., Ltd.: SRF class carbon blask
Kayacumyl D-40MB ™ manufactured by KAYAKU AKZO CO., LTD.: dicumyl peroxide
Kayacumyl D-40C ™ manufactured by KAYAKU AKZO CO., LTD.: dicumyl peroxide
DCP-40C ™ manufactured by Mitsui Chemicals, Inc.: dicumyl peroxide (40% concentration)
TAIC ™ manufactured by Nippon Kasei Chemical Co., Ltd.: triallyl isocyanurate

INDUSTRIAL APPLICABILITY

The copolymers according to the invention show excellent properties such as weathering resistance, heat resistance, oil resistance and economic efficiency, have a low glass transition temperature and excellent cold resistance, and have excellent crosslinking efficiency and modification efficiency. In particular, the copolymers can be crosslinked or modified with organic peroxides with excellent efficiency, and are also crosslinkable with sulfur. The copolymer production processes of the invention allow for inexpensive industrial production of the copolymers with high economic efficiency.

The invention claimed is:

1. A copolymer obtained by copolymerizing at least ethylene and a conjugated diene, wherein
   (1) structural units derived from the conjugated diene represent 1 to 90 mol % of all the monomer units in the copolymer, and
   (2) based on all the structural units derived from the conjugated diene in the copolymer, structural units resulting from 1,2-addition of the conjugated diene and having a side-chain double bond represent 0.5 to 90 mol %, structural units resulting from 1,4-addition of the conjugated diene represent 0 to 3 mol %, structural units resulting from 1,3-addition of the conjugated diene represent 0 to 3 mol %, and the total of structural units resulting from 1,2-addition of the conjugated diene and having a 1,2-cyclopropane skeleton and structural units resulting from 1,2-addition of the conjugated diene and having a 1,2-cyclopentane skeleton represent 4 to 99.5 mol %.

2. The copolymer according to claim 1, wherein the total of the structural units resulting from 1,4-addition of the conjugated diene and the structural units resulting from 1,3-addition of the conjugated diene represents 0 to 3 mol % based on all the structural units derived from the conjugated diene in the copolymer.

3. The copolymer according to claim 1, wherein the total of the structural units resulting from 1,2-addition of the conjugated diene and having a 1,2-cyclopropane skeleton and the structural units resulting from 1,2-addition of the conjugated diene and having a 1,2-cyclopentane skeleton represents 15 to 99 mol % based on all the structural units derived from the conjugated diene in the copolymer.

4. The copolymer according to claim 1, wherein the copolymer has a weight average molecular weight of not less than 20,000 as measured by gel permeation chromatography (GPC) relative to polystyrenes.

5. The copolymer according to claim 1, wherein the copolymer has a glass transition temperature (Tg) of −60 to 30° C. or does not have a glass transition temperature, and has a melting point (Tm) of not more than 130° C. or does not have a melting point.

6. A process for producing the copolymer described in claim 1, comprising copolymerizing at least ethylene and a conjugated diene in the presence of an addition polymerization catalyst comprising the following (A) and (B):

(A): a transition metal compound having a transition metal atom selected from Group 3 to Group 11 of the periodic table;

(B) at least one compound selected from:

(B-1) an organometallic compound, (B-2) an organoaluminum oxy-compound, and (B-3) a compound capable of reacting with the transition metal compound (A) to form an ion pair.

7. The process for producing the copolymer according to claim 6, wherein the transition metal compound (A) is represented by Formula (I) below:

$$LMX_mY_n \qquad (I)$$

wherein L is a tridentate anionic ligand or neutral ligand represented by $RQ(Pz^1)_i(Pz^2)_{3-i}$, R is an atom or a group selected from the group consisting of a hydrogen atom, halogen atoms, hydrocarbon groups, heterocyclic compound residues, oxygen-containing groups, sulfur-containing groups, nitrogen-containing groups, boron-containing groups, aluminum-containing groups, phosphorus-containing groups, halogen-containing groups, silicon-containing groups, germanium-containing groups and tin-containing groups, Q is an atom selected from the group consisting of boron, carbon, silicon, germanium, tin and lead, $Pz^1$ is a pyrazolyl group in which at least the position 3 is substituted with an unsubstituted aryl group, a substituted aryl group, a $C_3$ or higher alkyl group, a cycloalkyl group, an amino group or an oxyhydrocarbon group, $Pz^2$ is an unsubstituted pyrazolyl group or a substituted pyrazolyl group, i is an integer of 2 or 3, M is a transition metal atom selected from Group 3 to Group 11 of the periodic table, X is selected from a hydrogen atom, halogen atoms, an oxygen atom, hydrocarbon groups, oxygen-containing groups, sulfur-containing groups, nitrogen-containing groups, boron-containing groups, aluminum-containing groups, phosphorus-containing groups, halogen-containing groups, heterocyclic compound residues, silicon-containing groups, germanium-containing groups and tin-containing groups, Y is a neutral ligand, an inorganic salt, an inorganic compound or an organometallic compound and has an electron donating group, m is a number satisfying the valence of M, when m is 2 or greater, the plurality of atoms or groups X may be the same or different from each other, and the plurality of groups X may be linked together to form a ring, and n is an integer of 0 to 3.

8. The process for producing the copolymer according to claim 7, wherein M in Formula (I) is titanium, zirconium or hafnium.

9. The process for producing the copolymer according to claim 7, wherein M in Formula (I) is zirconium.

10. The process for producing the copolymer according to claim 7, wherein the compound (A) is at least one transition metal compound selected from the group consisting of [hydrobis(3-mesitylpyrazol-1-yl)(5-mesitylpyrazol-1-yl)]borate zirconium trichloride and [hydrotris(3-mesitylpyrazol-1-yl)]borate zirconium trichloride.

11. The process for producing the copolymer according to claim 6, wherein the transition metal compound (A) is represented by Formula (II) below:

[Chem. 1]

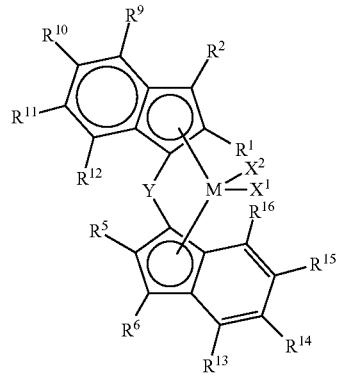

(II)

wherein M is a transition metal atom of Group 4 to Group 6 in the periodic table, $R^1, R^2, R^5, R^6, R^9, R^{10}, R^{11}, R^{12}, R^{13}, R^{14}, R^{15}$ and $R^{16}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

12. The process for producing the copolymer according to claim 11, wherein $R^9$ and $R^{13}$ in Formula (II) are the same or different from each other and are each a $C_{6-20}$ hydrocarbon group, a $C_{6-20}$ halogenated hydrocarbon group, a silicon-containing group, an oxygen-containing group, a sulfur-containing group, a nitrogen-containing group or a phosphorus-containing group.

13. The process for producing the copolymer according to claim 11, wherein $R^1$ and $R^5$ in Formula (II) are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

14. The process for producing the copolymer according to claim 11, wherein $R^9$ and $R^{13}$ in Formula (II) are the same or different from each other and are each an aromatic group.

15. The process for producing the copolymer according to claim 6, wherein the transition metal compound (A) is represented by Formula (III) below:

[Chem. 2]

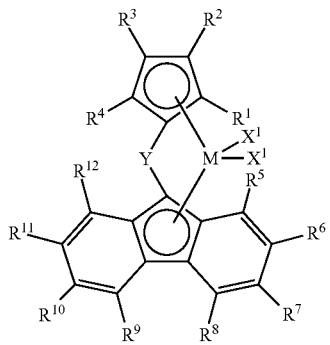

(III)

wherein M is a transition metal atom of Group 4 to Group 6 in the periodic table, $R^1$, $R^2$ and $R^3$ are the same or different from one another and are each a hydrogen atom, a hydrocarbon group, a halogenated hydrocarbon group, a silicon-containing group, an oxygen-containing group, a sulfur-containing group, a nitrogen-containing group or a phosphorus-containing group, $R^4$ is a hydrocarbon group, a halogenated hydrocarbon group, a silicon-containing group, an oxygen-containing group, a sulfur-containing group, a nitrogen-containing group or a phosphorus-containing group, when $R^1$, $R^2$ and $R^3$ are each a group selected from a hydrocarbon group, a halogenated hydrocarbon group, a silicon-containing group, an oxygen-containing group, a sulfur-containing group, a nitrogen-containing group and a phosphorus-containing group, $R^1$ and $R^4$, and $R^2$ and $R^3$ are not individually identical at the same time, part of the adjacent groups $R^2$, $R^3$ and $R^4$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

16. The process for producing the copolymer according to claim 6, wherein the transition metal compound (A) is represented by Formula (IV) below:

[Chem. 3]

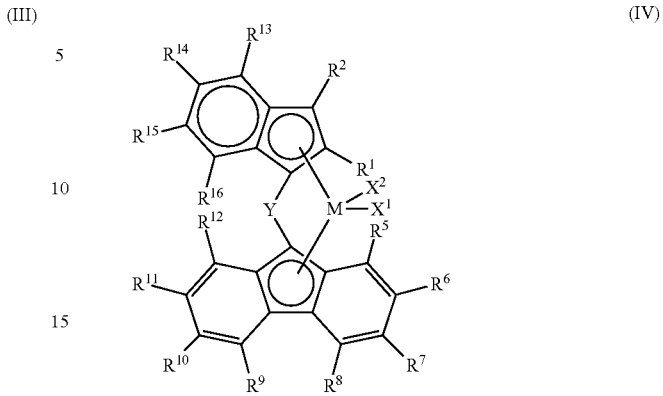

(IV)

wherein M is a transition metal atom of Group 4 to Group 6 in the periodic table, $R^1$, $R^2$, $R^{13}$, $R^{14}$, $R^{15}$ and $R^{16}$ are the same or different from one another and are each a hydrogen atom, a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, part of the adjacent groups $R^{13}$, $R^{14}$, $R^{15}$ and $R^{16}$ may be linked together to form a ring in combination with the carbon atoms to which the groups are bonded, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$ and $X^2$ are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

17. The process for producing the copolymer according to claim 16, wherein $R^1$ and $R^{13}$ in Formula (IV) are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

18. The process for producing the copolymer according to claim 16, wherein $R^6$, $R^7$, $R^{10}$ and $R^{11}$ in Formula (IV) are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

19. The process for producing the copolymer according to claim 16, wherein part of the adjacent groups $R^6$, $R^7$, $R^{10}$ and $R^{11}$ in Formula (IV) may be linked together to form a ring in combination with the carbon atoms to which the groups are bonded, and $R^1$, $R^{13}$, $R^6$, $R^7$, $R^{10}$ and $R^{11}$ are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group.

20. The process for producing the copolymer according to claim 16, wherein $R^{13}$ in Formula (IV) is an aromatic group.

21. The process for producing the copolymer according to claim 6, wherein the transition metal compound (A) is represented by Formula (V) below:

[Chem. 4]

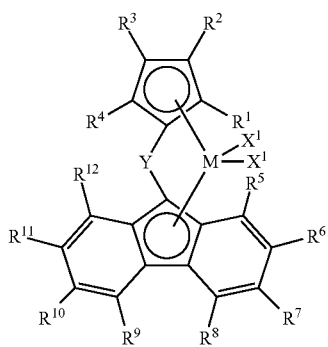

(V)

wherein M is a transition metal atom of Group 4 to Group 6 in the periodic table, $R^1$ and $R^3$ are each a hydrogen atom, $R^2$ and $R^4$ are the same or different from each other and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, $R^5$, $R^6$, $R^7$, $R^8$, $R^9$, $R^{10}$, $R^{11}$ and $R^{12}$ are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group, a phosphorus-containing group, a hydrogen atom or a halogen atom, and part of these adjacent groups may be linked together to form a ring in combination with the carbon atoms to which the groups are bonded, $X^1$s are the same or different from each other and are each a hydrocarbon group, a halogenated hydrocarbon group, an oxygen-containing group, a sulfur-containing group, a silicon-containing group or a halogen atom, and Y is a divalent hydrocarbon group, a divalent halogenated hydrocarbon group, a divalent silicon-containing group, a divalent germanium-containing group, a divalent tin-containing group, —O—, —CO—, —S—, —SO—, —SO$_2$—, —Ge—, —Sn—, —NR—, —P(R)—, —P(O)(R)—, —BR— or —AlR— (wherein R is a hydrogen atom, a halogen atom, a hydrocarbon group, a halogenated hydrocarbon group or an alkoxy group).

22. The process for producing the copolymer according to claim 21, wherein Y in Formula (V) is an arylalkylene group or an arylsilylene group.

23. The process for producing the copolymer according to claim 21, wherein $R^6$, $R^7$, $R^{10}$ and $R^{11}$ in Formula (V) are the same or different from one another and are each a $C_{1-20}$ hydrocarbon group, a $C_{1-20}$ halogenated hydrocarbon group, a silicon-containing group, an oxygen-containing group, a sulfur-containing group, a nitrogen-containing group or a phosphorus-containing group, and part of these adjacent groups may be linked together to form a ring in combination with the carbon atoms to which the groups are bonded.

* * * * *